(12) United States Patent
Fukazawa et al.

(10) Patent No.: US 11,288,869 B2
(45) Date of Patent: Mar. 29, 2022

(54) INFORMATION PROCESSING DEVICE, AND INFORMATION PROCESSING METHOD

(71) Applicant: SONY CORPORATION, Tokyo (JP)

(72) Inventors: Ryo Fukazawa, Kanagawa (JP); Hirotake Ichikawa, Tokyo (JP); Hiroyuki Aga, Tokyo (JP); Atsushi Ishihara, Kanagawa (JP); Shinichi Takemura, Kanagawa (JP); Miwa Ichikawa, Tokyo (JP); Shunitsu Kohara, Tokyo (JP); Ryosuke Murata, Kanagawa (JP); Kenji Sugihara, Kanagawa (JP); Mari Saito, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/635,585

(22) PCT Filed: May 15, 2018

(86) PCT No.: PCT/JP2018/018785
§ 371 (c)(1),
(2) Date: Jan. 31, 2020

(87) PCT Pub. No.: WO2019/031015
PCT Pub. Date: Feb. 14, 2019

(65) Prior Publication Data
US 2020/0242842 A1  Jul. 30, 2020

(30) Foreign Application Priority Data
Aug. 9, 2017  (JP) .............................. JP2017-154116

(51) Int. Cl.
*G06T 19/00* (2011.01)
*G06T 7/50* (2017.01)
(Continued)

(52) U.S. Cl.
CPC ........ *G06T 19/006* (2013.01); *G06K 9/00335* (2013.01); *G06K 9/00375* (2013.01);
(Continued)

(58) Field of Classification Search
CPC ........... G06T 19/006; G06T 7/50; G06T 7/70; G06T 2210/21; G06K 9/00335
(Continued)

(56) References Cited

U.S. PATENT DOCUMENTS

2008/0284864 A1  11/2008  Kotake et al.
2011/0211754 A1   9/2011  Litvak et al.
(Continued)

FOREIGN PATENT DOCUMENTS

CA    2810859 A1    3/2012
CN  101162524 A     4/2008
(Continued)

OTHER PUBLICATIONS

International Search Report and Written Opinion of PCT Application No. PCT/JP2018/018785, dated Jul. 17, 2018, 07 pages of ISRWO.

(Continued)

*Primary Examiner* — David T Welch
(74) *Attorney, Agent, or Firm* — Chip Law Group

(57) ABSTRACT

An information processing device including a display control unit that controls, when recognition information related to recognition based on sensing of a real object includes first recognition information, shielding display representing shielding of a virtual object by the real object such that the shielding display presents a first boundary representation at a boundary between the virtual object and the real object or at a position near the boundary, and controls, when the recognition information includes second recognition information different from the first recognition information, the (Continued)

shielding display such that the shielding display presents a second boundary representation different from the first boundary representation at the boundary or at a position near the boundary.

19 Claims, 45 Drawing Sheets

(51) Int. Cl.
　　　*G06T 7/70*　　　(2017.01)
　　　*G06K 9/00*　　　(2006.01)
(52) U.S. Cl.
　　　CPC .................. *G06T 7/50* (2017.01); *G06T 7/70* (2017.01); *G06T 2207/30196* (2013.01); *G06T 2210/21* (2013.01)
(58) Field of Classification Search
　　　USPC .......................................................... 345/633
　　　See application file for complete search history.

(56) References Cited

U.S. PATENT DOCUMENTS

| | | | |
|---|---|---|---|
| 2012/0068913 A1 | 3/2012 | Bar-Zeev et al. | |
| 2012/0206452 A1* | 8/2012 | Geisner | H04S 7/304 345/419 |
| 2013/0083011 A1* | 4/2013 | Geisner | G02B 27/017 345/419 |
| 2013/0286004 A1* | 10/2013 | McCulloch | G06T 19/006 345/419 |
| 2013/0300637 A1* | 11/2013 | Smits | G02B 5/128 345/8 |
| 2014/0002444 A1* | 1/2014 | Bennett | G06F 3/0304 345/419 |
| 2014/0140579 A1 | 5/2014 | Takemoto | |
| 2014/0294237 A1 | 10/2014 | Litvak et al. | |
| 2015/0130790 A1* | 5/2015 | Vasquez, II | G06T 19/006 345/419 |
| 2015/0193984 A1 | 7/2015 | Bar-Zeev et al. | |
| 2016/0171779 A1 | 6/2016 | Bar-Zeev et al. | |
| 2017/0017830 A1 | 1/2017 | Hanai | |
| 2017/0212585 A1* | 7/2017 | Kim | G06F 3/013 |
| 2018/0197336 A1* | 7/2018 | Rochford | G06T 19/006 |
| 2018/0211448 A1 | 7/2018 | Bar-Zeev et al. | |
| 2018/0240220 A1 | 8/2018 | Katori et al. | |
| 2019/0011703 A1* | 1/2019 | Robaina | G06F 3/013 |
| 2019/0171347 A1* | 6/2019 | Issayeva | G06F 3/04842 |
| 2019/0221043 A1* | 7/2019 | Kopper | G06F 3/014 |
| 2019/0228586 A1 | 7/2019 | Bar-Zeev et al. | |
| 2019/0378338 A1 | 12/2019 | Bar-Zeev et al. | |
| 2020/0019755 A1 | 1/2020 | Hanai | |

FOREIGN PATENT DOCUMENTS

| | | |
|---|---|---|
| CN | 102540463 A | 7/2012 |
| CN | 105814611 A | 7/2016 |
| CN | 108027652 A | 5/2018 |
| DK | 2619622 T3 | 4/2019 |
| EP | 1887523 A2 | 2/2008 |
| EP | 3086292 A1 | 10/2016 |
| EP | 3352050 A1 | 7/2018 |
| EP | 3499293 A1 | 6/2019 |
| EP | 3499294 A1 | 6/2019 |
| ES | 2728233 T3 | 10/2019 |
| JP | 489745 B2 | 10/2011 |
| JP | 2014-106543 A | 6/2014 |
| JP | 5801401 B2 | 10/2015 |
| JP | 5818773 B2 | 11/2015 |
| JP | 6332281 B2 | 5/2018 |
| KR | 10-2013-0139878 A | 12/2013 |
| PT | 2619622 T | 3/2019 |
| TR | 201903562 T4 | 3/2019 |
| WO | 2012/039877 A1 | 3/2012 |
| WO | 2019/0378338 A1 | 6/2015 |
| WO | 2015/173344 A1 | 11/2015 |
| WO | 2017/047178 A1 | 3/2017 |

OTHER PUBLICATIONS

Extended European Search Report of EP Application No. 18844770.0 dated Jul. 14, 2020, 10 pages.

Taiki Fukiage, et al. "Reduction of Contradictory Partial Occlusion in Mixed Reality by Using Characteristics of Transparency Perception", 2012 IEEE International Symposium on Mixed and Augmented Reality (ISMAR), Nov. 5, 2012, p. 129-139, IEEE Explore URL: https://ieeexplore.ieee.org/abstract/document/6402549.

\* cited by examiner

FIG.10

| | PROCESSING IN THREE-DIMENSIONAL VIRTUAL SPACE | | PROCESSING IN TWO-DIMENSIONAL DRAWING RESULT | |
|---|---|---|---|---|
| | PROCESSING ON SHIELDING MODEL | PROCESSING ON VIRTUAL OBJECT | PROCESSING ON SHIELDING MODEL REGION | PROCESSING ON VIRTUAL OBJECT REGION |
| OVERALL | 3D-C-A | 3D-V-A | 2D-C-A | 2D-V-A |
| PARTIAL | 3D-C-P | 3D-V-P | 2D-C-P | 2D-V-P |

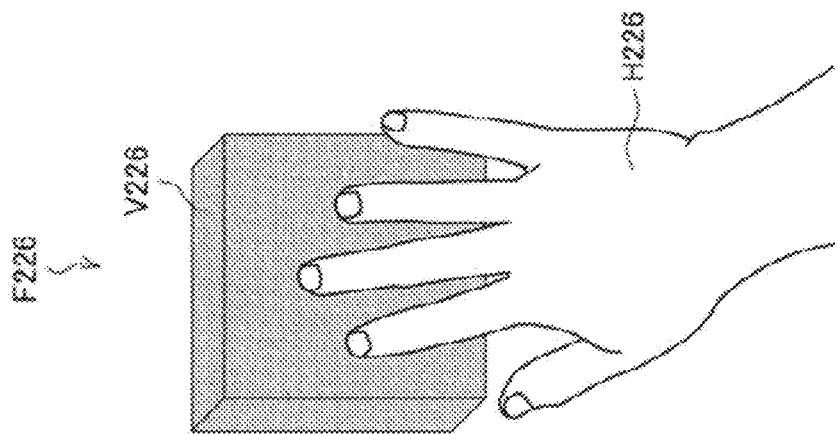
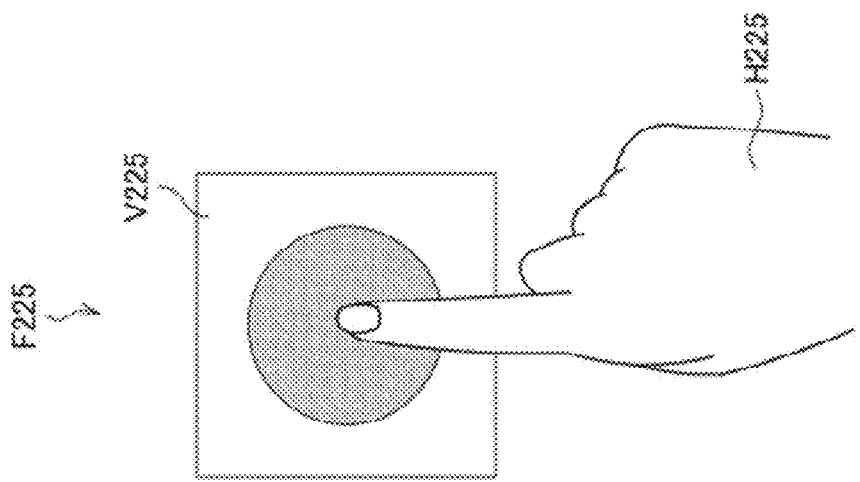
FIG.39

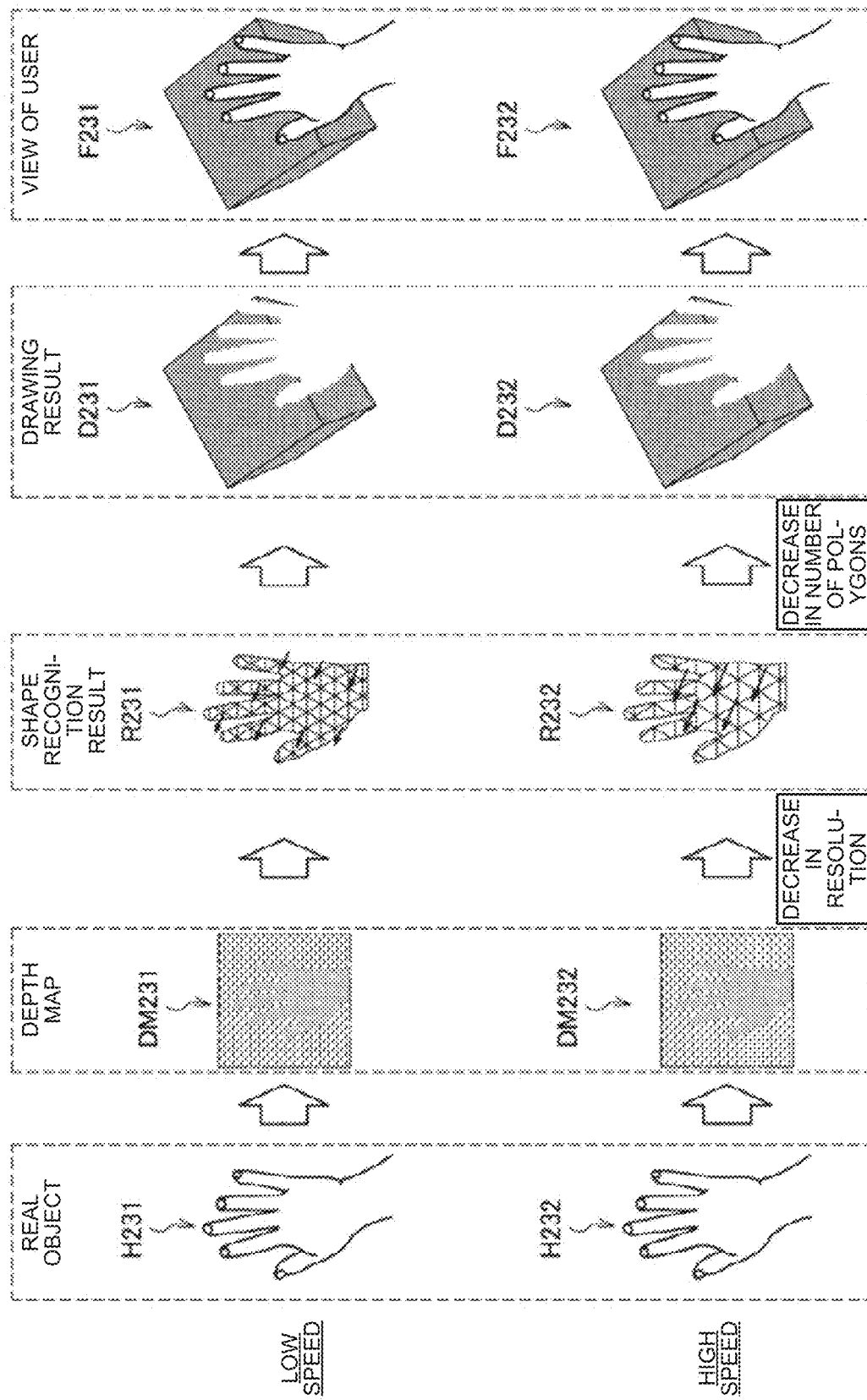

FIG.44

| PROCESSING MODE ACCORDING TO MOVING SPEED OF HAND | | STATIONARY | SUPERLOW SPEED | LOW SPEED | MEDIUM SPEED | HIGH SPEED | SUPERHIGH SPEED |
|---|---|---|---|---|---|---|---|
| INTERACTION EXAMPLE | | PINCH HOLD GRASP | PRESS WITH FINGER TOUCH | PINCH AND TURN GRASP AND TURN TWIST | PUSH WITH PALM OF HAND STROKE | HAND GESTURE (WAVE HAND/UI OPERATION) | HIT SLAP BRUSH OFF |
| RESOLUTION OF DEPTH MAP | 1: NORMAL RESOLUTION | 1 | 1/4 | 1/16 | — | — | — |
| OMISSION OF SHAPE RECOGNITION | ○: TO BE IMPLEMENTED ×: NOT TO BE IMPLEMENTED | × | × | × | ○ | ○ | ○ |
| OMISSION OF ANTEROPOSTERIOR DETERMINATION | ○: TO BE IMPLEMENTED DEPENDING ON TYPE OF VIRTUAL OBJECT ×: NOT TO BE IMPLEMENTED | × | × | ○ | ○ | ○ | ○ |
| REUSE OF DRAWING RESULT | ○: TO BE IMPLEMENTED ×: NOT TO BE IMPLEMENTED | × | × | × | × | ○ | ○ |
| CHANGE OF BOUNDARY REPRESENTATION | 1 TO 5: INTENSITY RELATED TO CHANGE OF REPRESENTATION | 1 | 2 | 2 | 3 | 3 | 5 |

INFORMATION PROCESSING DEVICE, AND INFORMATION PROCESSING METHOD

CROSS REFERENCE TO RELATED APPLICATIONS

This application is a U.S. National Phase of International Patent Application No. PCT/JP2018/018785 filed on May 15, 2018, which claims priority benefit of Japanese Patent Application No. JP 2017-154116 filed in the Japan Patent Office on Aug. 9, 2017. Each of the above-referenced applications is hereby incorporated herein by reference in its entirety.

FIELD

The present disclosure relates to an information processing device, an information processing method, and a program.

BACKGROUND

Head mounted displays (hereinafter, also referred to as "HMDs") including sensors have been developed in recent years. An HMD has a display that is positioned in front of the eyes of a user when the HMD is mounted on the user's head, and displays, for example, a virtual object in front of the user. Such HMDs include those with transmissive displays, and those with non-transmissive displays. An HMD having a transmissive display displays the virtual object superimposed on real space visible via the display.

Furthermore, disclosed in Patent Literature 1 cited below is a technique where a user having an HMD mounted thereon causes a camera included in the HMD to image (sense) various gestures by using a real object (for example, a hand of the user, or the like) and manipulates the HMD through gesture recognition.

CITATION LIST

Patent Literature

Patent Literature 1: JP 2014-186361 A

SUMMARY

Technical Problem

When a virtual object is caused to be displayed superimposed on real space as described above, displaying the virtual object such that the boundary between a real object that is present in the real space and the virtual object is appropriately represented enables a user to feel as if the virtual object is present in the real space. However, depending on the result of recognition based on sensing of the real object, for example, the boundary between the real object and the virtual object may be not appropriately represented, and the user may get a feeling of strangeness from the display of the virtual object.

Proposed through the present disclosure are an information processing device, an information processing method, and a program, which are able to lessen the feeling of strangeness given to a user.

Solution to Problem

According to the present disclosure, an information processing device is provided that includes: a display control unit that controls, when recognition information related to recognition based on sensing of a real object includes first recognition information, shielding display representing shielding of a virtual object by the real object such that the shielding display presents a first boundary representation at a boundary between the virtual object and the real object or at a position near the boundary, and that controls, when the recognition information includes second recognition information different from the first recognition information, the shielding display such that the shielding display presents a second boundary representation different from the first boundary representation at the boundary or at a position near the boundary.

Moreover, according to the present disclosure, an information processing method is provided that includes: a processor controlling, when recognition information related to recognition based on sensing of a real object includes first recognition information, shielding display representing shielding of a virtual object by the real object such that the shielding display presents a first boundary representation at a boundary between the virtual object and the real object or at a position near the boundary, and controlling, when the recognition information includes second recognition information different from the first recognition information, the shielding display such that the shielding display presents a second boundary representation different from the first boundary representation at the boundary or at a position near the boundary.

Moreover, according to the present disclosure, a program for causing a computer to realize functions is provided that includes: controlling, when recognition information related to recognition based on sensing of a real object includes first recognition information, shielding display representing shielding of a virtual object by the real object such that the shielding display presents a first boundary representation at a boundary between the virtual object and the real object or at a position near the boundary, and controlling, when the recognition information includes second recognition information different from the first recognition information, the shielding display such that the shielding display presents a second boundary representation different from the first boundary representation at the boundary or at a position near the boundary.

Advantageous Effects of Invention

As described above, according to the present disclosure, a feeling of strangeness given to a user is able to be lessened.

The above mentioned effect is not necessarily limiting, and together with the above mentioned effect, or instead of the above mentioned effect, any of effects disclosed in this specification or any other effect that is able to be perceived from this specification may be achieved.

BRIEF DESCRIPTION OF DRAWINGS

FIG. 10 is a table organized with respect to the processing performed for a boundary representation to be made different.

FIG. 39 is an explanatory diagram illustrating examples of interaction that is able to be appropriately displayed even if determination of an anteroposterior relation is omitted.

FIG. 43 is an explanatory diagram illustrating a modified example according to the same embodiment.

FIG. 44 is a table summarizing an example of operation when a processing mode is determined by classification into six levels.

DESCRIPTION OF EMBODIMENTS

Preferred embodiments of the present disclosure will hereinafter be described in detail, while reference is made to the appended drawings. Redundant description will be omitted by components being assigned with the same reference sign throughout the specification and drawings, the components having substantially the same functional configuration.

Furthermore, plural components having substantially the same functional configuration may be distinguished from one another by addition of different alphabets after the same reference sign, throughout the specification and drawings. However, if plural components having substantially the same functional configuration do not need to be distinguished from one another, only the same reference sign will be assigned to these components.

Description will be made in the following order.

Figure 1:
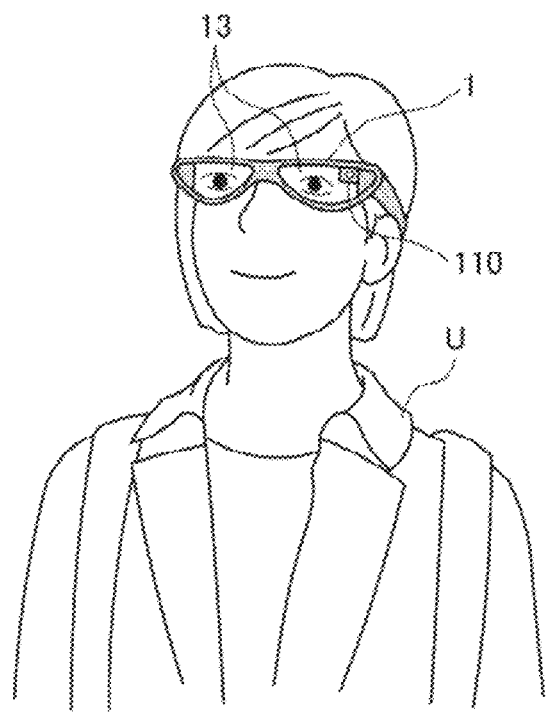
FIG. 1 is a diagram illustrating an outline of an information processing device 1 according to a first embodiment of the present disclosure.

1. First Embodiment 1-1. Outline
1-2. Configuration
1-3. Operation
1-4. Specific Examples of Boundary Representation
1-5. Modified Examples
1-6. Effects 2. Second Embodiment 2-1. Outline
2-2. Configuration
2-3. Operation
2-4. Modified Examples
2-5. Supplemental Description 3. Example of Hardware Configuration 4. Conclusion 1. First Embodiment 1-1. Outline Described first of all is an outline of an information processing device according to a first embodiment of the present disclosure. FIG. 1 is a diagram illustrating an outline of an information processing device 1 according to this embodiment. As illustrated in FIG. 1, the information processing device 1 according to this embodiment is realized by, for example, a spectacle-type head mounted display (HMD) mounted on the head of a user U. A display unit 13 corresponding to spectacle lenses positioned in front of the eyes of the user U when the HMD is mounted may be of a transmissive type or a non-transmissive type. The display unit 13 that is transmissive and described herein is defined as a display unit having optical transmissivity. The information processing device 1 is able to present a virtual object in the view of the user U by displaying the virtual object on the display unit 13. Furthermore, the HMD, which is an example of the information processing device 1, is not necessarily a display that presents an image to both eyes, but may be a display that presents an image to only one eye. For example, the HMD may be of a one-eye type provided with a display unit 13 that presents an image to one of the eyes.

Furthermore, the information processing device 1 is provided with an outward camera 110 that images in a sight direction of the user U, that is, the view of the user, when the information processing device 1 is mounted. Moreover, the information processing device 1 may be provided with any of various sensors, such as an inward camera that images the eyes of the user U when the information processing device 1 is mounted, and a microphone (hereinafter, referred to as the "mike"), although these are not illustrated in FIG. 1. Plural outward cameras 110 and plural inward cameras may be provided.

The form of the information processing device 1 is not limited to the example illustrated in FIG. 1. For example, the information processing device 1 may be a headband-type HMD (which is of the type where the HMD is mounted with a band that goes around the whole circumference of the head, or may be of the type provided with a band that passes, not only side portions of the head but also a top portion of the head), or a helmet-type HMD (where the visor of the helmet serves as a display).

When, for example, the display unit 13 is transmissive, a virtual object displayed on the display unit 13 is visually recognized by a user, with the virtual object overlapping the real space. Furthermore, for the user to feel as if the virtual object is present in the real space, the arrangement, shape, color, and the like of the virtual object may be controlled based on information on the real space, the information being acquired by imaging with the outward camera 110.

In a case where a user performs interaction with (manipulation or the like of) a virtual object, the user may perform the interaction with the virtual object by using a real object, for example, the user's hand. In this case, if the boundary between the virtual object and the real object is not appropriately represented, the user may get a feeling of strangeness. As illustrated in FIG. 1, the display unit 13 displaying thereon a virtual object is positioned in front of the eyes of a user, and thus if the virtual object is arranged in the real space as if a real object is present between the virtual object and the eyes of the user, a part of the virtual object displayed on the display unit 13 is desirably shielded appropriately.

Figure 2:
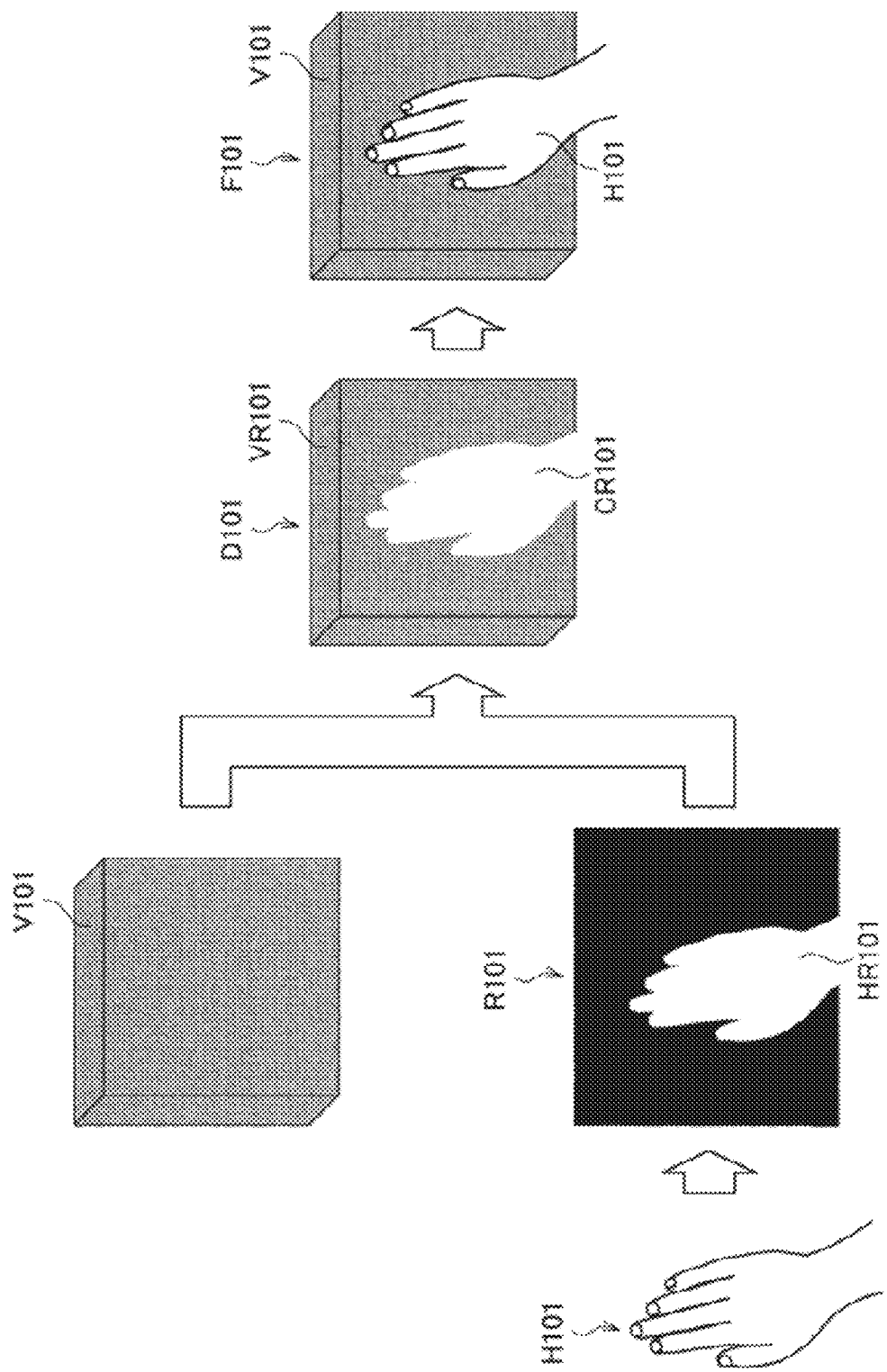
FIG. 2 is an explanatory diagram illustrating shielding of a virtual object.

FIG. 2 is an explanatory diagram illustrating shielding of a virtual object. It is now supposed that a virtual object V101 as illustrated in FIG. 2 is displayed on the display unit 13. If the virtual object V101 is displayed as is on the display unit 13, since the display unit 13 is positioned in front of the eyes of a user as described above, the virtual object V101 may be visually recognized by the user as if the virtual object V101 covers the user's hand H101 that is a real object present between the virtual object V101 and the eyes of the user. In this case, the user will not know whether the virtual object V101 is present on a nearer side of the hand H101 (toward the eyes of the user) or is present on a farther side of the hand H101, and the user may thus get a feeling of strangeness.

A region of the virtual object V101 is thus shielded, the region being visually recognized by the user as overlapping the hand H101. For example, based on a captured image acquired by sensing (imaging) of the hand H101 by the outward camera 110, recognition of a hand region present at a nearer side (more toward the eyes of the user) than the virtual object V101 is performed, and a hand region recognition result R101 is thereby acquired. The hand region recognition result R101 illustrated in FIG. 2 represents a region where a white hand region HR101 has been recognized as a real object that is present at a nearer side than the virtual object V101. When drawing is performed such that the virtual object V101 is shielded by use of the hand region recognition result R101, a drawing result D101 is acquired. In the drawing result D101 illustrated in FIG. 2: a white region represents a region where drawing is not performed; and in the drawing result D101, a virtual object region VR101 has been drawn with a portion thereof being shielded, the portion being at a shielding region CR101 corresponding to the hand region HR101, and the shielding region CR101 does not have the virtual object drawn therein.

By display on the display unit 13 being performed based on the drawing result D101, the view of the user through the display unit 13 becomes like a view F101 illustrated in FIG. 2. By display according to recognition based on sensing of a real object as described above, proper understanding of the positional relation between the virtual object V101 and the hand H101 by the user is facilitated.

The hand of the user used by the user in manipulation has been described above as an example of a real object; but similar processing is possible for a real object other than a hand or other than a real object used in manipulation, and the positional relation between the real object and a virtual object is able to be presented to a user appropriately.

However, depending on the result of recognition based on sensing of a real object, the boundary between the real object and a virtual object may be not appropriately represented, and a user may get a feeling of strangeness from display of the virtual object. For example, if accuracy related to the recognition is low, the boundary from the virtual object may be not appropriately represented, and the user may get a feeling of strangeness from the display of the virtual object.

Figure 3:
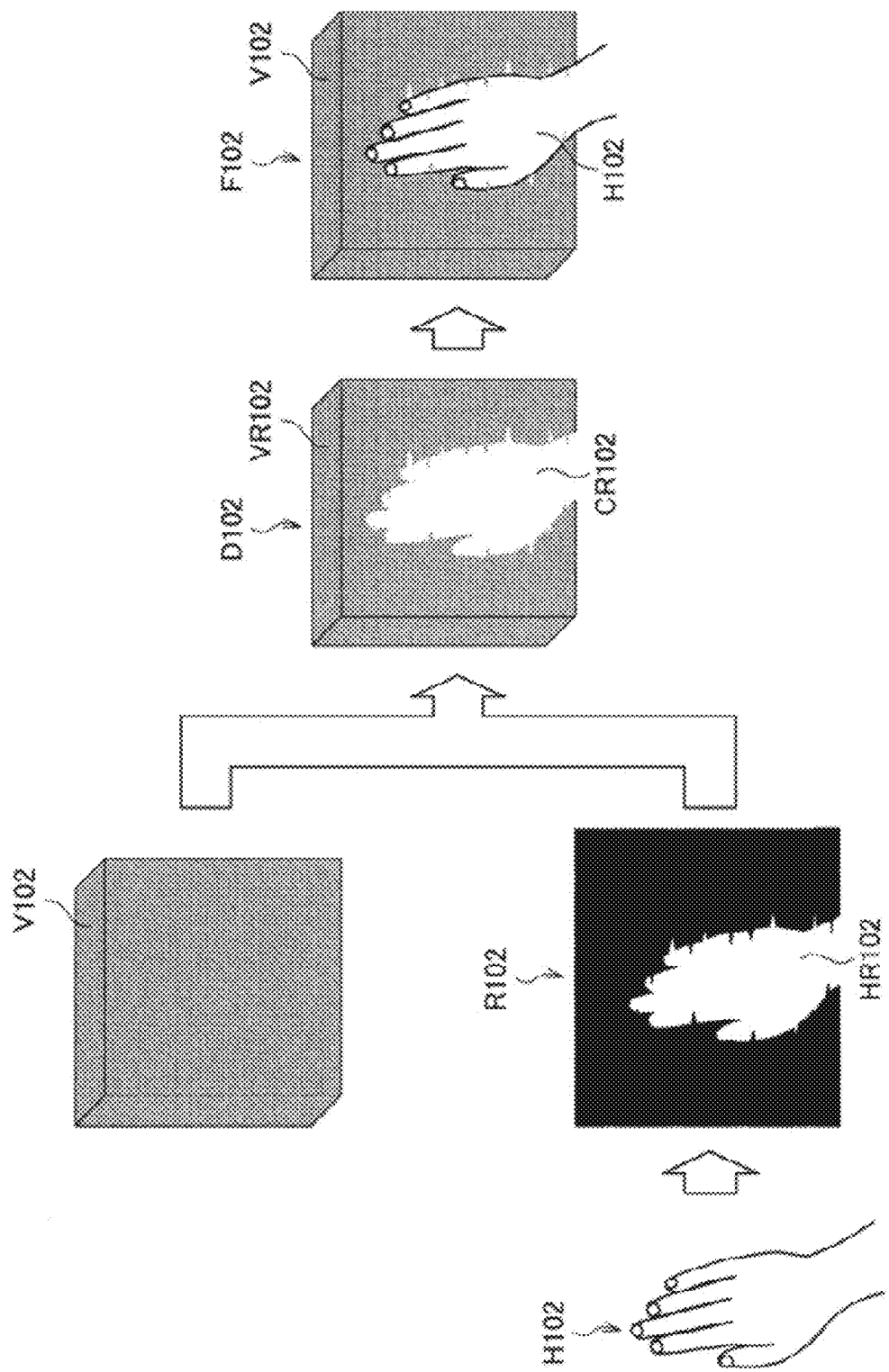
FIG. 3 is an explanatory diagram illustrating a display example in a case where accuracy related to recognition is low.

FIG. 3 is an explanatory diagram illustrating a display example in a case where accuracy related to recognition is low. In the example illustrated in FIG. 3, accuracy of a hand region recognition result R102 acquired as a result of recognition based on sensing of a hand H102 is lower than the accuracy of the hand region recognition result R101 illustrated in FIG. 2, and the boundary of a hand region HR102 includes noise. There are various causes of reduction in accuracy; for example, accuracy related to recognition may be reduced depending on, for example, the brightness of the surrounding environment and the distance between the real object and the outward camera 110; and noise may be generated such that, for example, the boundary becomes jagged or has unevenness.

If drawing is performed such that a virtual object V102 is shielded by use of this hand region recognition result R102 low in accuracy, in a drawing result D102 acquired thereby also, the boundary between a virtual object region VR102 and a shielding region CR102 includes noise. When display is performed based on this drawing result D102, influence of the noise is also seen in a view F102 of the user. As a result, the user may get a feeling of strangeness from the boundary between the virtual object V102 and the user's hand H102 that is a real object.

Furthermore, the boundary between the real object and the virtual object may be not represented appropriately due to movement of the real object also, and the user may get a feeling of strangeness from the display of the virtual object. For example, when the moving speed of a real object is high, the boundary between the real object and a virtual object may be not represented appropriately.

Figure 4:
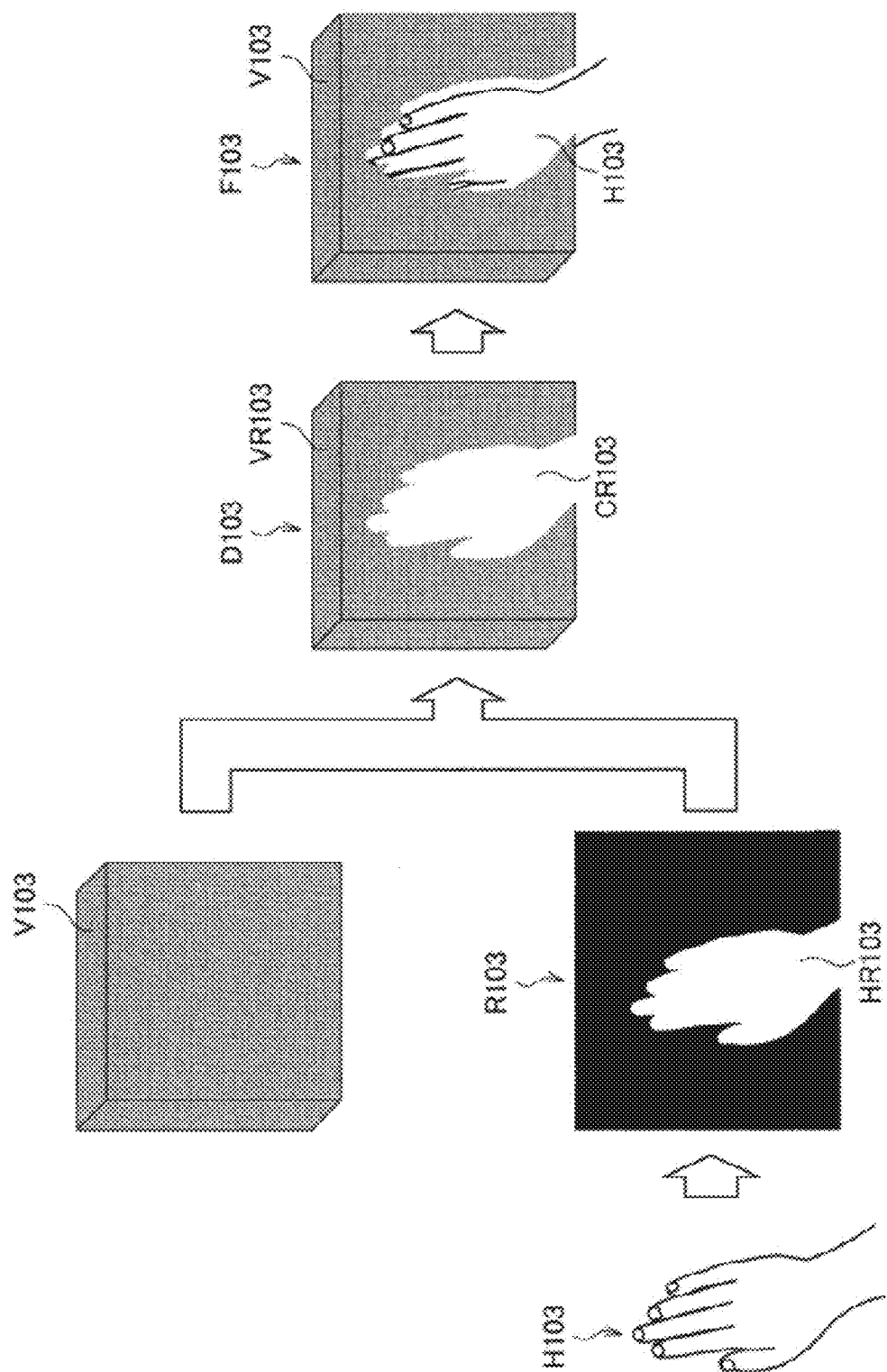
FIG. 4 is an explanatory diagram illustrating a display example in a case where a real object is high in moving speed.

FIG. 4 is an explanatory diagram illustrating a display example in a case where a real object is high in moving speed. In the example illustrated in FIG. 4, accuracy of a hand region recognition result R103 acquired as a result of recognition based on sensing of a hand H103 does not have any problem in particular. When drawing is performed such that a virtual object V103 is shielded by use of the hand region recognition result R103, a drawing result D103 including a virtual object region VR103 shielded by a shielding region CR103 is acquired.

When the moving speed of the hand H103 that is a real object is high, the position of the hand H103 may largely move while processing related to the above described recognition and drawing is being performed. As a result, by the time display is performed based on the drawing result D103, the hand H103 has moved largely from the position at the time of sensing, and in a view F103 of the user, the boundary between the virtual object V103 and the hand H102 of the user has become unnatural. As a result, the user may get a feeling of strangeness from the boundary between the virtual object V103 and the user's hand H103 that is a real object.

The user's view F102 influenced by the noise associated with the reduction in the accuracy of the recognition as illustrated in FIG. 3, and the user's view F103 influenced by the movement of the hand H103 as illustrated in FIG. 4 may give a feeling of strangeness to the users in terms of the following two points, for example. The first point is that the virtual object is visible in a region where the user's hand (real object) is supposed to be visible. The second point is that nothing is displayed in a region where the virtual object is supposed to be visible, and the background real space is visible. The feeling of strangeness in terms of these two points in the case of the user's view F103 illustrated in FIG. 4 will now be specifically described as an example by reference to FIG. 5.

Figure 5:
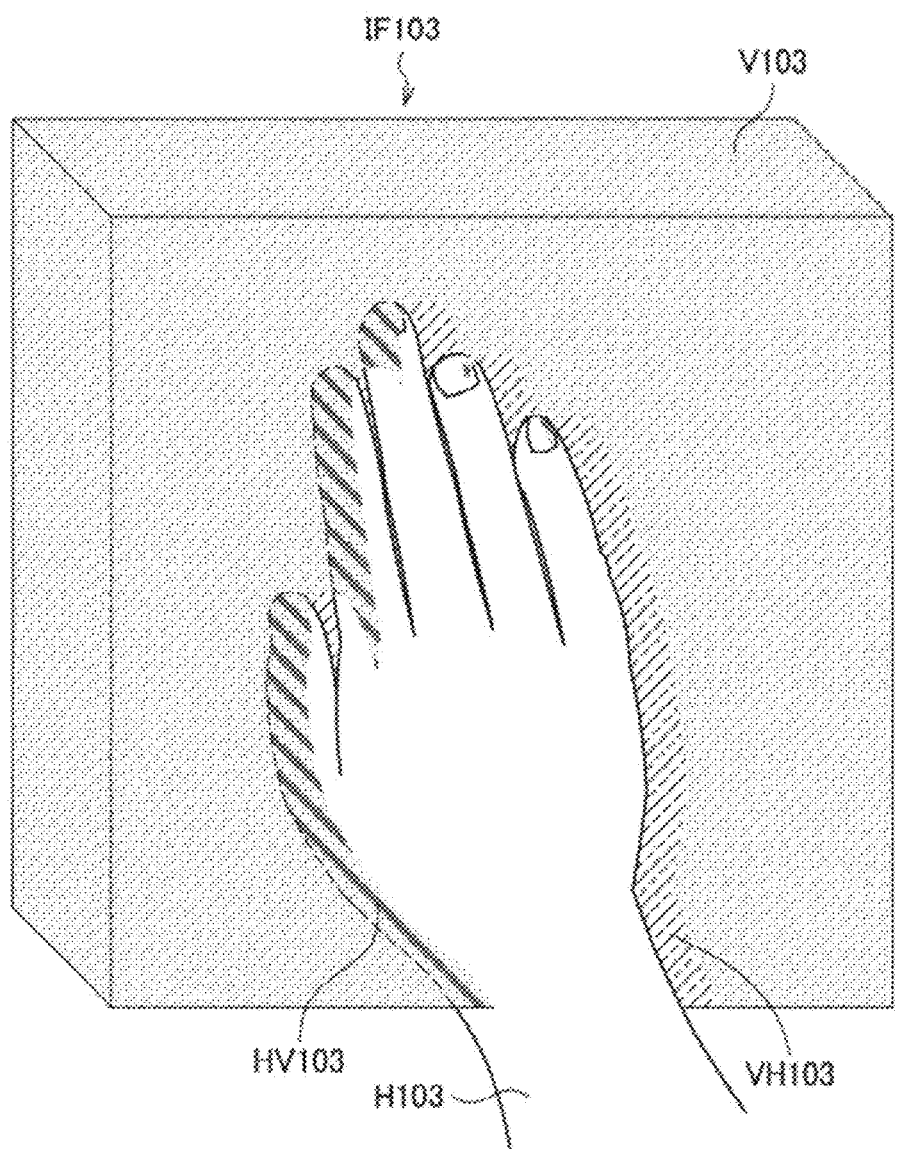
FIG. 5 is an explanatory diagram illustrating unnaturalness of the boundary between a virtual body and the real object.

FIG. 5 is an explanatory diagram illustrating unnaturalness of the boundary between the virtual object V103 and the user's hand H103 in the user's view F103 illustrated in FIG. 4. FIG. 5 illustrates an imagery diagram IF103 having regions in the user's view F103 illustrated in FIG. 4, the regions having been classified for explanation. In the imagery diagram IF103, a region HV103 and a region VH103 are respectively illustrated with different hatching representations. The region HV103 represents a region where the user's hand H103 is supposed to be visible but the virtual object V103 is visible instead. The region VH103, on the other hand, represents a region where the virtual object V103 is supposed to be visible but the background real space is visible instead. FIG. 5 illustrates the region HV103 and the region VH103 in the user's view F103 illustrated in FIG. 4 as an example, but in the user's view F102 illustrated in FIG. 3 also, two types of regions having difference from an ideal view are similarly present.

By these two types of regions being present, the two types of regions having difference from an ideal view, the user may get a feeling of strangeness from the boundary between the virtual object and the real object. The information processing device 1 according to this embodiment thus lessens a feeling of strangeness given to a user by controlling display such that a boundary representation between a virtual object and a real object differs according to recognition information related to recognition based on sensing of the real object. Described hereinafter in detail is an example of a configuration of the information processing device 1 according to this embodiment, the information processing device 1 having the above described effect.

1-2. Configuration

Figure 6:
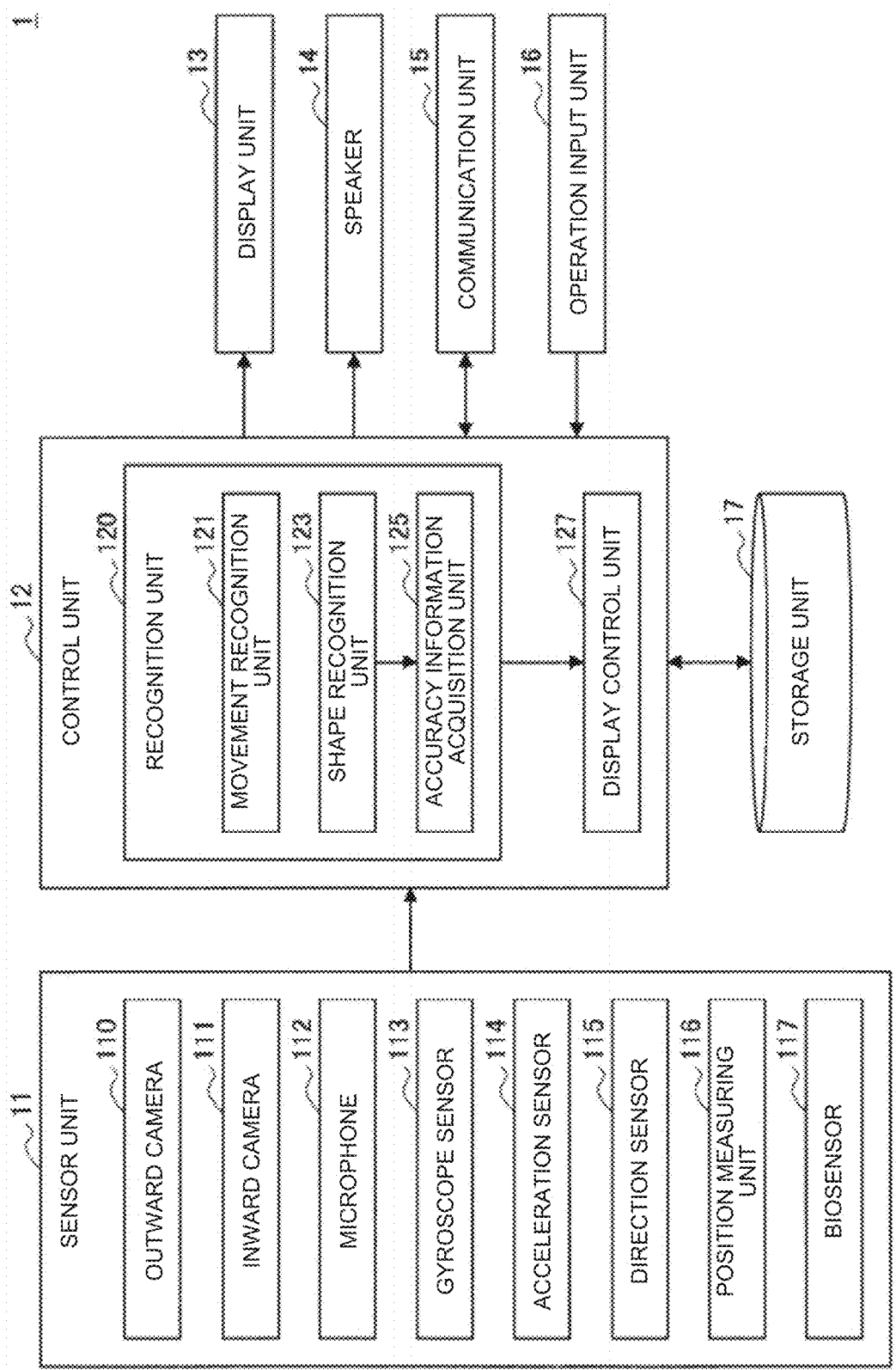
FIG. 6 is a block diagram illustrating an example of a configuration of the information processing device 1 according to the same embodiment.

FIG. 6 is a block diagram illustrating an example of the configuration of the information processing device 1 according to this embodiment. As illustrated in FIG. 6, the information processing device 1 has a sensor unit 11, a control unit 12, a display unit 13, a speaker 14, a communication unit 15, an operation input unit 16, and a storage unit 17.

Sensor Unit 11

The sensor unit 11 has a function of acquiring (sensing) various types of information related to a user or a surrounding environment. For example, the sensor unit 11 includes the outward camera 110, an inward camera 111, a mike 112, a gyroscope sensor 113, an acceleration sensor 114, a direction sensor 115, a position measuring unit 116, and a biosensor 117. The specific example of the sensor unit 11 mentioned herein is just an example, and this embodiment is not limited to this example. Furthermore, a plural number of each of these sensors may be provided.

Each of the outward camera 110 and the inward camera 111 has: a lens system formed of an imaging lens, a diaphragm, a zooming lens, a focusing lens, and the like; a drive system that causes the lens system to perform focusing operation and zooming operation; a solid-state image sensing device array that generates an imaging signal by photoelectrically converting imaging light acquired by the lens system; and the like. The solid-state image sensing device array may be realized by, for example, a charge coupled device (CCD) sensor array or a complementary metal oxide semiconductor (CMOS) sensor array.

In this embodiment, the angle of view and the orientation of the outward camera 110 are desirably set such that the outward camera 110 images a region corresponding to the view of a user in real space. Furthermore, plural outward cameras 110 may be provided. Moreover, the outward camera 110 may include a depth camera that is able to acquire a depth map by sensing.

The mike 112 acquires sound from a user and surrounding environmental sound, and outputs the acquired sound and surrounding environmental sound as sound data, to the control unit 12.

The gyroscope sensor 113 is realized by, for example, a triaxial gyroscope sensor, and detects angular velocity (rotating velocity).

The acceleration sensor 114 is realized by, for example, a triaxial acceleration sensor (also referred to as a G sensor), and detects acceleration at the time of movement.

The direction sensor 115 is realized by, for example, a triaxial geomagnetic sensor (compass), and detects an absolute direction (a direction).

The position measuring unit 116 has a function of detecting the current position of the information processing device 1 based on a signal acquired from outside. Specifically, for example, the position measuring unit 116 is realized by a global positioning system position measuring unit, detects the position where the information processing device 1 is present by receiving radio waves from a GPS satellite, and outputs information on the position detected, to the control unit 12. Furthermore, the position measuring unit 116 may detect the position by, for example: transmission and reception through, instead of the GPS, Wi-Fi (registered trademark), Bluetooth (registered trademark), a cellular phone, a PHS, a smartphone, or the like; short-range communication; or the like.

The biosensor 117 detects biological information of a user. Specifically, for example, heart beats, body temperature, perspiration, blood pressure, pulses, respiration, blinking, eye movement, staring time, pupil diameter, blood pressure, brain waves, body motion, body posture, skin temperature, electric skin resistance, microvibration (MV), myogenic potential, and/or blood oxygen saturation level (SPO2) may be detected.

Control Unit 12

The control unit 12 functions as an arithmetic processing device and a control device, and controls the overall operation in the information processing device 1 according to various programs. Furthermore, the control unit 12 according to this embodiment functions as a recognition unit 120 and a display control unit 127, as illustrated in FIG. 6.

The recognition unit 120 has a function of performing recognition (including detection) of information related to a user or information related to the surrounding situation, based on various types of sensor information sensed by the sensor unit 11. The recognition unit 120 may recognize various types of information, and for example, based on a captured image acquired by imaging (an example of sensing) by the outward camera 110, the recognition unit 120 may three-dimensionally recognize the real space surrounding a user, and further perform recognition related to a real object that is present in the real space. If the outward camera 110 includes plural cameras, for example, the three-dimensional recognition of the real space may be performed by use of a depth map acquired by stereo matching of plural captured images acquired by the plural cameras. Furthermore, based on time-series captured images, the three-dimensional recognition of the real space may be performed by association of feature points detected from the captured images among frames. Moreover, if the outward camera 110 includes a depth camera, the three-dimensional recognition of the real space may be performed based on a range image acquired through sensing by the depth camera.

As described above, the recognition unit 120 may recognize various types of information, and in particular, the recognition unit 120 according to this embodiment has functions as a movement recognition unit 121, a shape recognition unit 123, and an accuracy information acquisition unit 125.

Based on sensing of a real object, the movement recognition unit 121 performs movement recognition related to movement of the real object. For example, based on a captured image acquired by sensing of a real object, the movement recognition unit 121 may recognize the centroid position of the real object and movement of the posture.

The movement recognition unit 121 recognizes the centroid position recognized and the movement of the posture between frames, and provides recognition information related to the recognition of the movement, the recognition information being information on the moving speed of the real object determined by the recognition of the movement, to the display control unit 127.

Based on sensing of a real object, the shape recognition unit 123 performs shape recognition for recognizing the three-dimensional shape of the real object. Furthermore, simultaneously with the shape recognition, the shape recognition unit 123 may recognize the position and posture of the real object. The movement recognition unit 121 and the shape recognition unit 123 according to this embodiment may share information related to the recognition of position and posture, and a result recognized by either one of the movement recognition unit 121 and the shape recognition unit 123 may be provided to the other one of the movement recognition unit 121 and the shape recognition unit 123. For example, based on the position and posture of a real object recognized by the shape recognition unit 123, the movement recognition unit 121 may perform recognition of movement of the real object.

Based on the recognized three-dimensional shape of the real object, the shape recognition unit 123 generates a three-dimensional model represented by three-dimensional columns of vertices and sides, and provides the three-dimensional model serving as shape information, to the display control unit 127. As described later, the three-dimensional model of the real object generated by the shape recognition unit 123 is used by the display control unit 127 to perform drawing for shielding of a virtual object. Therefore, hereinafter, the three-dimensional model may be referred to as a shielding model.

Based on the chronological change of sensing data (for example, captured images and range images) acquired by the outward camera 110, the shape recognition unit 123 may predict change (movement) of the three-dimensional shape of the real object. Based on the prediction, the shape recognition unit 123 may correct the three-dimensional shape of the real object and generate a corrected three-dimensional model. For example, by performing prediction in consideration of the processing time period taken for recognition by the recognition unit 120, drawing by the display control unit 127, and the like, the shape recognition unit 123 may generate a corrected three-dimensional model corresponding to the real object at the time of display based on sensing. Display based on the corrected three-dimensional model through this configuration enables lessening of the feeling of strangeness associated with the movement of the real object as described by reference to FIG. 4 and FIG. 5.

When the real object is a hand, since movement of the fingers is not fast as compared to movement of the whole hand, if only the fingers are moving, such prediction tends to be correct, and the feeling of strangeness associated with the movement of the fingers is able to be lessened. When the whole hand is moving at high speed, the feeling of strangeness associated with the movement of the whole hand is able to be lessened by later described processing based on movement information acquired by the movement recognition unit 121. Simultaneous movement of both a hand and the fingers at high speed rarely occurs.

The accuracy information acquisition unit 125 acquires information on recognition accuracy related to shape recognition by the shape recognition unit 123. For example, the accuracy information acquisition unit 125 may acquire a recognition accuracy by determining the recognition accuracy, based on reliability of recognition performed by the shape recognition unit 123, and reliability, error, or accuracy related to sensing data estimated from the sensing data acquired by the sensor unit 11 including the outward camera 110.

For example, when the shape recognition unit 123 performs shape recognition based on a depth map acquired by stereo matching, information on recognition accuracy may be determined by use of information on a matching score in the stereo matching, the information serving as a reliability.

Furthermore, if the outward camera 110 includes a depth camera, information on recognition accuracy may be acquired based on reliability related to sensing data output by the depth camera.

Furthermore, the error and accuracy of the sensing data may be estimated by various methods. For example, the accuracy information acquisition unit 125 may calculate dispersion of sensing data corresponding to a predetermined time period in the past, and if the dispersion is large or if there has been a large change in the dispersion, the accuracy information acquisition unit 125 may estimate the error to be large (the accuracy to be low). As a result of acquisition of information on recognition accuracy based on the error in or accuracy of the sensing data, the recognition accuracy reflects the accuracy of recognition.

Recognition accuracy may be determined by use of the above described reliability and error or accuracy alone or in combination. Furthermore, the method of determining the recognition accuracy by the accuracy information acquisition unit 125 is not limited to the one described above, and the recognition accuracy may be determined by any of various methods according to the sensing data acquired or the method of recognition performed by the recognition unit 120.

The accuracy information acquisition unit 125 provides information on the recognition accuracy acquired, to the display control unit 127, the information serving as recognition information related to shape recognition.

The display control unit 127 controls display on the display unit 13. For example, the display control unit 127 displays a virtual object on the display unit 13, such that the virtual object is visible simultaneously with the real space. The display control unit 127 may, for example, acquire information related to the virtual object from the storage unit 17, or acquire the information from another device via the communication unit 15.

Furthermore, as described by reference to FIG. 2, the display control unit 127 according to this embodiment controls display such that the virtual object is shielded, by using a shielding model that is an example of shape information acquired by shape recognition by the shape recognition unit 123.

Figure 7:
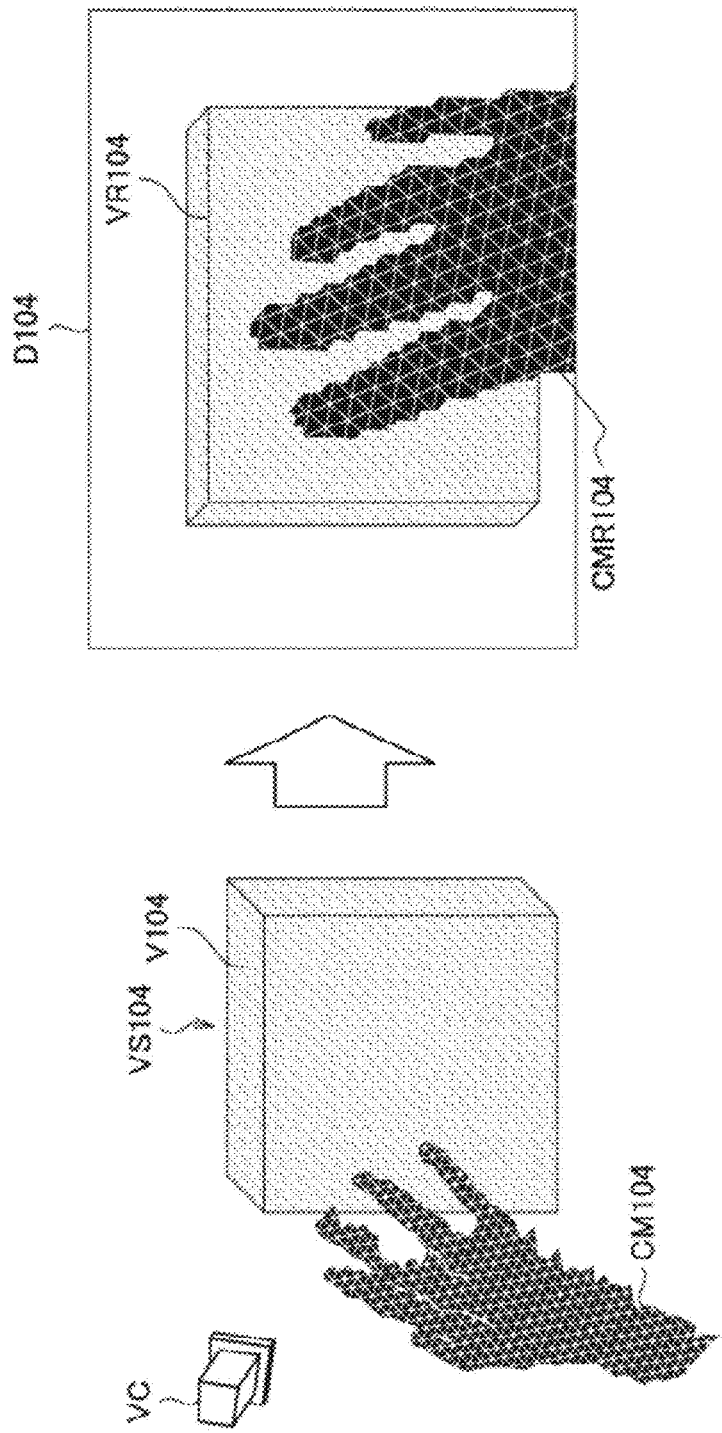
FIG. 7 is an explanatory diagram illustrating shielding of a virtual object by use of a shielding model by a display control unit 127 according to the same embodiment.

FIG. 7 is an explanatory diagram illustrating shielding of a virtual object by use of a shielding model by the display control unit 127. The display control unit 127 arranges a virtual object V104 and a shielding model CM104 in a three-dimensional virtual space VS104 as illustrated in FIG. 7. Furthermore, the display control unit 127 acquires a two-dimensional drawing result D104 by performing drawing at a virtual view point VC that is a virtual camera, in the virtual space VS104. The drawing result D104 includes a virtual object region VR104 and a shielding model region CMR104. The display control unit 127 shields the virtual object V104 by controlling display on the display unit 13, such that nothing is displayed in the shielding model region CMR104 serving as a shielding region described by reference to FIG. 2 and the like, for example. This configuration realizes display that allows a user to easily understand the positional relation between a virtual object and a real object appropriately as described by reference to FIG. 2.

However, as described by reference to FIG. 3 to FIG. 5, due to the influence of recognition accuracy and movement of the real object, the boundary between the virtual object and the real object may be not appropriately represented by the above described display method and a user may get a feeling of strangeness therefrom. The display control unit 127 according to this embodiment thus controls display on the display unit 13, such that a boundary representation between a virtual object and a real object differs according to recognition information related to recognition based on sensing of the real object. The recognition information used by the display control unit 127 may include information on the moving speed of the real object provided from the movement recognition unit 121, and information on recognition accuracy related to shape recognition provided from the accuracy information acquisition unit 125, as described above. Furthermore, the recognition information may be regarded as including first recognition information or second recognition information different from the first recognition information, according to recognition based on sensing of the real object.

A boundary representation according to this specification means a representation related to the boundary between a real object and a virtual object in the view of a user, or a representation related to a position near the boundary (a boundary region). Furthermore, making a boundary representation different or changing a boundary representation includes, in addition to making the display format or the like different, not displaying. According to this specification, making a boundary representation different may be regarded as making the boundary representation a first boundary representation or a second boundary representation different from the first boundary representation. Moreover, according to this specification, changing a boundary representation may be regarded as changing the boundary representation between the first boundary representation and the second boundary representation. When the display unit 13 is of the transmissive type, not displaying means that the real space is visible through the transmissive display unit 13. In addition, a boundary representation may be regarded as a representation related to shielding display representing shielding of a virtual object by a real object.

Figure 8:
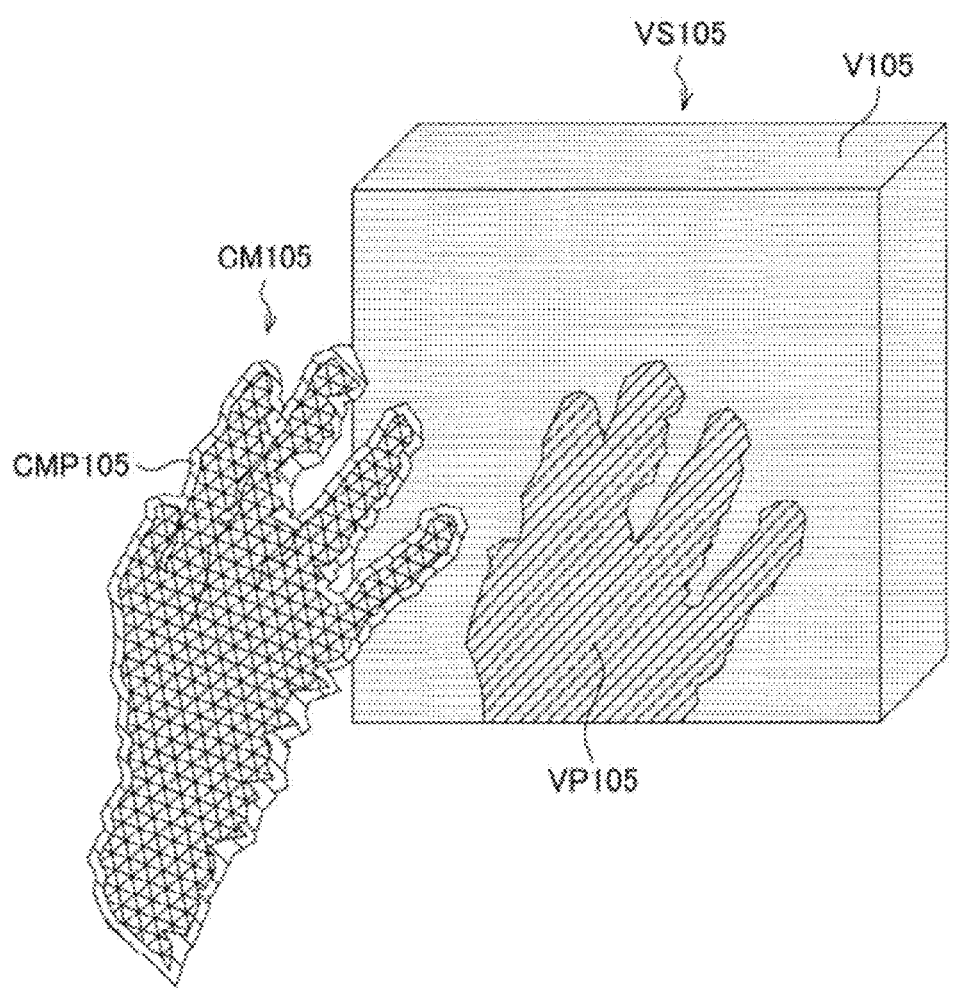
FIG. 8 is an explanatory diagram illustrating an example of processing that may be performed in a three-dimensional virtual space for a boundary representation to be made different.
Figure 9:
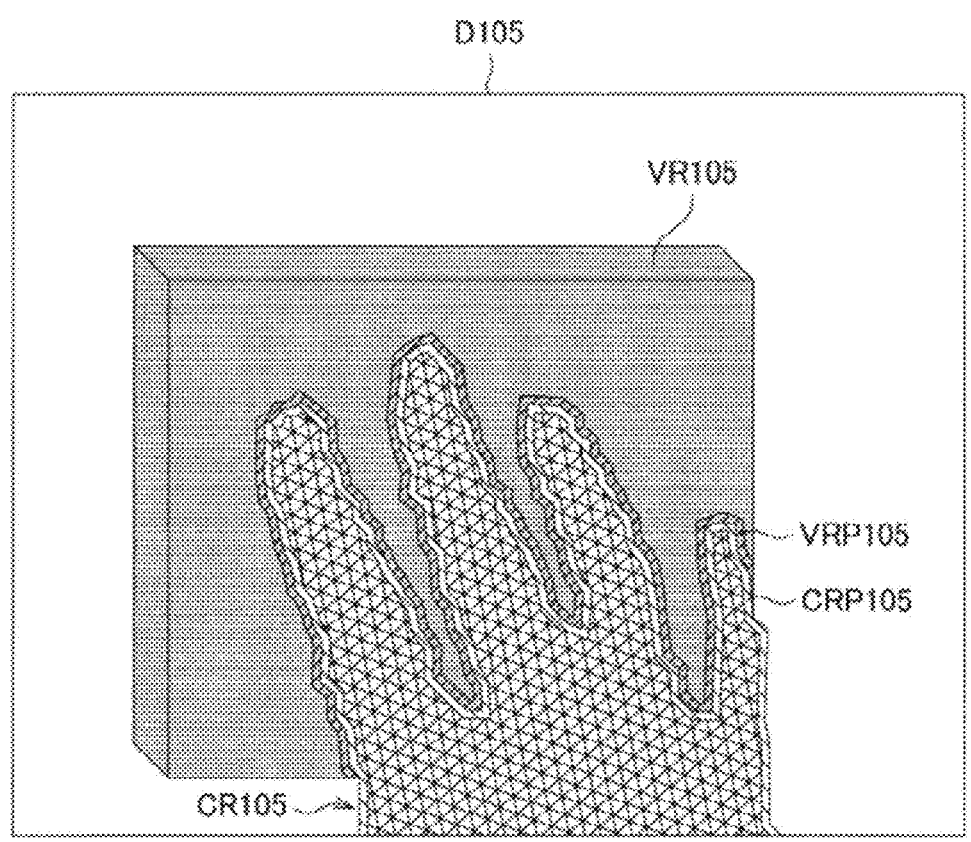
FIG. 9 is an explanatory diagram illustrating an example of processing that may be performed on a two-dimensional drawing result for a boundary representation to be made different.

Described below while reference is made to FIG. 8 to FIG. 10 is an example of processing performed by the display control unit 127, the processing being for a boundary representation to be made different. FIG. 8 is an explanatory diagram illustrating an example of processing that may be performed in a three-dimensional virtual space, for a boundary representation to be made different. FIG. 9 is an explanatory diagram illustrating an example of processing that may be performed in a two-dimensional drawing result for a boundary representation to be made different. FIG. 10 is a table organized with respect to the processing that may be performed for a boundary representation to be made different.

For example, to make a boundary representation different, the display control unit 127 may perform processing on the whole shielding model CM105 for shielding, in a three-dimensional virtual space VS105 illustrated in FIG. 8. For example, the display control unit 127 may make a boundary representation different by changing the color of the whole shielding model CM105 from a color for shielding, to a color closer to that of a real object (for example, a hand). In the following description, such processing on the whole shielding model in a three-dimensional virtual space may be called processing 3D-C-A, as illustrated in FIG. 10.

Furthermore, to make a boundary representation different, the display control unit 127 may perform processing on a part of the shielding model CM105, in the three-dimensional virtual space VS105 illustrated in FIG. 8. For example, the display control unit 127 may make a boundary representation different by increasing the transmissivity of a contour portion CMP105 of the shielding model CM105. Moreover, the display control unit 127 may make a boundary representation different by expanding the contour portion CMP105 of the shielding model CM105. In addition, the display control unit 127 may make a boundary representation different by adding effect display (which may hereinafter be simply referred to as an effect) to the contour portion CMP105 of the shielding model CM105. In the following description, such processing on a part of a shielding model in a three-dimensional virtual space may be called processing 3D-C-P, as illustrated in FIG. 10.

Furthermore, to make a boundary representation different, the display control unit 127 may perform processing on the whole virtual object V105 to be shielded, in the three-dimensional virtual space VS105 illustrated in FIG. 8. For example, the display control unit 127 may make a boundary representation different by reducing the brightness of the whole virtual object V105. In the following description, such processing on the whole virtual object in a three-dimensional virtual space may be called processing 3D-V-A, as illustrated in FIG. 10.

Furthermore, to make a boundary representation different, the display control unit 127 may perform processing on a part of the virtual object V105, in the three-dimensional virtual space VS105 illustrated in FIG. 8. For example, the display control unit 127 may make a boundary representation different by setting a shadow VP105 close to the color of a real object (for example, a hand), in a part of the virtual object V105. In the following description, such processing on a part of a virtual object in a three-dimensional virtual space may be called processing 3D-V-P, as illustrated in FIG. 10.

Furthermore, to make a boundary representation different, the display control unit 127 may perform processing on the whole shielding model region CMR105 for shielding, in a two-dimensional drawing result D105 illustrated in FIG. 9. For example, the display control unit 127 may make a boundary representation different by changing the color of the whole shielding model region CMR105 from a color for shielding, to a color close to that of a real object (for example, a hand). In the following description, such processing on the whole shielding model region in a two-dimensional drawing result may be called processing 2D-C-A, as illustrated in FIG. 10.

Furthermore, to make a boundary representation different, the display control unit 127 may perform processing on a part of the shielding model region CMR105, in the two-dimensional drawing result D105 illustrated in FIG. 9. For example, the display control unit 127 may make a boundary representation different by increasing transmissivity of the contour portion CMP105 of the shielding model region CMR105 or performing blending by blurring the contour portion CMP105. In the following description, such processing on a part of a shielding model region in a two-dimensional drawing result may be called processing 2D-C-P, as illustrated in FIG. 10.

Furthermore, to make a boundary representation different, the display control unit 127 may perform processing on the whole virtual object region VR105 to be shielded, in the two-dimensional drawing result D105 illustrated in FIG. 9. For example, the display control unit 127 may make a boundary representation different by reducing the brightness of the whole virtual object region VR105. In the following description, such processing on the whole virtual object region in a two-dimensional drawing result may be called processing 2D-V-A, as illustrated in FIG. 10.

Furthermore, to make a boundary representation different, the display control unit 127 may perform processing on a part of the virtual object region VR105, in the two-dimensional drawing result D105 illustrated in FIG. 9. For example, the display control unit 127 may make a boundary representation different by making only a region VRP105 of the virtual object region VR105 closer to the color of a real object (for example, a hand), the region VRP105 being near the boundary between the virtual object region VR105 and the shielding model region CMR105. In the following description, such processing on a part of a virtual object region in a two-dimensional drawing result may be called processing 2D-V-P, as illustrated in FIG. 10.

The above described eight kinds of processing performed by the display control unit 127 may each be performed alone or may be performed in combination, the eight kinds of processing being the processing 3D-C-A, processing 3D-C-P, the processing 3D-V-A, the processing 3D-V-P, the processing 2D-C-A, the processing 2D-C-P, the processing 2D-V-A, and the processing 2D-V-P. By performing the above described kinds of processing alone or in combination, the display control unit 127 is able to make a boundary representation different variously. Furthermore, by performing the above described kinds of processing alone or in combination, the display control unit 127 draws an image to be displayed on the display unit 13, and displays the drawn image on the display unit 13.

Specific examples of a boundary representation will be described later by reference to FIG. 12 to FIG. 23.

Display Unit 13

By reference back to FIG. 6, description will be continued. The display unit 13 is realized by, for example: a lens unit (an example of a transmissive display unit) that performs display by use of a holographic optical technique; a liquid crystal display (LCD) device; an organic light emitting diode (OLED) device; or the like. Furthermore, the display unit 13 may be transmissive, semi-transmissive, or non-transmissive.

Speaker 14

The speaker 14 reproduces a sound signal according to control by the control unit 12.

Communication Unit 15

The communication unit 15 is a communication module for transmitting and receiving data to and from another device wiredly/wirelessly. The communication unit 15 communicates with an external device directly or wirelessly via a network access point through, for example, a wired local area network (LAN), a wireless LAN, Wireless Fidelity (Wi-Fi) (registered trademark), infrared communication, Bluetooth (registered trademark), or short-range/non-contact communication.

Operation Input Unit 16

The operation input unit 16 is realized by an operating member having a physical structure, such as a switch, a button, or a lever.

Storage Unit 17

The storage unit 17 stores therein programs and parameters for the above described control unit 12 to execute functions. For example, the storage unit 17 may have, stored therein, information related to a virtual object to be displayed by the display control unit 127.

Hereinbefore, the configuration of the information processing device 1 according to this embodiment has been described specifically, but the configuration of the information processing device 1 according to this embodiment is not limited to the example illustrated in FIG. 6. For example, at least a part of functions that the control unit 12 of the information processing device 1 has may be present in another device connected via the communication unit 15.

1-3. Operation

Figure 11:
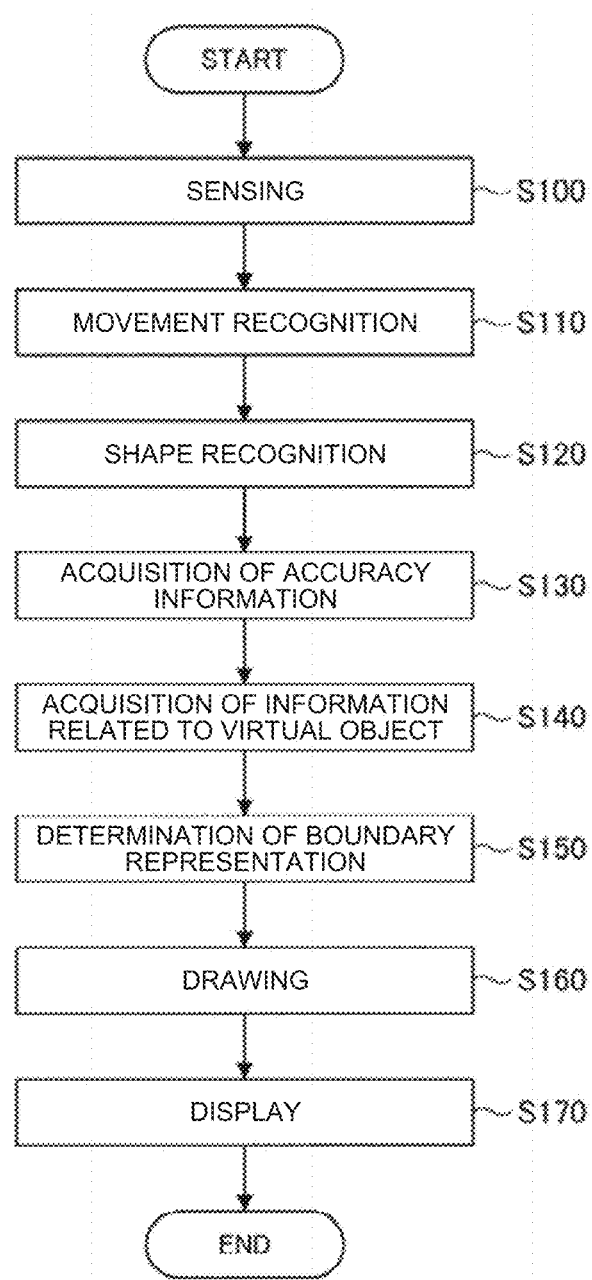
FIG. 11 is a flow chart illustrating an example of operation of the information processing device 1 according to the same embodiment.

Hereinbefore, an example of the configuration of the information processing device 1 according to this embodiment has been described. Next, an example of operation of the information processing device 1 according to this embodiment will be described by reference to FIG. 11. FIG. 11 is a flow chart illustrating the example of the operation of the information processing device 1 according to this embodiment.

As illustrated in FIG. 11, first of all, the outward camera 110 of the sensor unit 11 performs sensing (for example, imaging) of a real object (S100). Subsequently, based on a result of the sensing performed at Step S100, the movement recognition unit 121 of the recognition unit 120 of the control unit 12 performs movement recognition related to movement of the real object, and determines, for example, information on its moving speed (S110).

Furthermore, based on a result of the sensing performed at Step S100, the shape recognition unit 123 of the recognition unit 120 performs shape recognition for the real object, and generates a shielding model (S120). Subsequently, the accuracy information acquisition unit 125 of the recognition unit 120 acquires information on recognition accuracy related to the shape recognition by the shape recognition unit 123 (S130).

Subsequently, the display control unit 127 acquires information related to a virtual object to be displayed (S140). The display control unit 127 may determine, based on a result of recognition by the recognition unit 120, a virtual object to be displayed, and thereafter acquire information on the determined virtual object.

Subsequently, based on the information on the moving speed determined at Step S110 (an example of recognition information), and the information on the recognition accuracy determined at Step S130 (an example of recognition information), the display control unit 127 determines a boundary representation (S150). Specific examples of the boundary representation determined herein will be described later by reference to FIG. 12 to FIG. 23.

Subsequently, the display control unit 127 draws an image to be displayed on the display unit 13, according to a display control method related to the boundary representation determined at Step S150 (S160). Furthermore, according to control by the display control unit 127, the display unit 13 displays thereon the image (S170).

Hereinbefore, an example of the operation of the information processing device 1 according to this embodiment has been described. The order of the processing at Step S110 and the processing at Steps S120 to S130 may be reversed, or the processing at Step S110 and the processing at Steps S120 to S130 may be performed in parallel.

1-4. Specific Examples of Boundary Representation

Next, some specific examples of boundary representation will be described by reference to FIG. 12 to FIG. 23.

First Specific Example: Expansion and Reduction of Shielding Region

Described below as a first specific example of boundary representation is an example where the display control unit 127 makes a boundary representation different by expanding or reducing a shielding region according to recognition information (information on recognition accuracy or information on moving speed). FIG. 12 to FIG. 15 are explanatory diagrams illustrating the first specific example of boundary representation.

Figure 12:
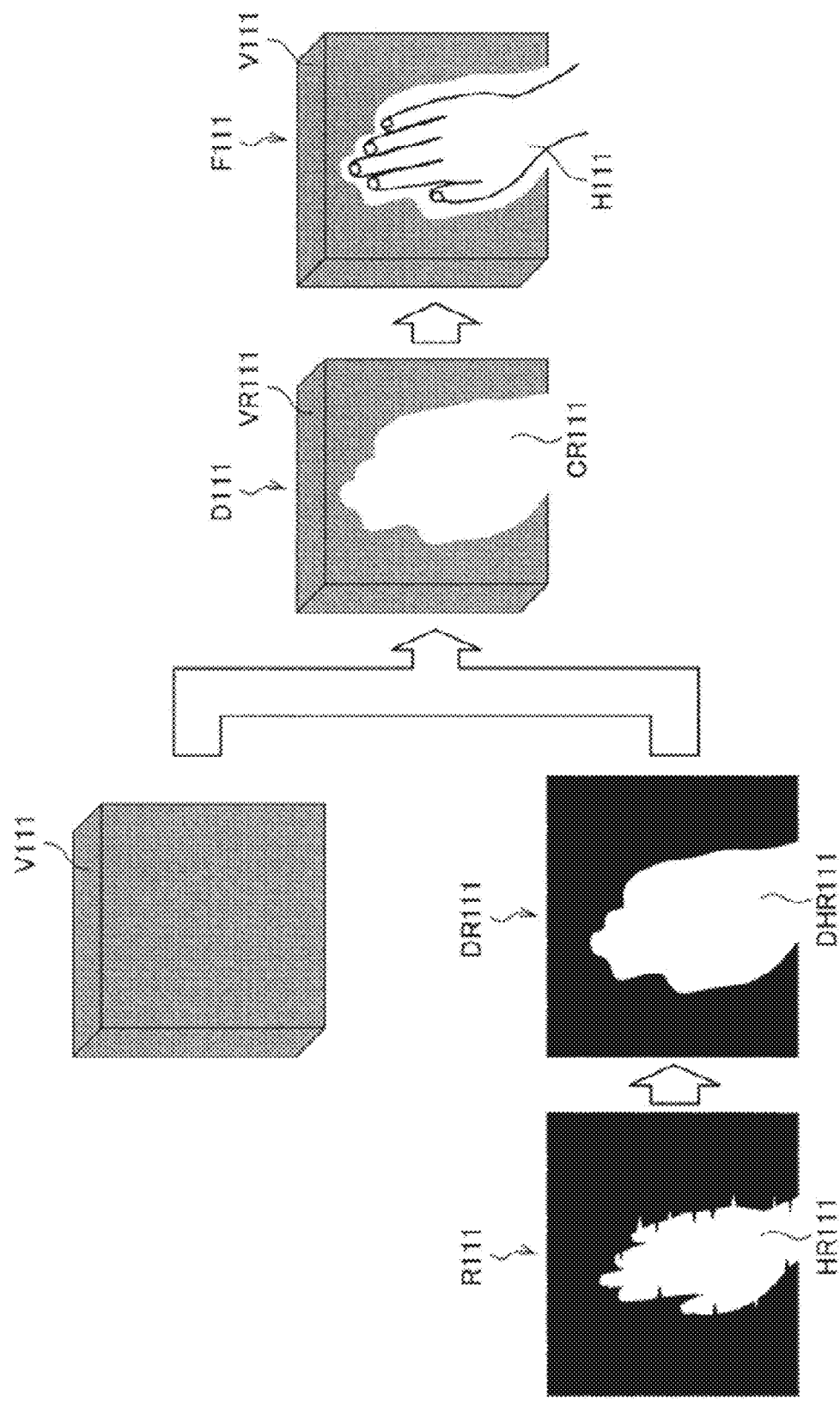
FIG. 12 is an explanatory diagram illustrating a first specific example of boundary representation according to the same embodiment.

In the example illustrated in FIG. 12, similarly to the example described already by reference to FIG. 3 and the like, accuracy of a hand region recognition result R111 is low and noise is included in the boundary of a hand region HR111. According to information on recognition accuracy (an example of recognition information), if the recognition accuracy is low, for example, the display control unit 127 may control display such that a shielding region related to shielding is expanded. That is, the display control unit 127 may be considered to control display such that a shielding region has a different size when recognition information is different.

For example, as illustrated in FIG. 12, when drawing is performed such that a virtual object V111 is shielded by use of an expanded hand region recognition result DR111 including an expanded hand region DHR111 acquired by expansion of the hand region HR111, a drawing result D111 is acquired. A shielding region CR111 in the drawing result D111 has been expanded as compared to the shielding region CR102 illustrated in FIG. 3. When display is performed based on this expanded shielding region CR111 and the drawing result D111 including a virtual object region VR111, the view of the user becomes like a view F111. As compared to the view F103 illustrated in FIG. 3, in the view F111, influence of the noise has been reduced, and as a result, the feeling of strangeness given to the user with respect to the boundary between the virtual object V111 and the user's hand H111 that is a real object is lessened.

Furthermore, the described example illustrated in FIG. 12 is an example where the display control unit 127 performs display control according to information on recognition accuracy, but this specific example is not limited to this example. According to information on the moving speed of a real object (an example of recognition information, if the moving speed is high, for example, the display control unit 127 may control display such that a shielding region related to shielding is expanded. A flow of processing in this case is similar to the example described by reference to FIG. 12, and thus detailed description of the flow of processing will be omitted, and effects achieved as a result thereof will now be described by reference to FIG. 13.

Figure 13:
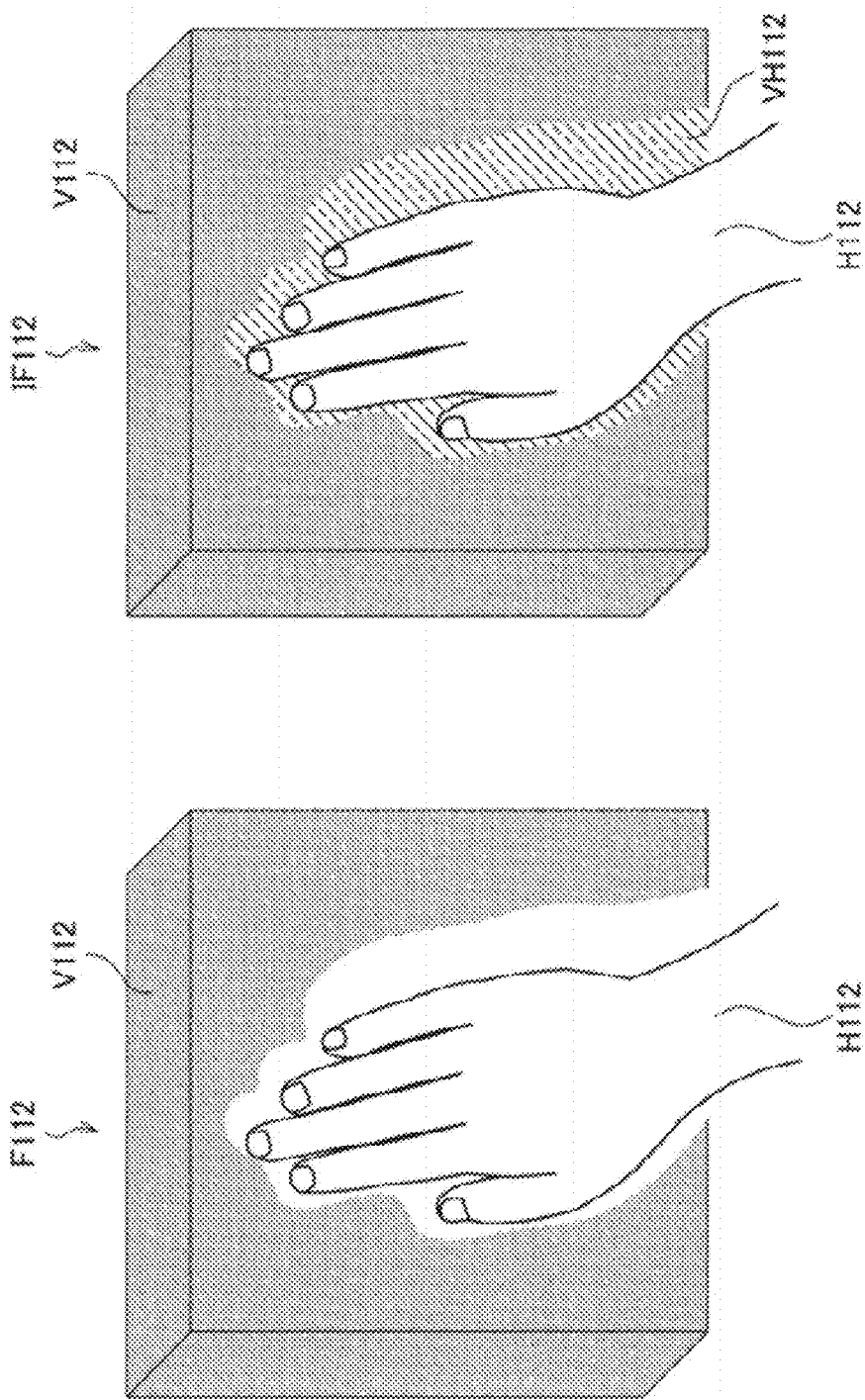
FIG. 13 is an explanatory diagram illustrating the first specific example of the boundary representation according to the same embodiment.

When display control where a shielding region is expanded is performed in a case where the moving speed of a real object is high as described by reference to FIG. 4 and FIG. 5, the view of the user becomes like a view F112 illustrated in FIG. 13. Furthermore, FIG. 13 illustrates an imagery diagram IF112 where a region has been classified with respect to the view F112 for explanation. According to this imagery diagram IF112, a region VH112 where a virtual object V112 is supposed to be visible but the background real space is visible instead is present in the view F112. However, a region like the region HV103 illustrated in FIG. 5 is not present in the view F112, the region being where the user's hand H112 is supposed to be visible but the virtual object V112 is visible instead, and thus as compared to the example described by reference to FIG. 4 and FIG. 5, the feeling of strangeness given to the user is lessened.

The display control unit 127 may make the degree of expansion of a shielding region (an example of intensity related to change in representation) different according to recognition information (for example, information on recognition accuracy, or information on moving speed). For example, the display control unit 127 may control display, such that the lower the recognition accuracy is, the more expanded the shielding region is. Furthermore, the display control unit 127 may control display, such that the larger the moving speed is, the more expanded the shielding region is.

Furthermore, the display control unit 127 may control display so as to approximate the shielding region as a predetermined shape, such as a rectangle or an oval, instead of expanding the shielding region. For example, by the approximate shape being made larger than the shielding region, effects similar to those described above are able to be achieved.

Furthermore, the display control unit 127 may cause a portion to be faded out, the portion being related to expansion of a shielding region that has been expanded. This example will be described by reference to FIG. 14. In the example illustrated in FIG. 14 also, a hand region recognition result R113 is low in accuracy and noise is included in the boundary of a hand region HR113.

Figure 14:
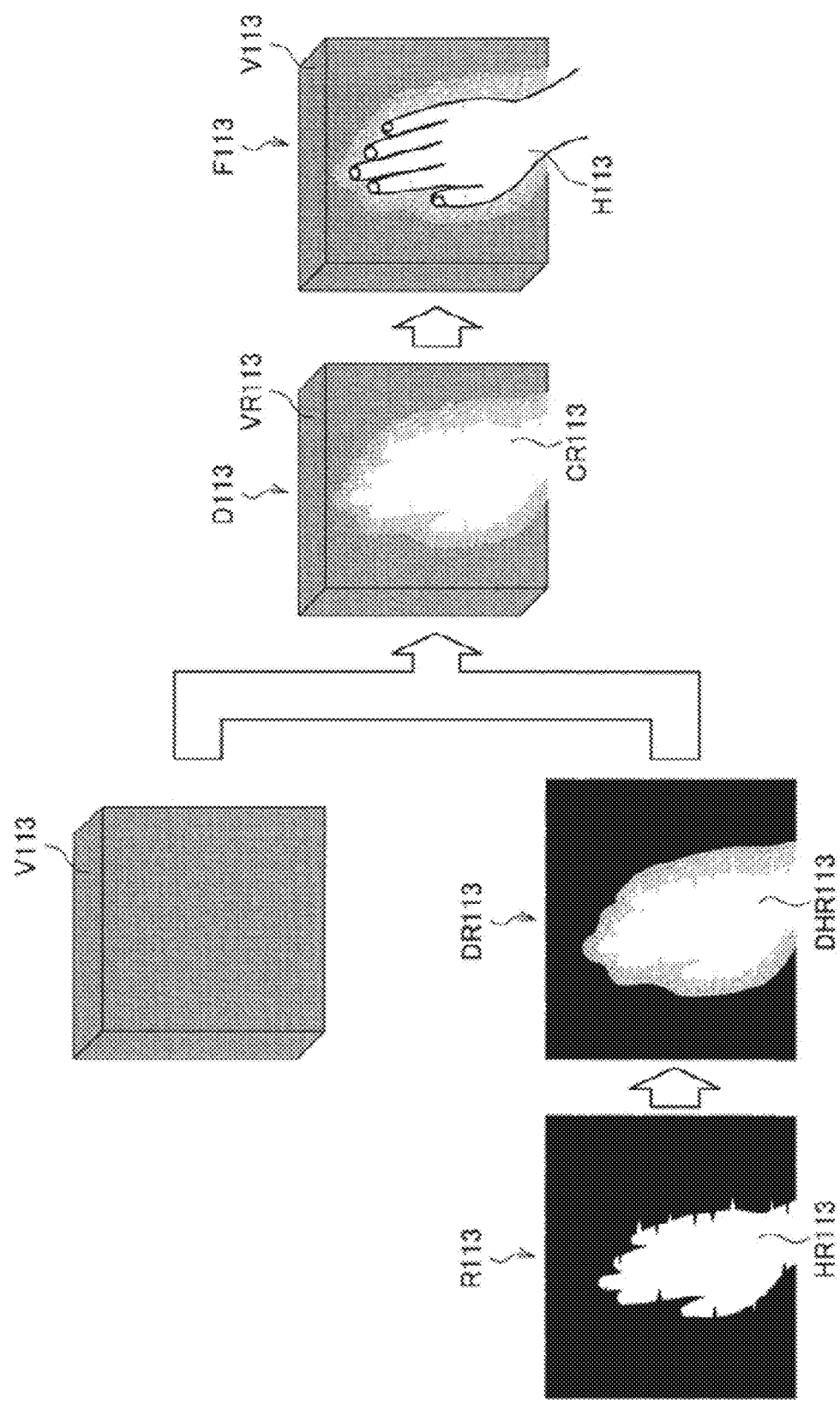
FIG. 14 is an explanatory diagram illustrating the first specific example of the boundary representation according to the same embodiment.

Acquired in the example illustrated in FIG. 14 is a drawing result D113 where drawing is performed such that a virtual object V113 is shielded by use of an expanded hand region recognition result DR113 including an expanded hand region DHR113 acquired by expansion of the hand region HR113. This expanded hand region DHR113 has been expanded such that a portion related to the expansion is faded out. As a result, in a shielding region CR113 in the drawing result D113 also, a portion related to the expansion has been faded out. When display is performed based on this drawing result D113 including the shielding region CR113 and a virtual object region VR113, the view of the user becomes like a view F113. As a result, in the view F113, a region near the boundary between the virtual object V113 and the user's hand H113 that is a real object is faded out, and the feeling of strangeness given to the user is more lessened.

The above described example illustrated in FIG. 14 corresponds to a case where the recognition accuracy is low, but the same applies to a case where the moving speed is high.

Furthermore, the display control unit 127 may control display, such that a region in a shielding region is expanded or reduced, the region corresponding to recognition information. For example, if information on recognition accuracy provided by the accuracy information acquisition unit 125 includes information related to a portion low in recognition accuracy (for example, positional information), the display control unit 127 may control display such that a region in a shielding region is expanded, the region corresponding to the portion low in recognition accuracy. This example will be described specifically by reference to FIG. 15.

Figure 15:
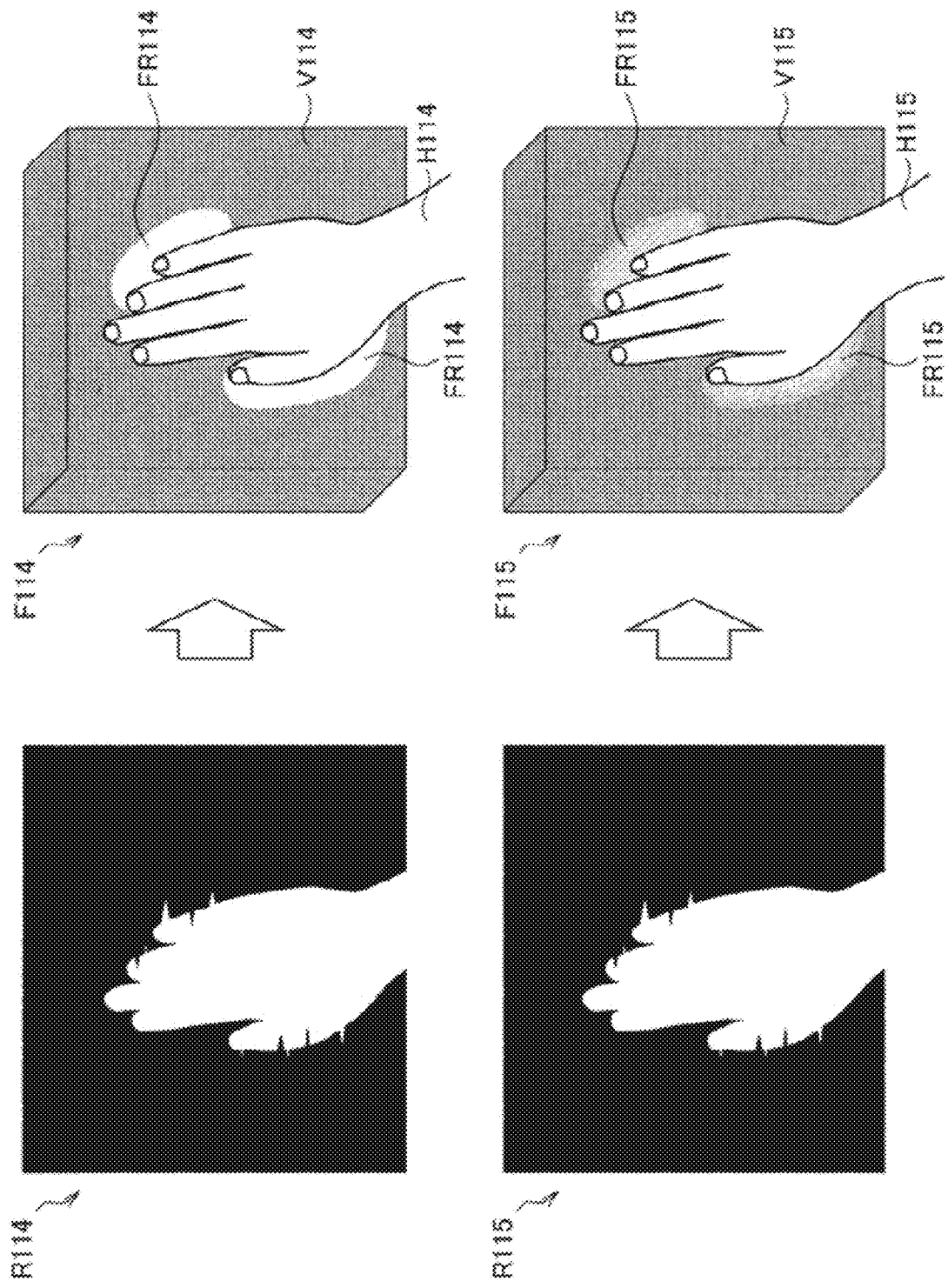
FIG. 15 is an explanatory diagram illustrating the first specific example of the boundary representation according to the same embodiment.

When a hand region recognition result R114 including noise as illustrated in FIG. 15 is acquired, and the display control unit 127 controls display such that a region corresponding to a portion of a shielding region is expanded, the portion being low in recognition accuracy, the view of the user becomes like a view F114. In the view F114, a region where a virtual object V114 is supposed to be visible but the background real space is visible instead is just an expanded portion region FR114 corresponding to the portion low in recognition accuracy. The boundary between the virtual object V114 and a hand H115 is represented highly accurately, the boundary being other than the expanded portion region FR114. Therefore, this configuration lessens the feeling of strangeness given to the user.

Furthermore, if a region of a shielding region is expanded, the region corresponding to a portion low in recognition accuracy, the display control unit 127 may cause a portion related to the expansion to be faded out, similarly to the example described by reference to FIG. 14. In the example illustrated in FIG. 15, when a hand region recognition result R115 including noise is acquired, and the display control unit 127 controls display such that a region corresponding to a portion of a shielding region is expanded, the portion being low in recognition accuracy, and a portion related to the expansion is faded out; the view of the user becomes like a view F115. In the view F115, since an expanded portion region FR115 corresponding to the portion low in recognition accuracy has been faded out, as compared to the example with the view F114, the feeling of strangeness given to the user is lessened more.

The above described example illustrated in FIG. 15 corresponds to a case where the recognition accuracy is low, but the same applies to a case where the moving speed is high. For example, if information on moving speed provided by the movement recognition unit 121 includes information related to a portion high in moving speed (for example, positional information), the display control unit 127 may control display such that a region corresponding to a portion of a shielding region is expanded, the portion being high in moving speed.

Hereinbefore, the first specific example of a boundary representation has been described by reference to FIG. 12 to FIG. 15. Although an example where a shielding region is expanded has been described above, the same applies to a case where a shielding region is reduced. When a shielding region is reduced, a region in the view of a user is reduced, the region being where a virtual object is supposed to be visible but the background real space is visible instead, and the feeling of strangeness given to the user is thus lessened.

Furthermore, the above described expansion or reduction of a shielding region may be realized by, for example, the processing described by reference to FIG. 8 to FIG. 10. For example, the above described expansion or reduction of a shielding region may be realized by combination of the processing 3D-C-P, the processing 2D-C-P, and the processing 2D-V-P, in FIG. 10, as appropriate.

Second Specific Example: Addition of Effect

Described below as a second specific example of boundary representation is an example where the display control unit 127 makes a boundary representation different by controlling display such that an effect is added (superimposed) near a boundary related to shielding, according to recognition information (information on recognition accuracy, or information on moving speed). Being near a boundary related to shielding may mean, for example, being near the boundary between a shielding region and a virtual object region described by reference to FIG. 2 and the like. Furthermore, being near a boundary related to shielding may mean being near a contour portion of a shielding model, or being near the boundary between a shielding model region and a virtual object region, which have been described by reference to FIG. 8 and FIG. 9.

FIG. 16 to FIG. 22 are explanatory diagrams illustrating the second specific example of boundary representation. In the example illustrated in FIG. 16, similarly to the example described by reference to FIG. 3 and the like, the accuracy of a hand region recognition result R121 is low, and noise is included in the boundary of a hand region HR121. According to information on recognition accuracy (an example of recognition information), if the recognition accuracy is low, for example, the display control unit 127 thus may control display such that an effect E121 is added near a boundary related to shielding. In the example illustrated in FIG. 16, the effect E121 may be a brightening effect, such as a glow.

Figure 16:
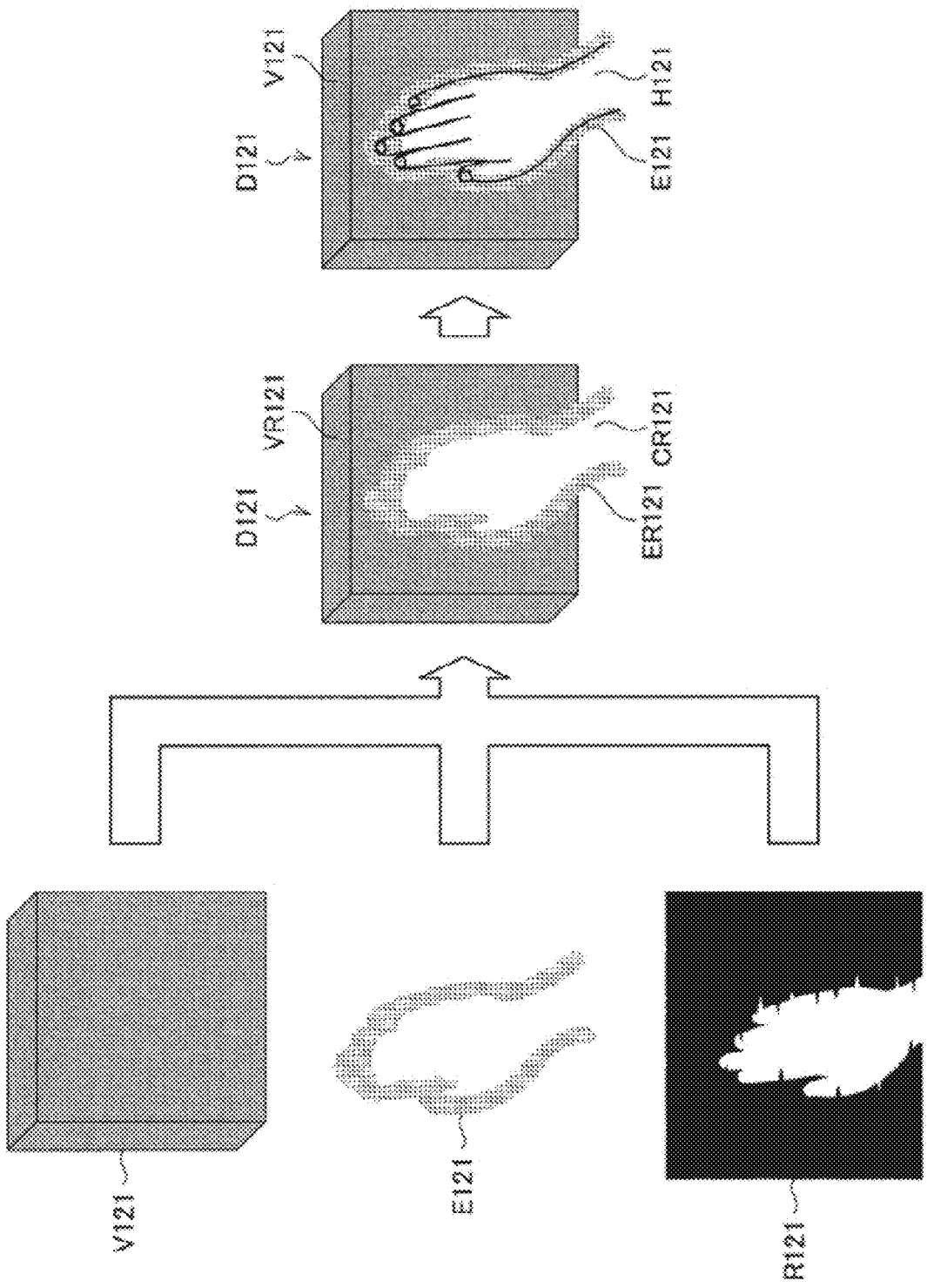
FIG. 16 is an explanatory diagram illustrating a second specific example of the boundary representation according to the same embodiment.

In the example illustrated in FIG. 16, the display control unit 127 acquires a drawing result D121 by performing drawing such that a virtual object V121 is shielded by use of the hand region recognition result R121 and the effect E121 is added near the boundary related to the shielding. In the drawing result D121, an effect region ER121 is present between a shielding region CR121 and a virtual object region VR121. When display is performed based on this drawing result D121 including the shielding region CR121, the virtual object region VR121, and the effect region ER121, the view of the user becomes like a view F121. In the view F121, by the addition of the effect E121, influence of the noise has been reduced as compared to the view F103 illustrated in FIG. 3. As a result, the feeling of strangeness given to the user with respect to the boundary between the virtual object V121 and the user's hand H121 that is a real object is lessened.

Furthermore, in the above described example illustrated in FIG. 16, the display control unit 127 performs display control according to information on recognition accuracy, but this specific example is not limited to this example. According to information on moving speed of a real object (an example of recognition information), if the moving speed is high, for example, the display control unit 127 may control display such that an effect is added near a boundary related to shielding. Since the flow of processing in this case is similar to the example described by reference to FIG. 16, detailed description of the flow of processing will be omitted, and effects achieved as a result thereof will be described by reference to FIG. 17.

Figure 17:
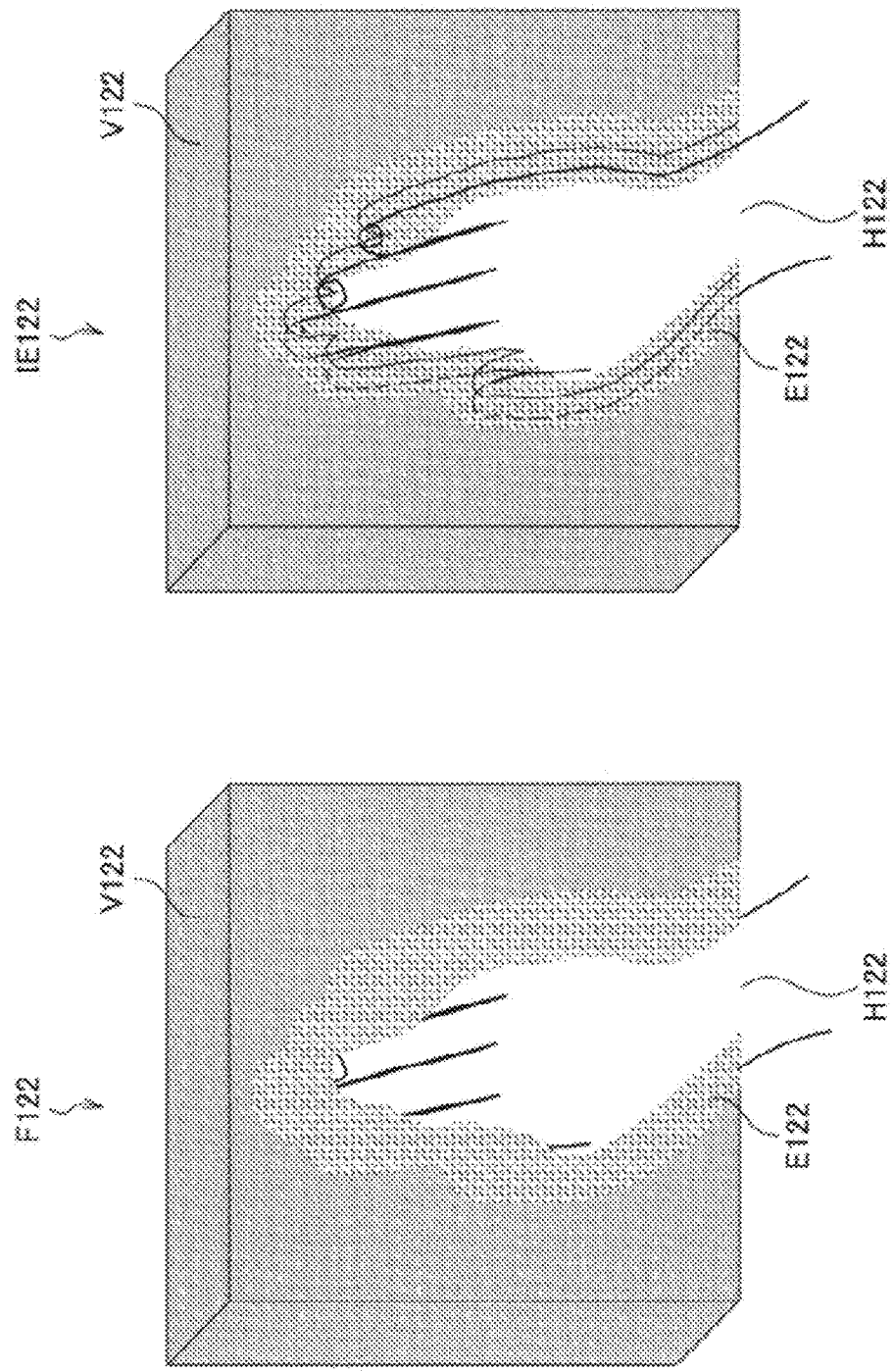
FIG. 17 is an explanatory diagram illustrating the second specific example of the boundary representation according to the same embodiment.

When the moving speed of a real object is high as described by reference to FIG. 4 and FIG. 5 and display control is performed such that an effect is added near a boundary related to shielding, the view of the user becomes like a view F122 illustrated in FIG. 17. Furthermore, FIG. 17 illustrates an imagery diagram IF122 having a thin line and a broken line added to the view F127 for explanation. The thin line illustrated in the imagery diagram IF122 represents the boundary of a virtual object V122 in a case where an effect is not added. Moreover, the broken line illustrated in the imagery diagram IF122 represents the boundary of a hand H122 that is a real object, the boundary being hidden by an effect E122. According to this imagery diagram IF122, a region like the region VH103 illustrated in FIG. 5 is not present in the view F122, the region being where the virtual object V122 is supposed to be visible but the background real space is visible instead. In addition, according to the imagery diagram IF122, a region like the region HV103 illustrated in FIG. 5 is not present either, the region being where the hand H112 of the user is supposed to be visible but the virtual object V122 is visible instead. By display having the effect E122 added to both the outside and inside of the boundary related to shielding such that both of these regions are covered, the feeling of strangeness given to the user is lessened as compared to the example described by reference to FIG. 4 and FIG. 5.

Figure 18:
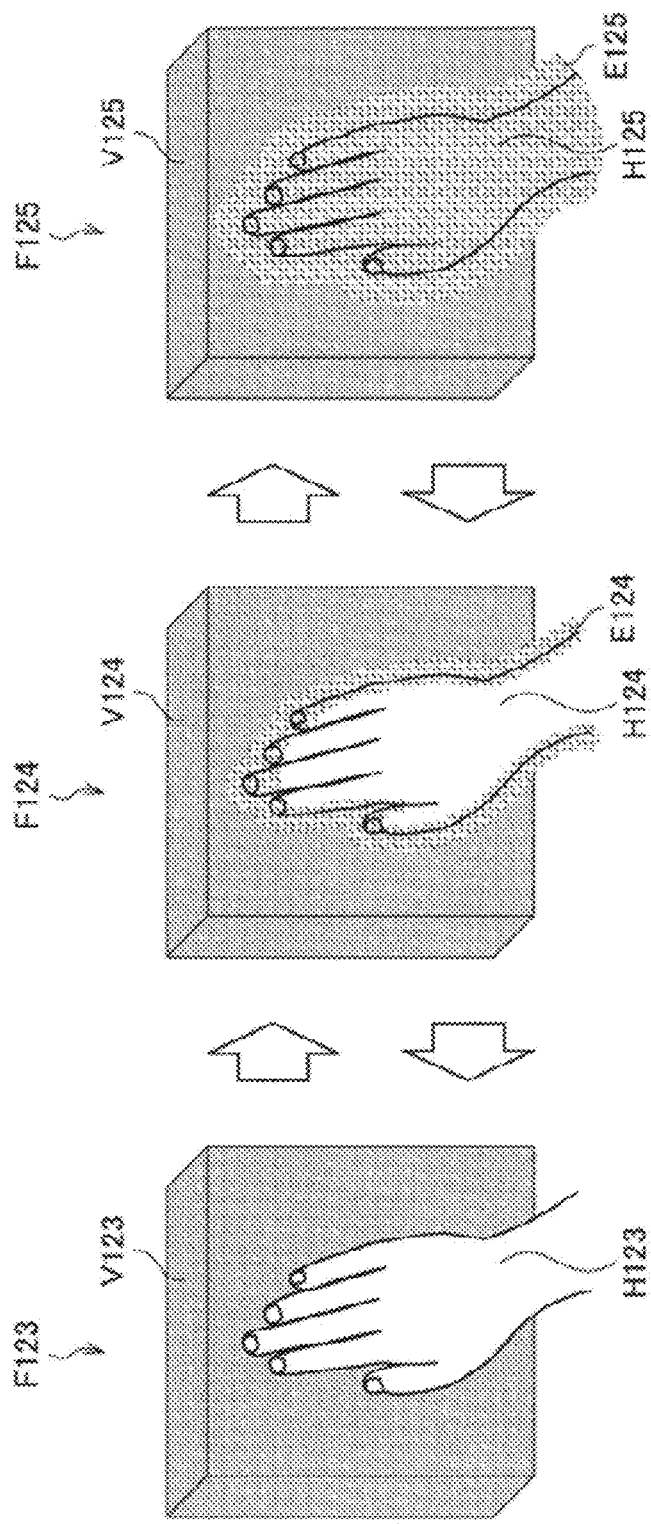
FIG. 18 is an explanatory diagram illustrating the second specific example of the boundary representation according to the same embodiment.

The display control unit 127 may make the intensity of the effect (an example of intensity related to change of a representation) different according to recognition information (for example, information on recognition accuracy, or information on moving speed). The intensity of the effect may be largeness of the range of the effect, magnitude of brightness (or luminosity) of the effect, or the like. Examples of the intensity of the effect will be described by reference to FIG. 18. In an example with a view F123 illustrated in FIG. 18, an effect has not been added near the boundary between a hand H123 and a virtual object V123. An example with a view F124 illustrated in FIG. 18 is an example where the intensity of an effect has been made larger than that in the example with the view F123. In the example with the view F124 illustrated in FIG. 18, an effect E124 has been added near the boundary between a hand H124 and a virtual object V124. An example with a view F125 illustrated in FIG. 18 is an example where the intensity of the effect has been made even larger than that in the example with the view F124. In the example with the view F124 illustrated in FIG. 18, an effect E125 has been added over a wide range as compared to the effect E124. The effect E125 has been, not only expanded to the outside, but also added to the entire hand H125, in addition to a region near the boundary between the hand H125 and a virtual object V125. This is because expanding the effect to the inside may make the hand H125 less visible, and adding the effect to the entire hand H125 makes the hand H125 more visible as the addition makes the hand H125 look like a user interface (UI) for manipulation, for example.

Transition of the intensity of the effect as illustrated in FIG. 18 may be implemented according to, for example, highness of the recognition accuracy, or highness of the moving speed. For example, the display control unit 127 may control display of the effect, such that the lower the recognition accuracy is, the higher the intensity of the effect becomes. Furthermore, the display control unit 127 may control display of the effect, such that the higher the moving speed is, the higher the intensity of the effect becomes.

Furthermore, the display control unit 127 may control display, such that an effect is added at a position according to recognition information. For example, if information on recognition accuracy provided by the accuracy information acquisition unit 125 includes information related to a portion low in recognition accuracy, the display control unit 127 may control display such that an effect is added near the boundary of the portion low in recognition accuracy. Moreover, if information on moving speed provided by the movement recognition unit 121 includes information related to a portion high in moving speed, the display control unit 127 may control display such that an effect is added near the boundary of the portion low in recognition accuracy.

The addition of the effect described by reference to FIG. 15 to FIG. 18 may be realized by, for example, the processing described by reference to FIG. 8 to FIG. 10. For example, addition of an effect near a boundary related to shielding may be realized by combination of the processing 3D-C-P, the processing 2D-C-P, and the processing 2D-V-P, in FIG. 10, as appropriate. Furthermore, the addition of the effect to the entire real object described by reference to FIG. 18 may be realized by combination of the processing 3D-C-A, the processing 3D-C-P, the processing 2D-C-A, the processing 2D-C-P, and the processing 2D-V-P, in FIG. 10, as appropriate.

An effect added by the display control unit 127 may be any of various effects. Some examples of the effect will be described below.

Figure 19:
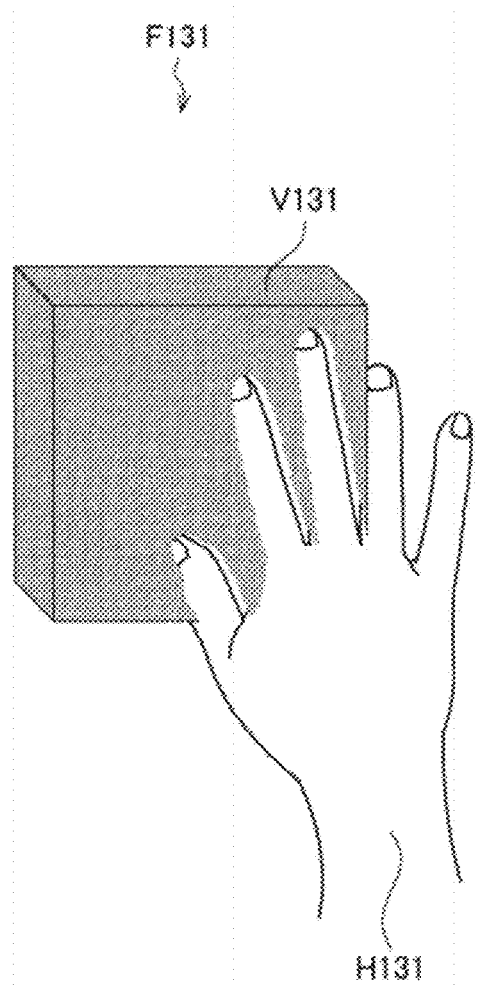
FIG. 19 is an explanatory diagram illustrating the second specific example of the boundary representation according to the same embodiment.

In an example with a view F131 illustrated in FIG. 19, the boundary between a user's hand H131 and a virtual object V131 is not appropriately represented. In contrast, in an example with a view F132 illustrated in FIG. 20, an effect E132 that glows, like a glow, is added near a boundary related to shielding. In the example with the view F132, the effect E132 has been added such that the whole contour of the hand H132 is covered, and this may be realized by, for example, the processing 3D-C-P in FIG. 10.

Furthermore, based on, for example, a result of prediction of a change (movement) in the three-dimensional shape of a real object, the prediction having been performed by the shape recognition unit 123, the effect E132 may have an intensity change like a motion blur. For example, the intensity of the effect E132 may change between a start position of the predicted change and an end position of the predicted change. As described above, by the addition of the effect E132 having the intensity change like a motion blur, the feeling of strangeness given to the user with respect to the boundary between the user's hand H132 and a virtual object V132 is lessened.

Figure 20:
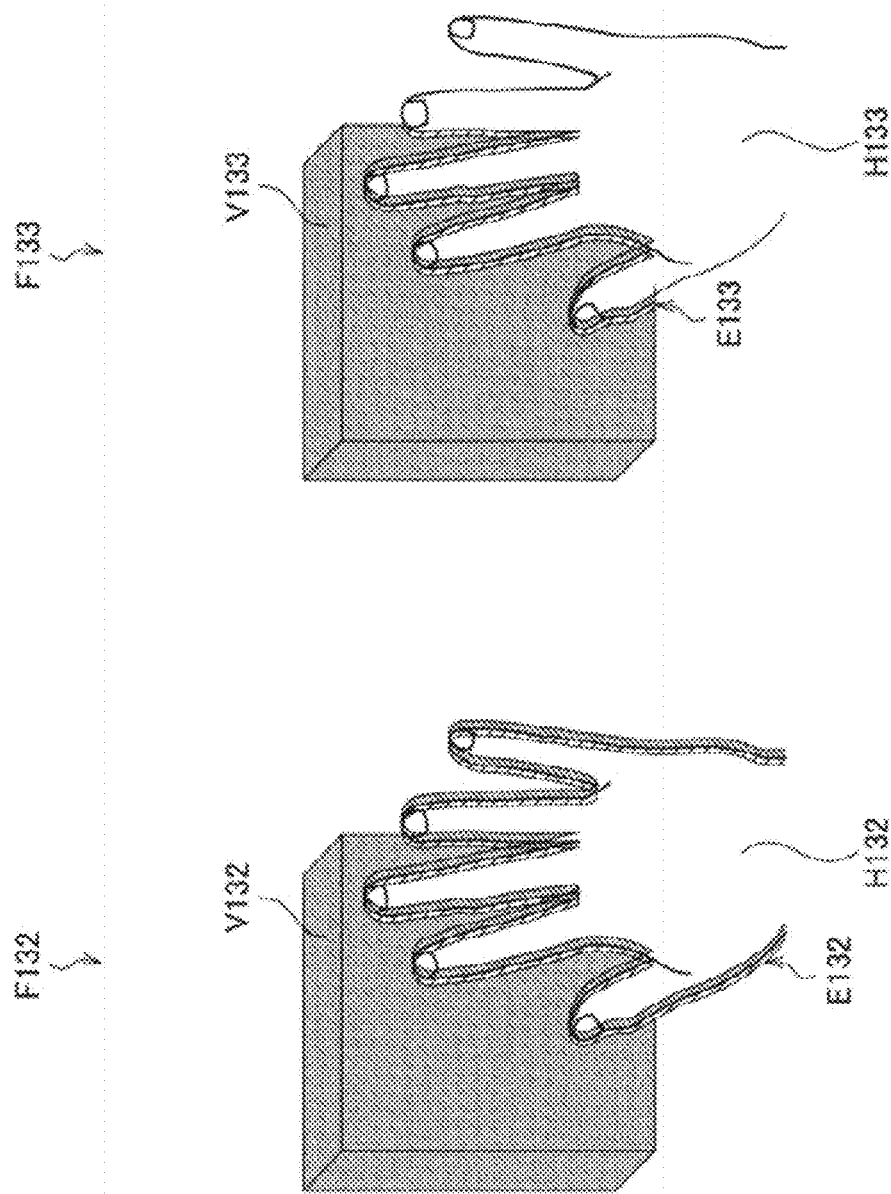
FIG. 20 is an explanatory diagram illustrating the second specific example of the boundary representation according to the same embodiment.

Furthermore, in an example with a view F133 illustrated in FIG. 20, an effect E133 that glows, like a glow, is added near a boundary related to shielding. In this example with the view F133, the effect E132 has been added, with the addition being limited to a region near the boundary between a hand H133 and a virtual object V133. This display control may be realized by combination of, for example, the processing 3D-C-P, the processing 2D-C-P, and the processing 2D-V-P, in FIG. 10, as appropriate.

Furthermore, based on a result of prediction of a change (movement) in the three-dimensional shape of a real object, the prediction having been performed by the shape recognition unit 123, the effect E133 may have an intensity change like a motion blur, similarly to the effect E132. When this effect E133 is added, the feeling of strangeness given to the user with respect to the boundary between the user's hand H133 and the virtual object V133 is also lessened.

Furthermore, in the examples described by reference to FIG. 20, the colors of the effect E132 and effect E133 may be made a color close to the color of the real object (for example, a hand), or a color closer to the color of the virtual object. In this case, the effect may be with or without an intensity change like a motion blur. This configuration lessens the feeling of strangeness given to a user with respect to the boundary between a real object and a virtual object.

Furthermore, the display control unit 127 may control display, such that an effect that blurs a region near a boundary related to shielding is added. This display control may be realized by combination of, for example, the processing 3D-C-P, the processing 2D-C-P, and the processing 2D-V-P, in FIG. 10, as appropriate.

A case where the whole real object is present nearer than a virtual object has been described above as an example, but the display control unit 127 may add an effect even in a case where a part of a real object is present farther than a virtual object. This case will be described by reference to FIG. 21 and FIG. 22.

Figure 21:
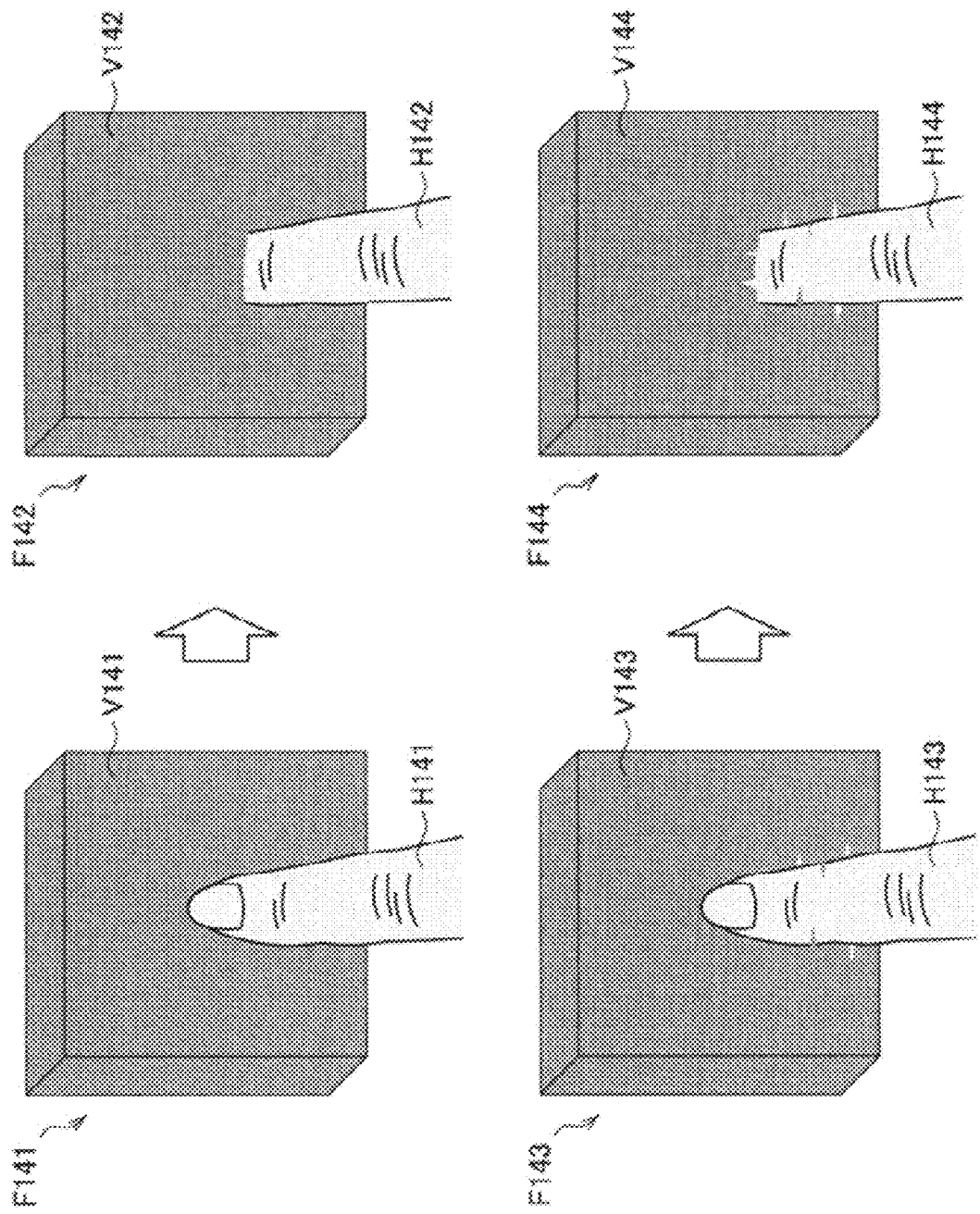
FIG. 21 is an explanatory diagram illustrating the second specific example of the boundary representation according to the same embodiment.

In an example with a view F141 illustrated in FIG. 21, the whole finger H141 of a hand that is a real object is present nearer than a virtual object V141. When the finger H141 moves so as to collide with the virtual object V141 (a part of the finger H141 goes into the virtual object V14) from this state, the view of the user desirably becomes like a view F142 illustrated in FIG. 21. In an example with the view F142, display control is performed by the display control unit 127 such that the real object collides with the virtual object, and the collision between the finger H142 and the virtual object V142 is represented by shielding of a part of the finger H142.

In an example with a view F143 which is illustrated in FIG. 21 and is for consideration of a case where recognition accuracy is low, the whole finger H143 that is a real object is present nearer than a virtual object V143, but due to influence of noise, the boundary between the finger H143 and the virtual object V143 is not appropriately represented. When the finger H143 moves from this state to collide with the virtual object V143 and the display control unit 127 performs display control such that the real object collides with the virtual object, the view of the user becomes like a view F144. Present in the view F144, in addition to a region where a virtual object V144 is supposed to be visible but the background real space is visible instead and a region where a finger H144 is supposed to be visible but the virtual object V144 is visible instead, is a region where the virtual object V144 is supposed to be visible but the finger H144 is visible instead.

Addition of an effect for an example like the view F144 will now be considered. If this addition of an effect is realized by addition of an effect near a contour portion of a shielding model by the processing 3D-C-P in FIG. 10, the view of the user may become like a view F145 illustrated in FIG. 22. In an example with the view F145, due to the presence of an effect E145, a region where a virtual object V145 is supposed to be visible but the background real space is visible instead, and a region where a finger H145 is supposed to be visible but the virtual object V145 is visible instead are not present. However, in the example with the view F145, a region where the virtual object V145 is supposed to be visible but the finger H145 is visible instead is present, and this may give a feeling of strangeness to the user.

Figure 22:
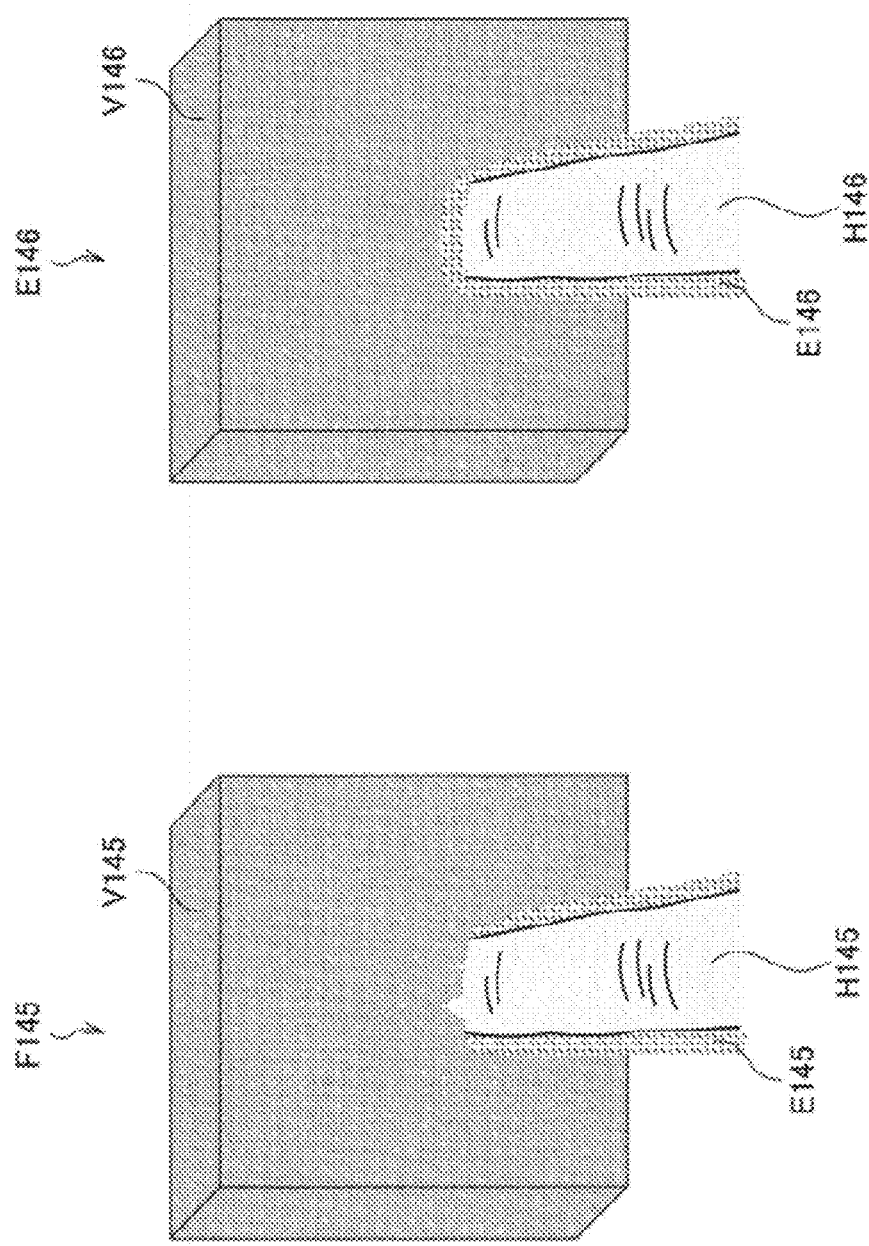
FIG. 22 is an explanatory diagram illustrating the second specific example of the boundary representation according to the same embodiment.

The display control unit 127 thus desirably controls display, like a view F146 illustrated in FIG. 22, such that the effect E145 is also added near the boundary related to collision between the finger H145 (an example of a real object) and the virtual object V145. When this display control is realized by the processing 3D-C-P in FIG. 10, for example, an effect may be added, not only near a contour portion of a shielding model, but also near a boundary related to collision between the shielding model and a virtual object. Furthermore, this display control may be realized by the processing 2D-C-P in FIG. 10.

The above described example illustrated in FIG. 22 corresponds to a case where the recognition accuracy is low, but the same applies to a case where the moving speed is high.

Third Specific Example: Control of Visibility of Virtual Object

Hereinbefore, the second specific example of boundary representation has been described by reference to FIG. 16 to FIG. 22. Described next as a third specific example of boundary representation is an example where the display control unit 127 makes a boundary representation different by controlling display of a virtual object, such that the virtual object differs in visibility according to recognition information (information on recognition accuracy or information on moving speed).

Figure 23:
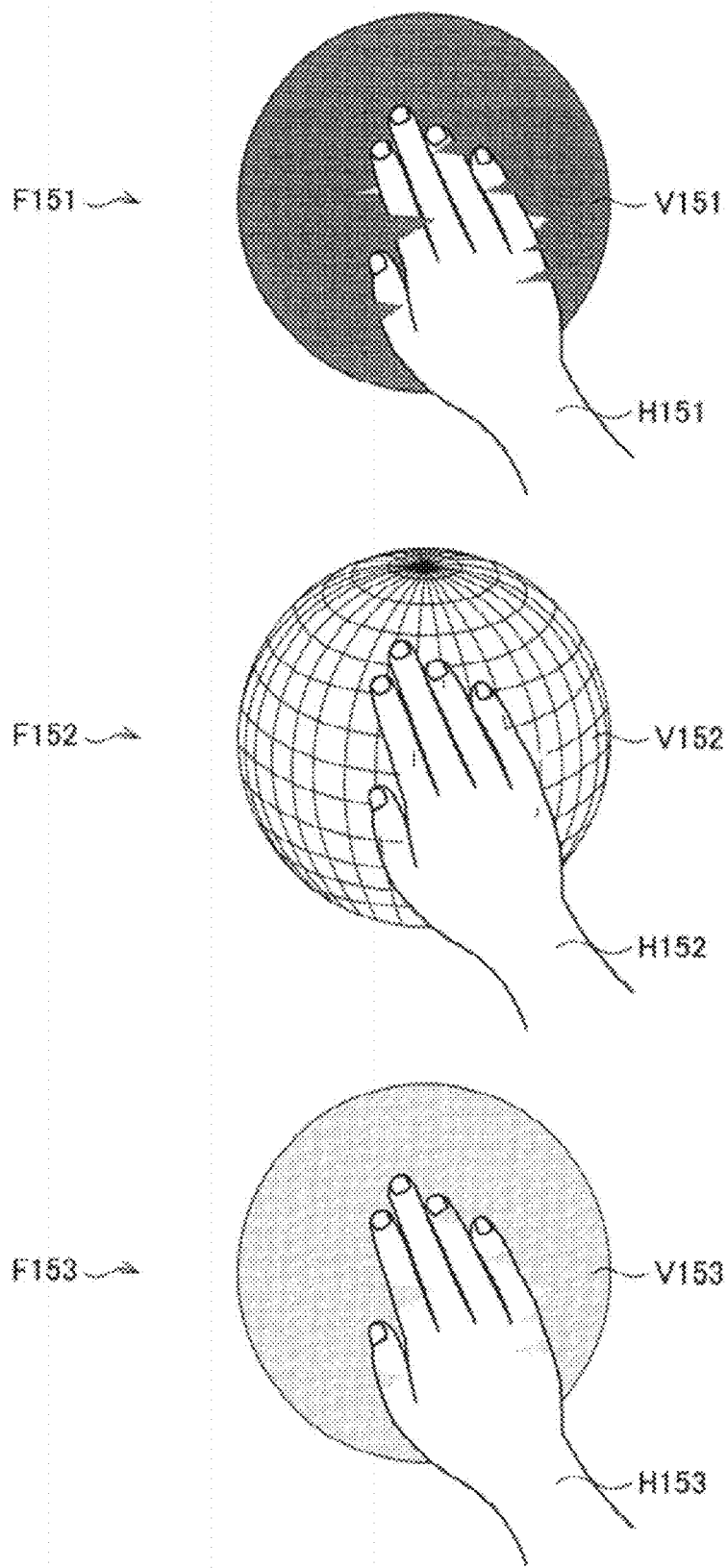
FIG. 23 is an explanatory diagram illustrating a third specific example of the boundary representation according to the same embodiment.

FIG. 23 is an explanatory diagram illustrating the third specific example of boundary representation. In an example with a view F151 of a user illustrated in FIG. 23, due to the low recognition accuracy, the boundary between the user's hand H151 that is a real object and a virtual object V151 is not appropriately represented, and thus the user may get a feeling of strangeness therefrom.

The display control unit 127 may thus control display, such that the lower the recognition accuracy is, the more the visibility of the virtual object is decreased. This configuration lessens the feeling of strangeness related to the boundary between a real object and a virtual object.

For example, in an example with a view F152 illustrated in FIG. 23, the feeling of strangeness related to the boundary between a hand H152 and a virtual object V152 has been lessened by display of the virtual object V152 through wireframe rendering. Furthermore, in an example with a view F153 illustrated in FIG. 23, the feeling of strangeness related to the boundary between a hand H153 and a virtual object V153 has been lessened by the brightness of the virtual object V153 being decreased and the virtual object V153 appearing semitransparent.

Furthermore, the above described examples illustrated in FIG. 23 each correspond to a case where the recognition accuracy is low, but the same applies to a case where the moving speed is high. Moreover, display control that decreases the visibility of a virtual object as illustrated in FIG. 23 may be realized by the processing 3D-V-A in FIG. 10.

The display control of making the visibility different performed by the display control unit 127 is not limited to the examples illustrated in FIG. 23. For example, the display control unit 127 may make the visibility different according to change in the color saturation of the virtual object, existence of a texture or a pattern, or the like. Furthermore, the display control unit 127 may decrease the visibility by reducing the display resolution of the virtual object.

Furthermore, FIG. 23 illustrates examples, each in which the display control unit 127 decreases the visibility of the whole virtual object, but the display control unit 127 may control display, such that visibility of a partial region of a virtual object (for example, a region having a predetermined shape) is decreased. This display control may be realized by combination of, for example, the processing 3D-V-P and the processing 2D-V-P, illustrated in FIG. 10, as appropriate.

1-5. Modified Examples

The first embodiment of the present disclosure has been described hereinbefore. Described hereinafter are some modified examples of this embodiment. The modified examples described below may each be applied alone to this embodiment or may be applied to this embodiment in combination. Furthermore, each of the modified examples may be applied instead of a configuration described with respect to this embodiment, or may be additionally applied to a configuration described with respect to this embodiment.

Modified Example 1-1

The above described third specific example of boundary representation may be particularly effective when a user performs manipulation of a virtual object by using a real object. For example, a button (virtual object) pressing manipulation, a character string (virtual object) selecting manipulation, or the like by use of a real object, such as a hand or a finger, may be a delicate manipulation, and thus if a part of the virtual object becomes invisible due to expansion of a shielding region or due to an effect, the part being a part that is supposed to be visible, the manipulation may be hindered. In contrast, when the above described display control that decreases the visibility is performed, the visibility is decreased, but the virtual object that is supposed to be visible is able to be seen, and thus influence on the manipulation is small.

Therefore, when a manipulation of a virtual object is performed by use of a real object, the display control unit 127 may control display such that the boundary representation differs according additionally to manipulation information related to the manipulation. That is, if a virtual object is a virtual object that is able to be manipulated by a real object, the display control unit 127 may be considered to control shielding display so as to present a boundary representation from plural boundary representations, the boundary representation having a larger display region for the virtual object. The manipulation information may be, for example, recognized by the recognition unit 120, and provided to the display control unit 127. The display control unit 127 may perform display control by selecting a more appropriate one of the above described specific examples of boundary representation, according to the manipulation information recognized by the recognition unit 120. For example, if the recognition unit 120 has recognized that a delicate manipulation is being performed, the display control unit 127 may make the visibility of the virtual object different according to the recognition information. The manipulation information is not limited to the example where the manipulation information is provided from the recognition unit 120, and may be determined from, for example, the shape of the virtual object.

According to this configuration, for example, display control corresponding to the type of manipulation is performed, and an effect that manipulation by the user is difficult to be hindered is achieved.

Modified Example 1-2

A part of the above described third specific example of boundary representation may be difficult to be applied, depending on the content related to the virtual object. Therefore, the display control unit 127 may control display such that the boundary representation differs according additionally to content information related to the virtual object.

For example, if the content related to a virtual object is text or a three-dimensional shape, wireframe rendering is possible, and thus the display control unit 127 may decrease the visibility by performing wireframe rendering. On the contrary, if the content related to a virtual object is an image (a still image or a moving image), wireframe rendering is difficult, and thus the visibility may be decreased by the brightness of the virtual object being decreased and the virtual object being made to appear semitransparent. That is, the display control unit 127 may be considered to control shielding display according to whether or not the virtual object has a three-dimensional shape.

According to this configuration, display control according to the content is enabled, and the feeling of strangeness given to the user is thus lessened more.

Modified Example 1-3

Figure 24:
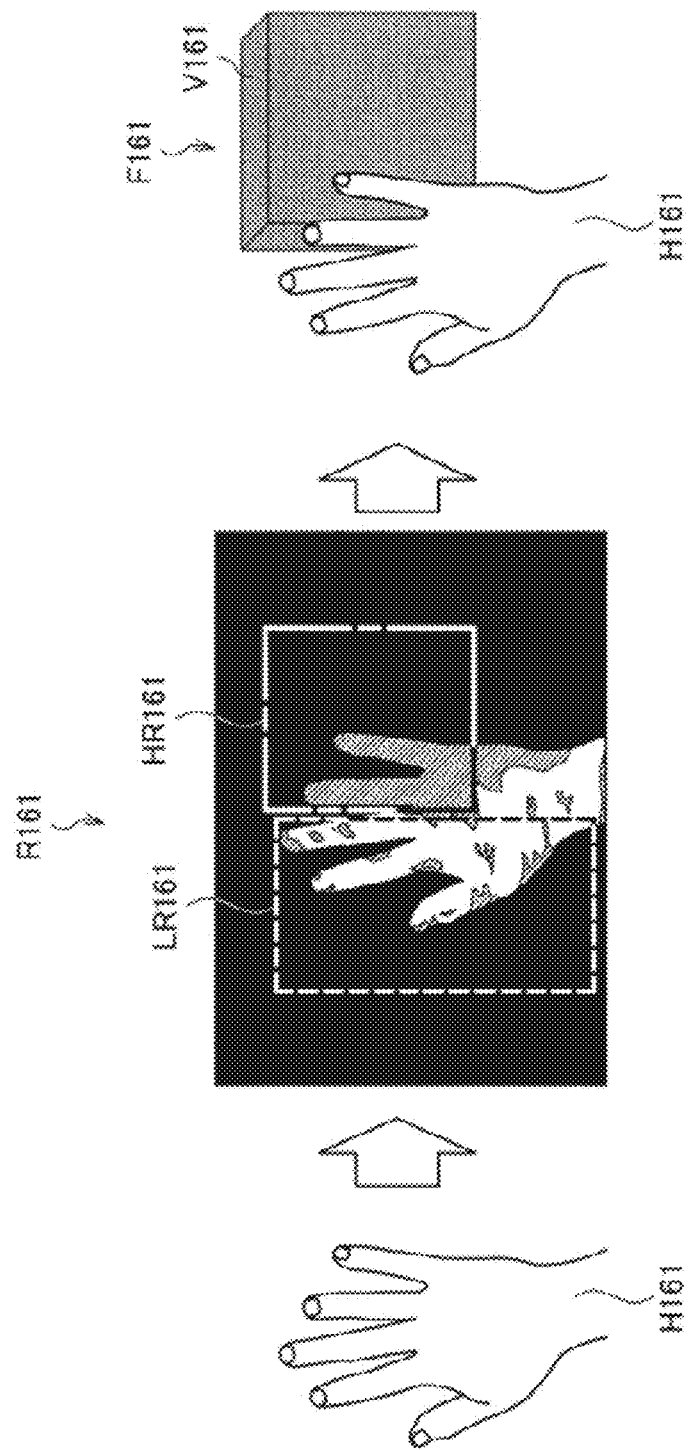
FIG. 24 is an explanatory diagram illustrating a modified example according to the same embodiment.

Furthermore, the display control unit 127 may control the arrangement (position, posture, size, or the like) of a virtual object, based on information on recognition accuracy. FIG. 24 is an explanatory diagram illustrating a modified example, in which the display control unit 127 controls the arrangement of a virtual object based on information on recognition accuracy.

A recognition result R161 illustrated in FIG. 24 is a result of recognition based on sensing of a user's hand H161 that is a real object. Furthermore, the recognition result R161 also represents information on recognition accuracy, and in the recognition result R161, the white region is a region low in recognition accuracy. Therefore, if, for example, a virtual object is arranged at a location corresponding to a region LR161 low in recognition accuracy in the recognition result R161, the boundary between the virtual object and the real object may be not represented appropriately. The display control unit 127 thus may arrange the virtual object at a location corresponding to a region HR161 high in recognition accuracy in the recognition result R161, and in that case, the view of the user becomes like a view F161. In the example with the view F161, the boundary between the hand H161 and a virtual object V161 is appropriately represented, and the feeling of strangeness that the user gets therefrom is lessened.

The arrangement of the virtual object should not be made different depending on, for example, the content related to the virtual object, and thus the above described control of the arrangement of the virtual object may be performed based on content information.

Modified Example 1-4

Figure 25:
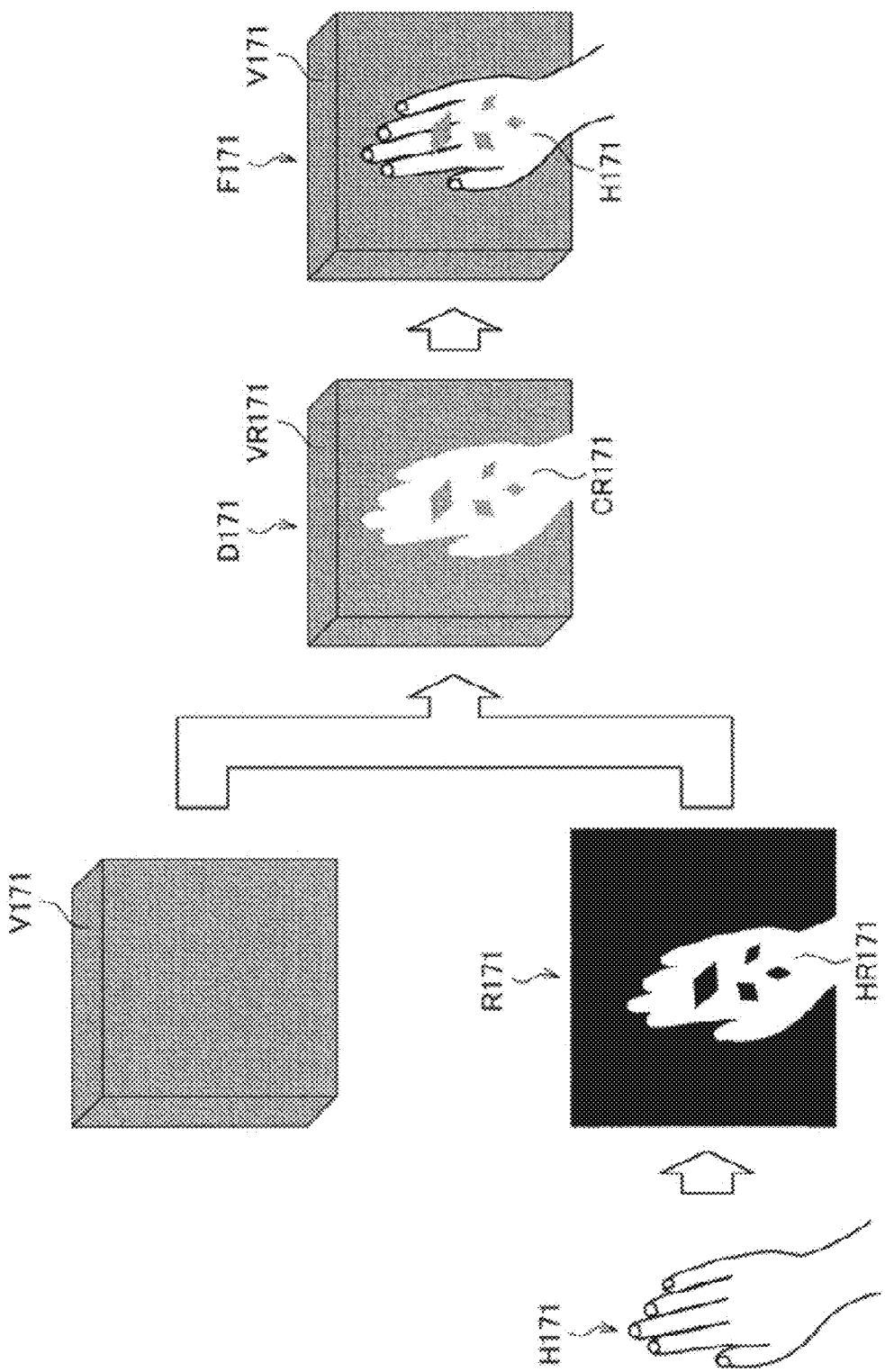
FIG. 25 is an explanatory diagram illustrating a modified example according to the same embodiment.
Figure 26:
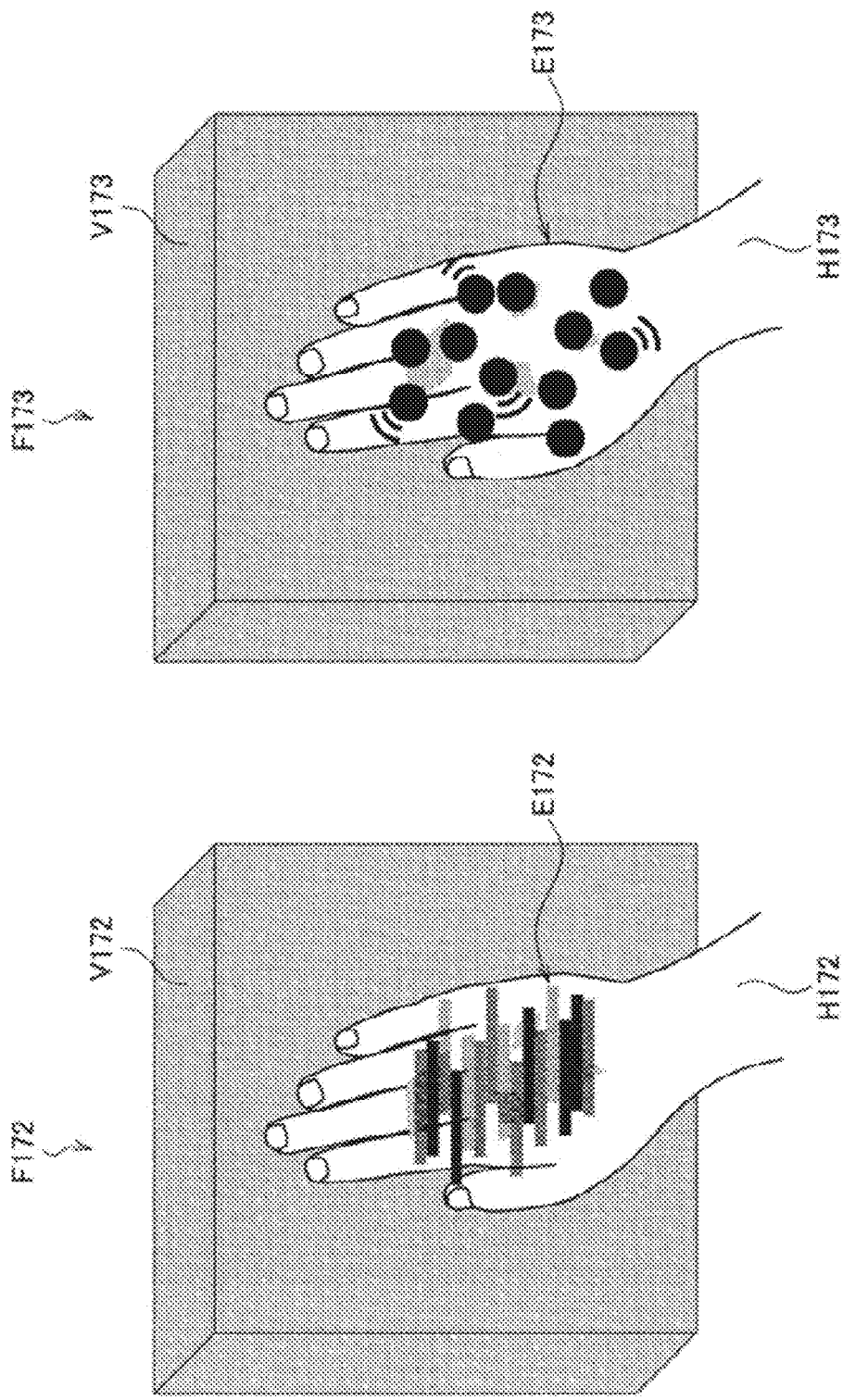
FIG. 26 is an explanatory diagram illustrating a modified example according to the same embodiment.

The above described second specific example of boundary representation is an example where an effect is added near a boundary related to shielding, but this embodiment is not limited to this example. For example, the display control unit 127 may control display, such that an effect is added inside a shielding region related to shielding, according to recognition information. FIG. 25 and FIG. 26 are explanatory diagrams illustrating modified examples, each in which the display control unit 127 controls display such that an effect is added inside a shielding region related to shielding, according to recognition information.

In the example illustrated in FIG. 25, accuracy of a hand region recognition result R171 acquired as a result of recognition based on sensing of a hand H171 is low, and noise is included inside a hand region HR171. If drawing is performed such that a virtual object V171 is shielded by use of this hand region recognition result R171 low in accuracy, in a drawing result D171 acquired thereby also, noise is included inside a shielding region CR171. When display is performed based on this drawing result D171, influence of the noise is visible in a view F171 of the user. Specifically, the virtual object V171 is visible in a region where the user's hand H171 is supposed to be visible, and the user may get a feeling of strangeness therefrom.

According to information on recognition accuracy (an example of recognition information), if the recognition accuracy is low, for example, the display control unit 127 thus may control display such that an effect is added inside the shielding region CR171.

For example, like a view F172 illustrated in FIG. 26, the display control unit 127 may control display such that an effect E172 is added inside the shielding region. According to this configuration, the effect E171 makes the region, in which the user's hand H171 is supposed to be visible but the virtual object V171 is visible instead, difficult to be visible, and the feeling of strangeness given to the user is lessened.

The effect E172 may be an effect with a motion, and may be, for example, an effect like video noise. By the effect E171 being an effect like video noise, the user is able to know that the recognition accuracy for the hand H172 has been reduced.

Furthermore, like a view F173 illustrated in FIG. 26, the display control unit 127 may control display such that an effect E173 including plural particles with motion is added inside the shielding region. According to this configuration, the effect E173 makes the region, in which a hand H173 of a user is supposed to be visible but a virtual object V173 is visible instead, difficult to be visible, and the feeling of strangeness given to the user is lessened.

Furthermore, if information on the recognition accuracy includes information indicating that the recognition accuracy has been reduced because of the distance between the hand H173 and the outward camera 110 being too short, the display control unit 127 may perform display control such that the particles included in the effect E173 fly toward the user's face. This configuration enables the user to be induced to move the hand H173 away from the outward camera 110.

Furthermore, if information on the recognition accuracy includes information related to a portion low in recognition accuracy (for example, positional information), the display control unit 127 may control display such that the particles included in the effect E173 guide the hand H173 to a position that will be appropriately recognized. This configuration enables the user to be induced to move the hand H173 to a position that will be recognized highly accurately.

1-6. Effect

The first embodiment of the present disclosure has been described above. According to this embodiment, a feeling of strangeness given to a user is able to be lessened by control of display such that a boundary representation between a virtual object and a real object is made different according to recognition information related to recognition based on sensing of the real object.

2. Second Embodiment 2-1. Outline

Described next is a second embodiment of the present disclosure. The second embodiment is partly the same as the first embodiment, and thus description will be made while omission is made as appropriate. Description of any configuration that is the same as that described with respect to the first embodiment will hereinafter be omitted by assignment of the same reference sign thereto.

Figure 27:
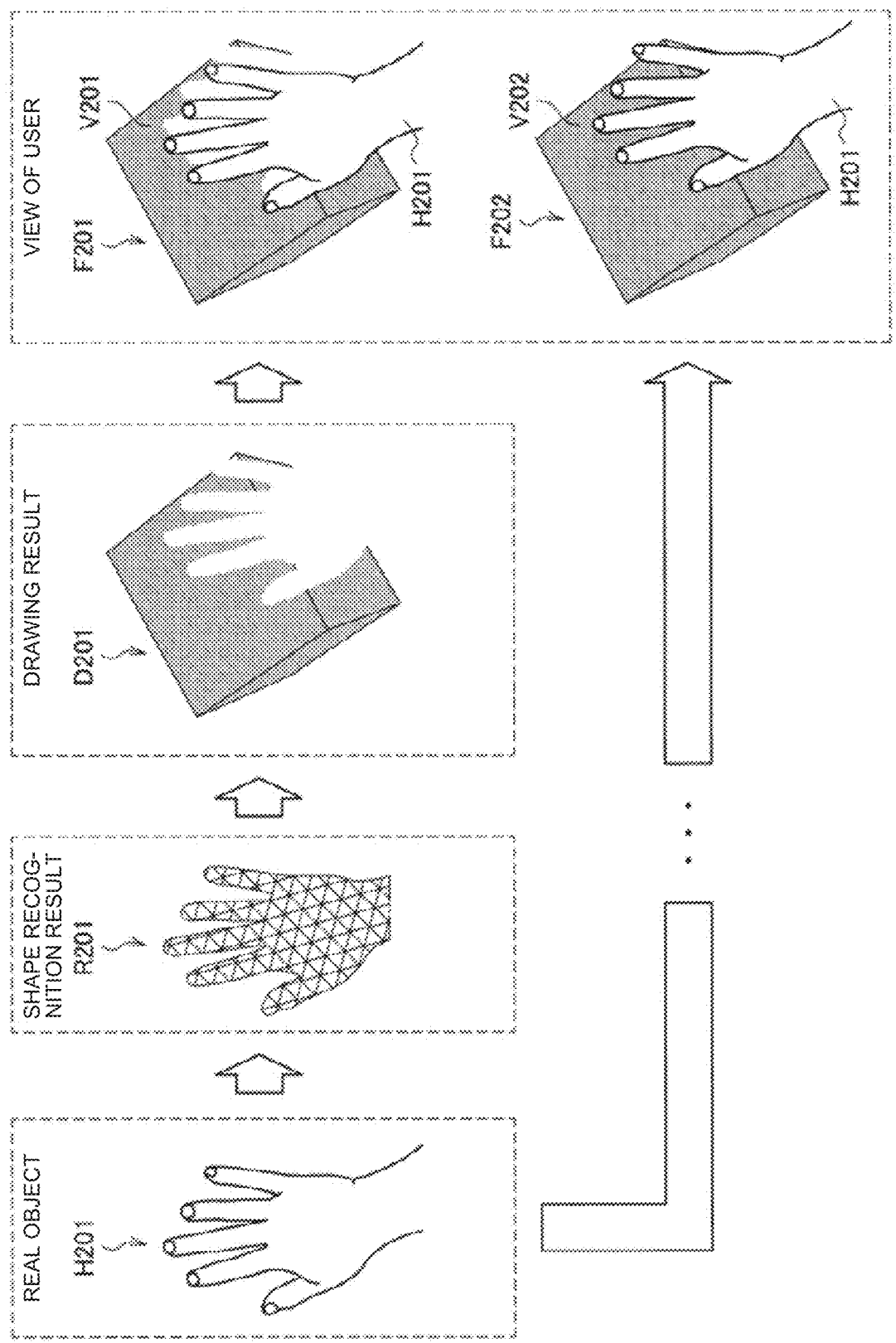
FIG. 27 is an explanatory diagram illustrating an outline of a second embodiment of the present disclosure.
Figure 28:
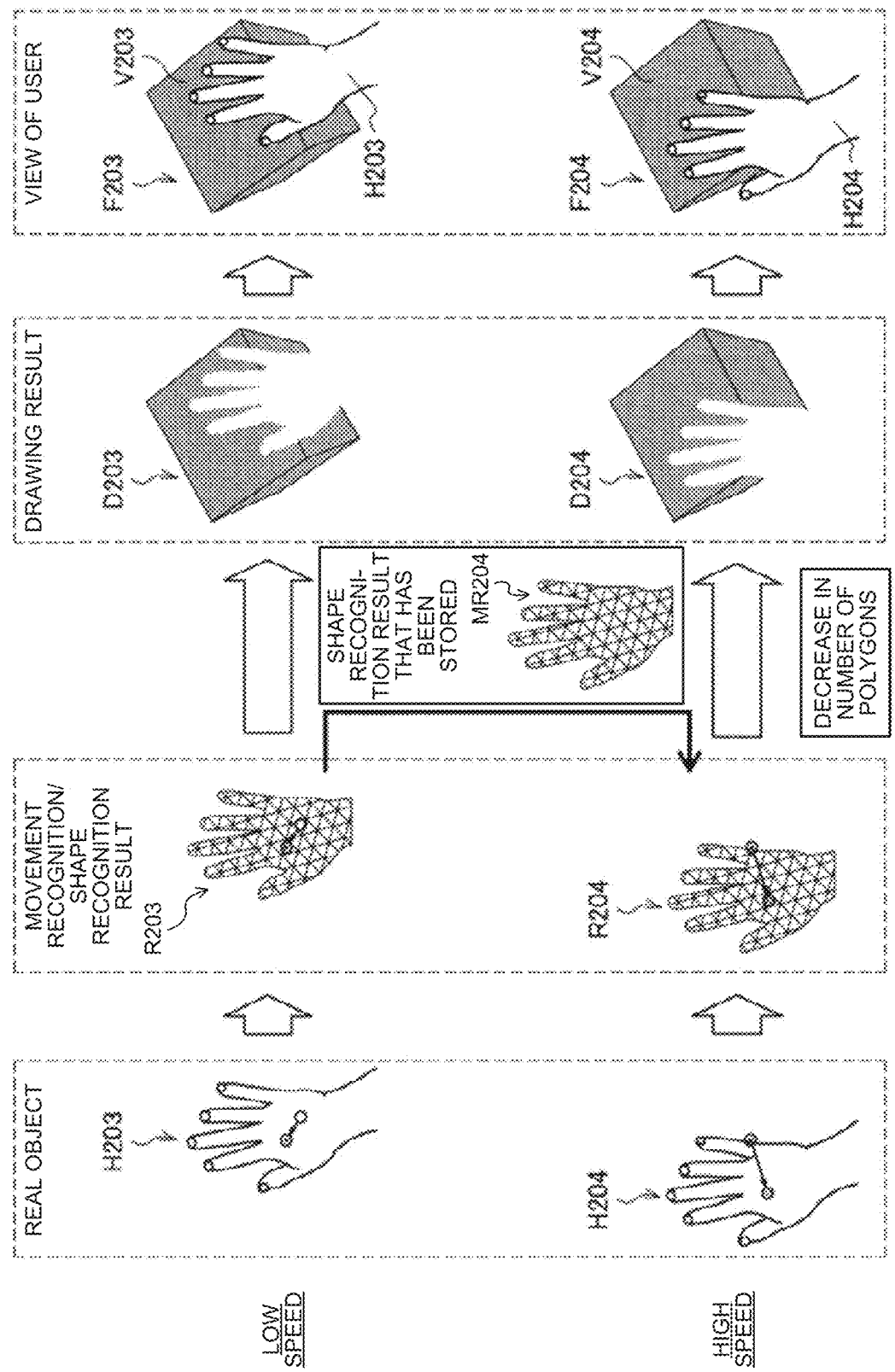
FIG. 28 is an explanatory diagram illustrating an outline of the second embodiment of the present disclosure.

FIG. 27 and FIG. 28 are explanatory diagrams illustrating an outline of the second embodiment of the present disclosure. As illustrated in FIG. 27, when shape recognition is performed based on sensing of a user's hand H201 that is a real object, a shape recognition result R201 is acquired. Furthermore, when drawing is performed based on the shape recognition result R201 such that a virtual object is shielded, a drawing result D201 is obtained. However, if the hand H201 moves while the above described processing related to the shape recognition and drawing is being performed, the view of the user becomes like a view F201. In the example with the view F201, due to influence of the movement of the hand H201, the boundary between a virtual object V201 and the user's hand H201 has become unnatural.

Therefore, according to this embodiment described below, a time period related to sensing of a real object to display is shortened by reduction of the processing load related to the shape recognition and the processing load related to the drawing. By the time period related to sensing of a real object to display being shortened, as illustrated in a view F202 in FIG. 27, the boundary between a virtual object V202 and a user's hand H202 becomes easier to be represented appropriately. As a result, the feeling of strangeness given to the user is lessened.

For example, the processing load related to shape recognition and the processing load related to drawing may be changed, according to the moving speed of the real object. More specifically, if movement information indicating that the moving speed of a real object is a first moving speed is acquired, at least one of the processing load related to shape recognition and the processing load related to drawing performed by the display control unit may be reduced more than in a case where movement information indicating that the moving speed of the real object is a second moving speed lower than the first moving speed is acquired. For example, if the moving speed of a real object is high (the moving speed of the real object is the first moving speed), the processing load related to shape recognition and the processing load related to drawing are desirably reduced. An example, in which the processing load is reduced according to the moving speed of a real object, will be described by reference to FIG. 28.

A user's hand H203 that is a real object illustrated in FIG. 28 is moving at low speed. An arrow on the hand H203 indicates the movement of the hand H203. Firstly, based on sensing of the hand H203, movement recognition is performed. If movement of the hand H203 is determined to be at low speed as a result of the movement recognition, shape recognition is performed, and a recognition result R203 is acquired. An arrow on the recognition result R203 indicates the movement of the hand H203 recognized by the movement recognition.

When drawing is performed based on the recognition result R203 such that a virtual object is shielded, a drawing result D203 is acquired, and when display is performed based on the drawing result D203, the view of the user becomes like a view F203. When the movement of the hand H203 is at low speed, influence of the movement of the hand H203 is small, and in the example with the view F203, the boundary between a virtual object V203 and the user's hand H203 can be represented appropriately.

On the contrary, a hand H204 illustrated in FIG. 28 is moving at high speed. If the movement of the hand H204 is determined to be at high speed as a result of movement recognition, based on sensing of the hand H204; a shape recognition result MR204, which is a result of shape recognition performed at an earlier time and has been stored, is reused. In this case, shape recognition may be not performed. Therefore, the processing load related to shape recognition is able to be largely reduced. In the example illustrated in FIG. 28, the stored shape recognition result MR204 is a shape recognition result included in the recognition result R203, but this embodiment is not limited to this example, and the stored shape recognition result MR204 may be, for example, a result of shape recognition performed on an immediately preceding frame.

By movement and change of the stored shape recognition result MR204 based on movement information acquired by movement recognition, a recognition result R204 is acquired. Furthermore, if movement of the hand H204 is determined to be at high speed, the number of polygons may be decreased before drawing is performed. By the decrease in the number of polygons, the processing load related to drawing is reduced. When drawing is performed such that a virtual object is shielded, based on the recognition result having the number of polygons decreased therein; a drawing result D204 is acquired, and the view of the user becomes like a view F204 when display is performed based on the drawing result D204. As described above, by the reduction in the processing load related to shape recognition and in the processing load related to drawing, even if the movement of the hand H204 is at high speed, the boundary between a virtual object V204 and the user's hand H204 is able to be represented appropriately in the example with the view F204.

An outline of this embodiment has been described hereinbefore. As described above, according to this embodiment, when the moving speed of a real object is high, by reduction of the processing load related to shape recognition and of the processing load related to drawing, influence of the movement of the real object is reduced, and the feeling of strangeness given to the user is lessened. Described hereinafter in detail is a configuration of this embodiment having such effects.

2-2. Configuration

Figure 29:
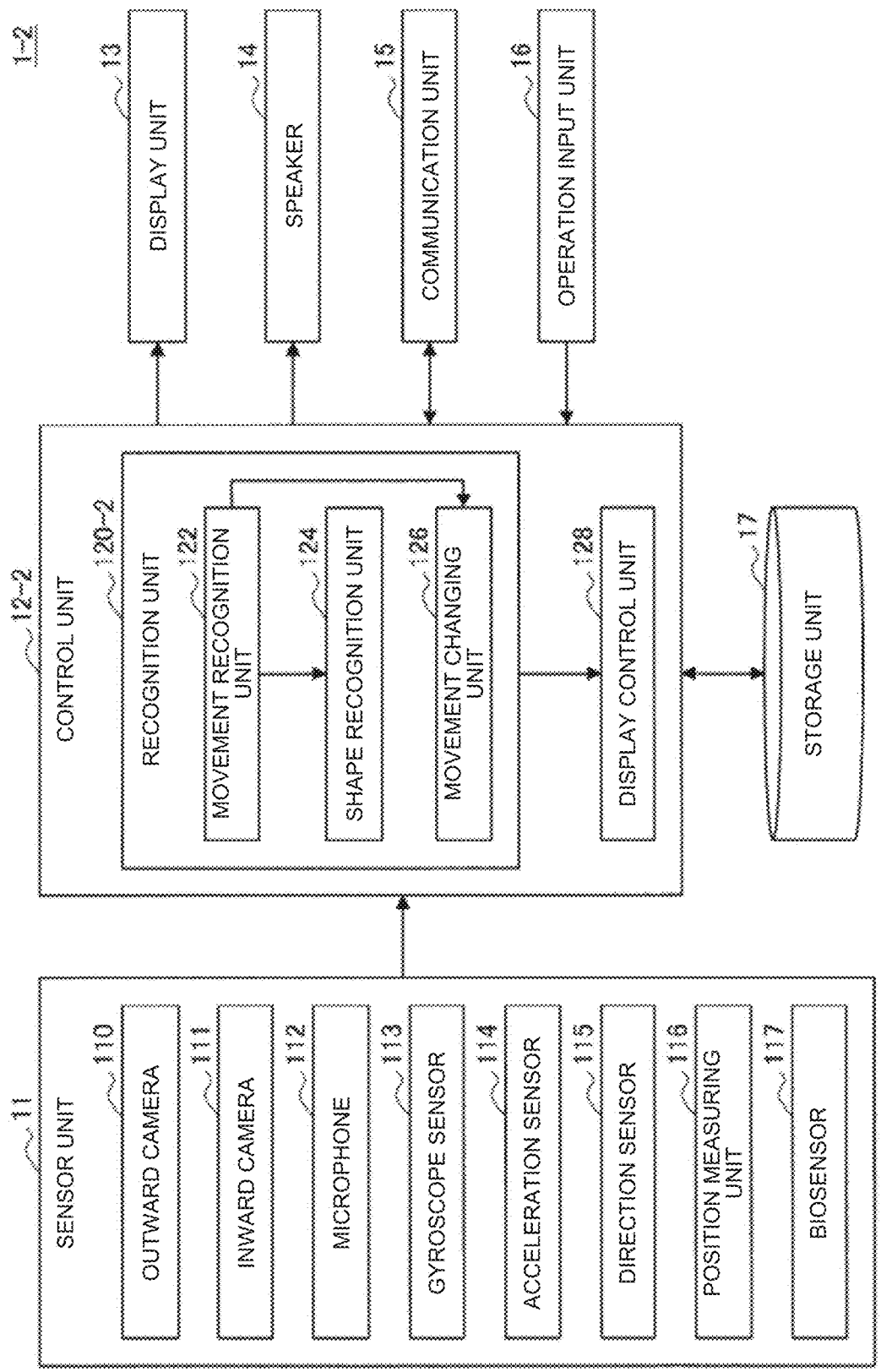
FIG. 29 is a block diagram illustrating an example of a configuration of an information processing device 1-2 according to the same embodiment.

FIG. 29 is a block diagram illustrating an example of a configuration of an information processing device 1-2 according to the second embodiment of the present disclosure. Among components illustrated in FIG. 29, components assigned with the same reference signs as those illustrated in FIG. 6 are the same as those illustrated in FIG. 6, and thus description thereof will be omitted. As illustrated in FIG. 29, the information processing device 1-2 according to this embodiment is different from the information processing device 1 according to the first embodiment in that functions of a control unit 12-2 thereof is partly different from those of the control unit 12 illustrated in FIG. 2.

Similarly to the control unit 12 according to the first embodiment, the control unit 12-2 functions as an arithmetic processing device and a control device, and controls the overall operation in the information processing device 1-2 according to various programs. Furthermore, the control unit 12-2 according to this embodiment functions as a recognition unit 120-2 and a display control unit 128, as illustrated in FIG. 8.

Similarly to the recognition unit 120 illustrated in FIG. 2, the recognition unit 120-2 has a function of performing recognition (including detection) of information related to a user or information related to the surrounding situation, based on various types of sensor information sensed by the sensor unit 11. As illustrated in FIG. 29, the recognition unit 120-2 according to this embodiment is different from the recognition unit 120 illustrated in FIG. 2 in that the recognition unit 120-2 has functions as a movement recognition unit 122, a shape recognition unit 124, and a moving and changing unit 126.

Based on sensing of a real object, the movement recognition unit 122 performs movement recognition related to movement of the real object. For example, based on a captured image acquired by sensing of the real object, the movement recognition unit 122 may recognize the centroid position of the real object and movement of the posture. The centroid position of a real object may be acquired by calculation of the centroid of a group of three-dimensional points acquired by three-dimensional recognition, or may be acquired as a two-dimensional centroid position of the real object detected from a captured image. Furthermore, principal component analysis around the centroid, or the like may be used in the detection of posture.

The movement recognition unit 122 recognizes the centroid position recognized and the movement of the posture between frames, acquires recognition information related to the recognition of movement, the recognition information being information on the moving speed of the real object determined by the recognition of movement, and provides this recognition information to the shape recognition unit 124, the moving and changing unit 126, and the display control unit 128.

The movement recognition unit 122 according to this embodiment desirably performs the recognition related to movement faster than the recognition performed by the shape recognition unit 124. As described above by reference to FIG. 28, control is performed such that at least one of the processing load related to the shape recognition performed by the shape recognition unit 124 and the processing load related to the drawing performed by the display control unit 128 is changed according to the movement information acquired through the movement recognition performed by the movement recognition unit 122. This control may be performed by the shape recognition unit 124 and the display control unit 128 performing determination based on the moving speed, or may be performed by the control unit 12-2 determining the processing mode. For example, the control unit 12-2 may determine the processing mode to be a high-speed mode when the moving speed is higher than a predetermined threshold, and may determine the processing mode to be a low-speed mode when the moving speed is equal to or less than the predetermined threshold. The shape recognition unit 124 and the display control unit 128 may then perform the shape recognition and drawing according to the processing mode determined by the control unit 12-2.

Based on sensing of a real object, the shape recognition unit 124 performs shape recognition for recognizing the three-dimensional shape of the real object. Furthermore, simultaneously with the shape recognition, the shape recognition unit 124 may recognize the position and posture of the real object. Moreover, based on the recognized three-dimensional shape of the real object, the shape recognition unit 124 generates a three-dimensional model represented by three-dimensional columns of vertices and sides, and provides the three-dimensional model serving as shape information, to the display control unit 127. As described by reference to FIG. 7 with respect to the first embodiment, the three-dimensional model of the real object generated by the shape recognition unit 124 is used as a shielding model for the display control unit 128 to perform drawing such that a virtual object is shielded. Furthermore, the three-dimensional model of the real object generated by the shape recognition unit 124 according to this embodiment is stored as a shape recognition result, into the storage unit 17.

Furthermore, similarly to the shape recognition unit 123 according to the first embodiment, the shape recognition unit 124 may perform prediction of the change in (the movement of) the three-dimensional shape of the real object, and generate a corrected three-dimensional model by correcting the three-dimensional shape of the real object based on the prediction.

Furthermore, as described by reference to FIG. 28, the shape recognition unit 124 according to this embodiment may not necessarily perform (may omit) the shape recognition if the moving speed of the real object included in the movement information provided from the movement recognition unit 122 is high (if the mode is the high-speed mode). This configuration largely reduces the processing load related to shape recognition when the moving speed is high, and this reduction in the processing load leads to decrease in the processing time period.

As described by reference to FIG. 28, the moving and changing unit 126 moves and changes the shape recognition result stored in the storage unit 17, based on the movement information provided from the movement recognition unit 122, if the moving speed of the real object is high (if the mode is the high-speed mode), the moving speed being included in the movement information. The change of the shape recognition result performed by the moving and changing unit 126 may include, for example, enlargement or reduction of the shape recognition result.

Furthermore, the movement and change of the shape recognition result by the moving and changing unit 126 is desirably performed faster than the shape recognition by the shape recognition unit 124. A shape recognition result acquired by the movement and change by the moving and changing unit 126 is provided to the display control unit 128, and used as a shielding model for drawing to be performed such that a virtual object is shielded.

This configuration enables faster acquisition of a shielding model used in drawing by reuse of a shape recognition result that has been stored even if the moving speed is high and shape recognition is not performed.

Similarly to the display control unit 127 according to the first embodiment, the display control unit 128 controls display on the display unit 13. For example, the display control unit 128 displays a virtual object on the display unit 13, such that the virtual object is visible simultaneously with the real space. Furthermore, similarly to the display control unit 127 according to the first embodiment, the display control unit 128 controls display such that shielding of a virtual object is performed, by using a shielding model.

Furthermore, as described by reference to FIG. 28, the display control unit 128 according to this embodiment may decrease the number of polygons in a shielding model, according to movement information acquired by movement recognition performed by the movement recognition unit 122. For example, when the moving speed included in the movement information is high (the mode is the high-speed mode), the display control unit 128 may perform drawing after decreasing the number of polygons in the shielding model. This configuration reduces the processing load related to drawing, and this reduction in the processing load leads to decrease in the processing time period.

Figure 30:
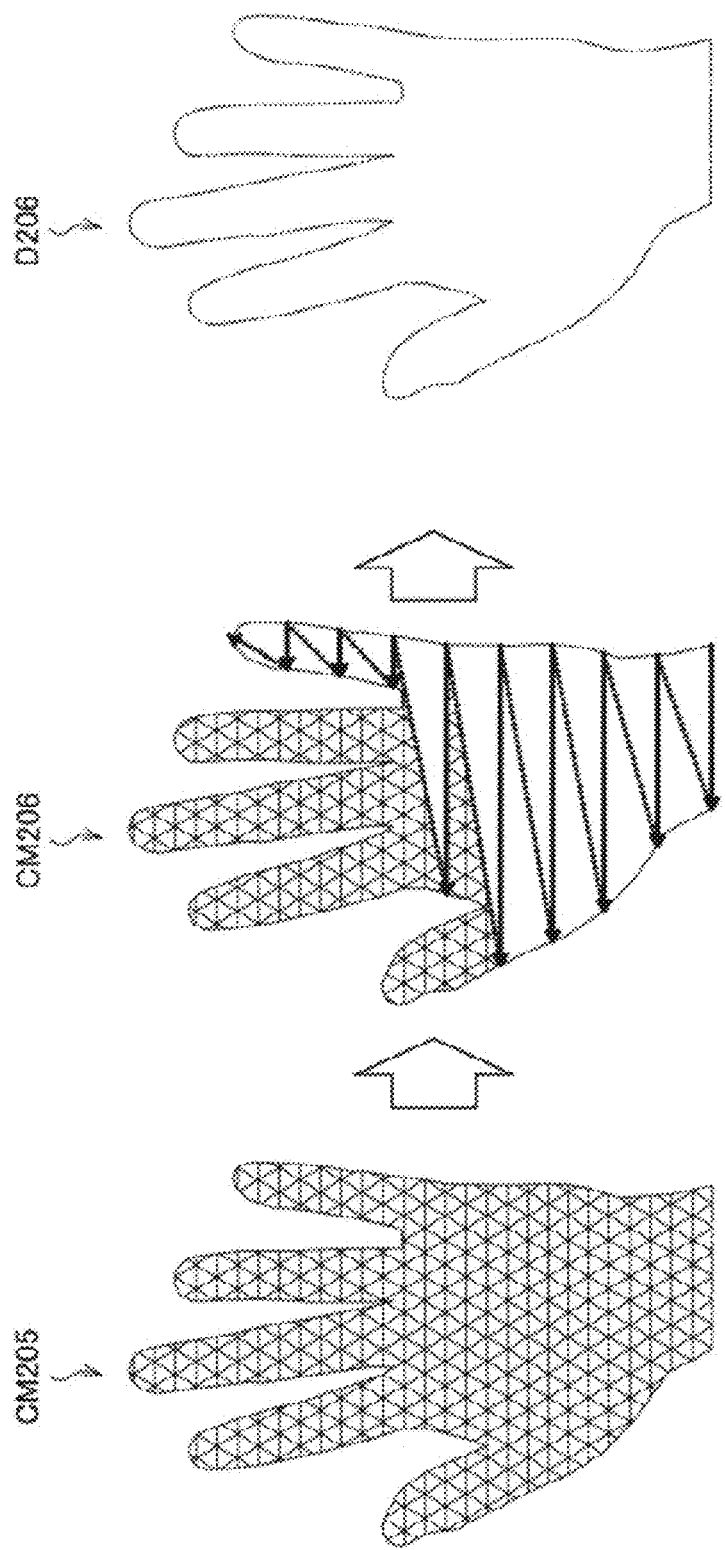
FIG. 30 is an explanatory diagram illustrating an example of decrease in the number of polygons in a shielding model by a display control unit 128 according to the same embodiment.

FIG. 30 is an explanatory diagram illustrating an example of decrease in the number of polygons in a shielding model by a display control unit 128. The display control unit 128 may generate a shielding model CM206 by decreasing the number of polygons in the shielding model CM205. The decrease in the number of polygons for generation of the shielding model CM206 may be performed by connecting the polygons while scanning in a horizontal direction in the shielding model CM205. By the display control unit 128 performing drawing based on this shielding model CM206, a drawing result D206 for the shielding model is acquired. The decrease in the number of polygons in a shielding model is not limited to the example illustrated in FIG. 30, and may be performed by various methods.

2-3. Operation

An example of the configuration of the information processing device 1 according to this embodiment has been described above. Described next is an example of operation according to this embodiment. Hereinafter, described by reference to FIG. 31 and FIG. 32 firstly is a comparative example that is an example of operation in a case where the processing load related to shape recognition and the processing load related to drawing are not reduced.

Figure 31:
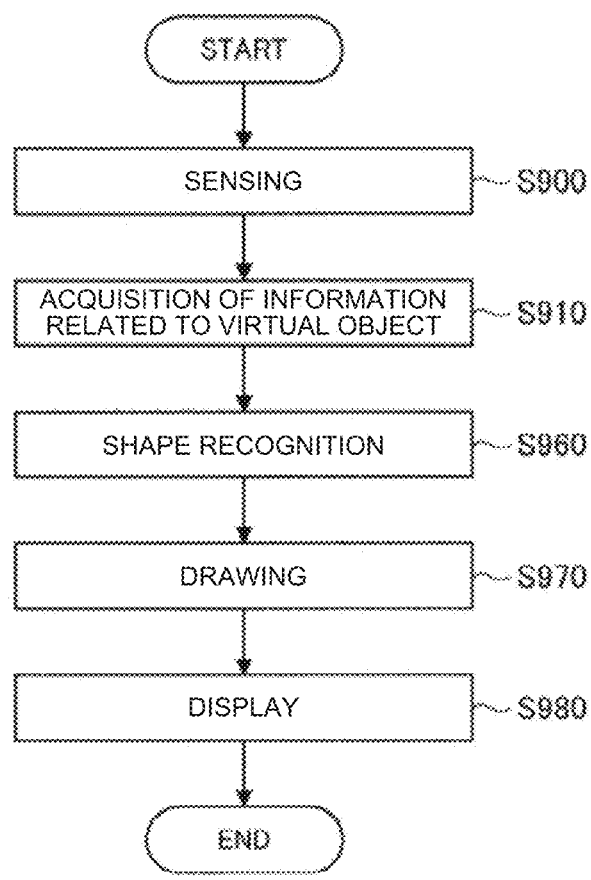
FIG. 31 is a flow chart illustrating operation in a comparative example for the same embodiment.

FIG. 31 is a flow chart illustrating the operation according to this comparative example. As illustrated in FIG. 31, firstly, sensing of a real object is performed (S900), and information related to a virtual object to be displayed is acquired (S910). Subsequently, based on a result of the sensing performed at Step S900, shape recognition for the real object is performed (S960). Furthermore, based on a result of the shape recognition performed at Step S960, drawing is performed such that a virtual object is shielded (S970). Based on a result of the drawing at Step S970, display is performed (S980).

Figure 32:
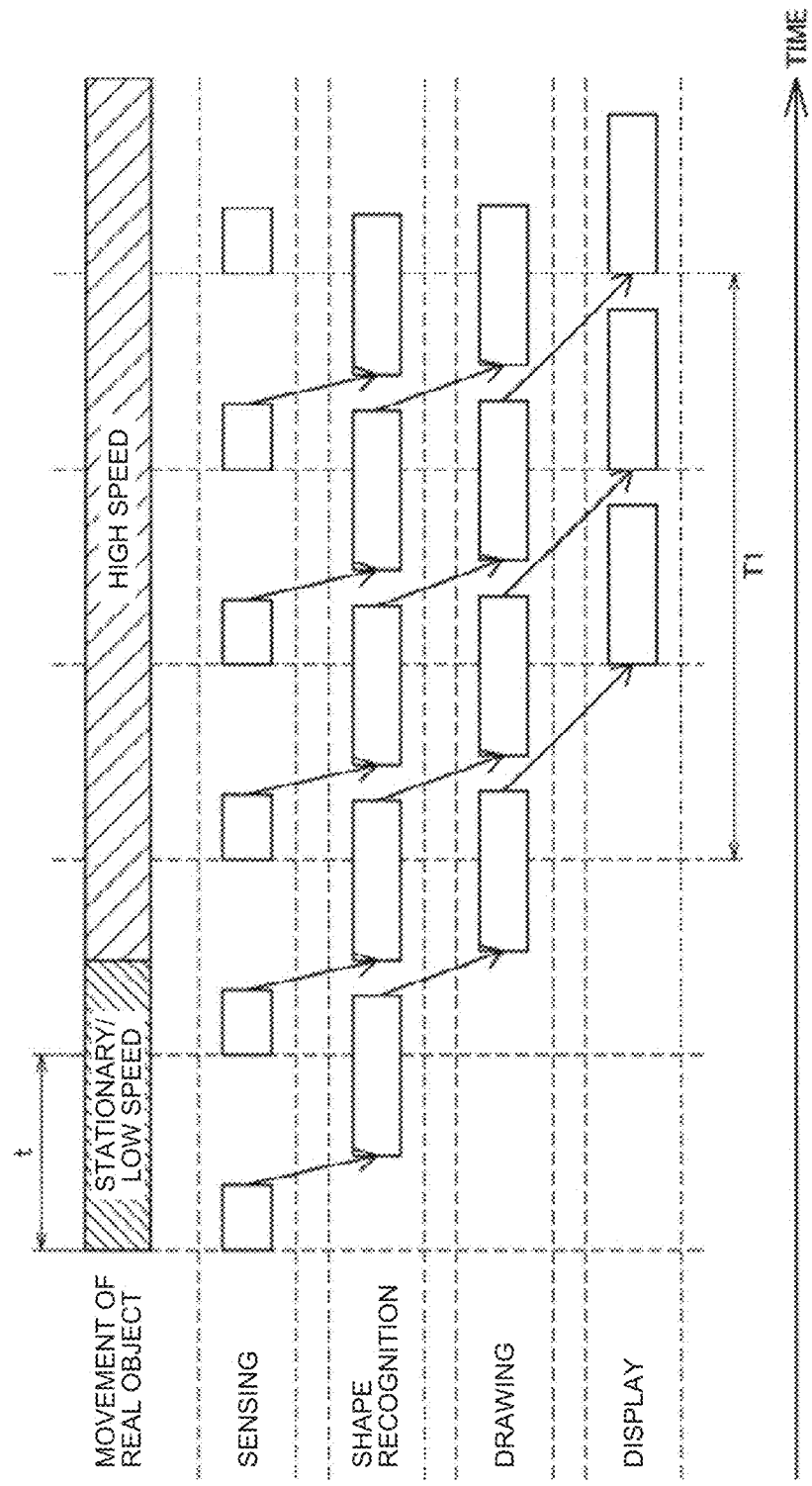
FIG. 32 is a timing chart related to the comparative example for the same embodiment.

FIG. 32 is a timing chart according to the comparative example. In the example illustrated in FIG. 32, regardless of the moving speed of the real object, a time period T1 is needed from the start of sensing to the start of display. The time period T1 is three times a sensing interval t as illustrated in FIG. 32. For example, when the sensing interval t is 1/60 second, 1/20 second is needed from the start of sensing to the start of display, and depending on the moving speed of the real object, the user may get a feeling of strangeness.

Figure 33:
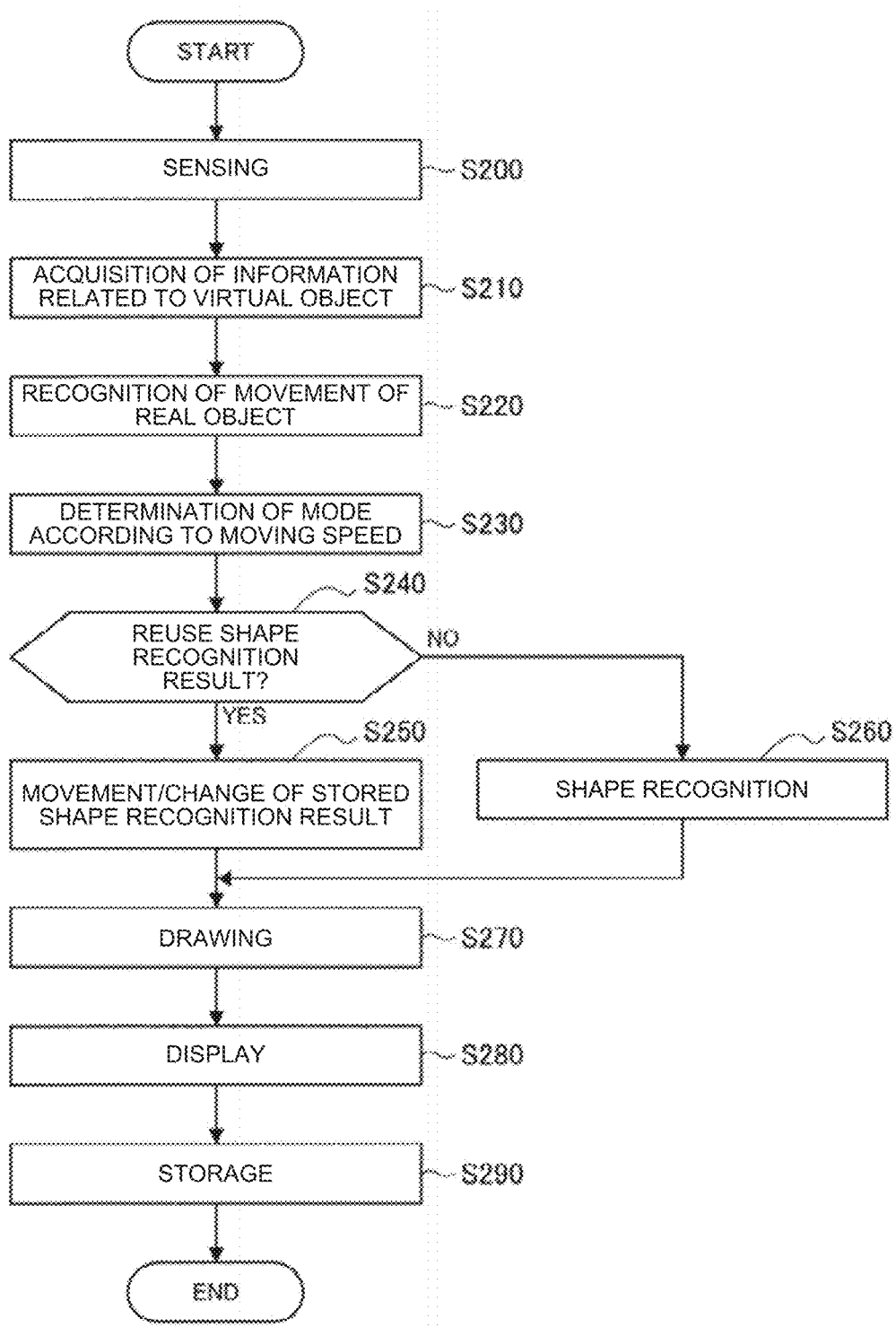
FIG. 33 is a flow chart illustrating an example of operation of the information processing device 1-2 according to the same embodiment.

Next, an example of operation of the information processing device 1-2 according to this embodiment will be described by reference to FIG. 33 and FIG. 34. FIG. 33 is a flow chart illustrating the example of the operation of the information processing device 1-2 according to this embodiment.

As illustrated in FIG. 33, firstly, the outward camera 110 of the sensor unit 11 performs sensing (for example, imaging) of a real object (S200). Subsequently, the display control unit 128 acquires information related to a virtual object to be displayed (S210).

Subsequently, the movement recognition unit 122 of the recognition unit 120-2 of the control unit 12-2 performs movement recognition related to movement of a real object, based on a result of the sensing performed at Step S200, and determines, for example, information on the moving speed (S220). Subsequently, based on the information on the moving speed determined at Step S220, the control unit 12-2 determines whether the mode is the low-speed mode or the high-speed mode (S230).

If the mode is the high-speed mode, a shape recognition result is reused (YES at S240), and the moving and changing unit 126 of the recognition unit 120-2 acquires a shielding model by moving and changing the shape recognition result that has been stored (S250). On the contrary, if the mode is the low-speed mode, a shape recognition result is not reused (NO at S240), and the shape recognition unit 124 of the recognition unit 120-2 generates a shielding model by performing shape recognition.

Subsequently, based on the shielding model acquired at Step S250 or Step S260, the display control unit 128 of the control unit 12-2 performs drawing such that a virtual object is shielded (S270). Furthermore, according to the control by the display control unit 128, the display unit 13 displays thereon the image (S280). Lastly, the latest shape recognition result is stored (S290).

Figure 34:
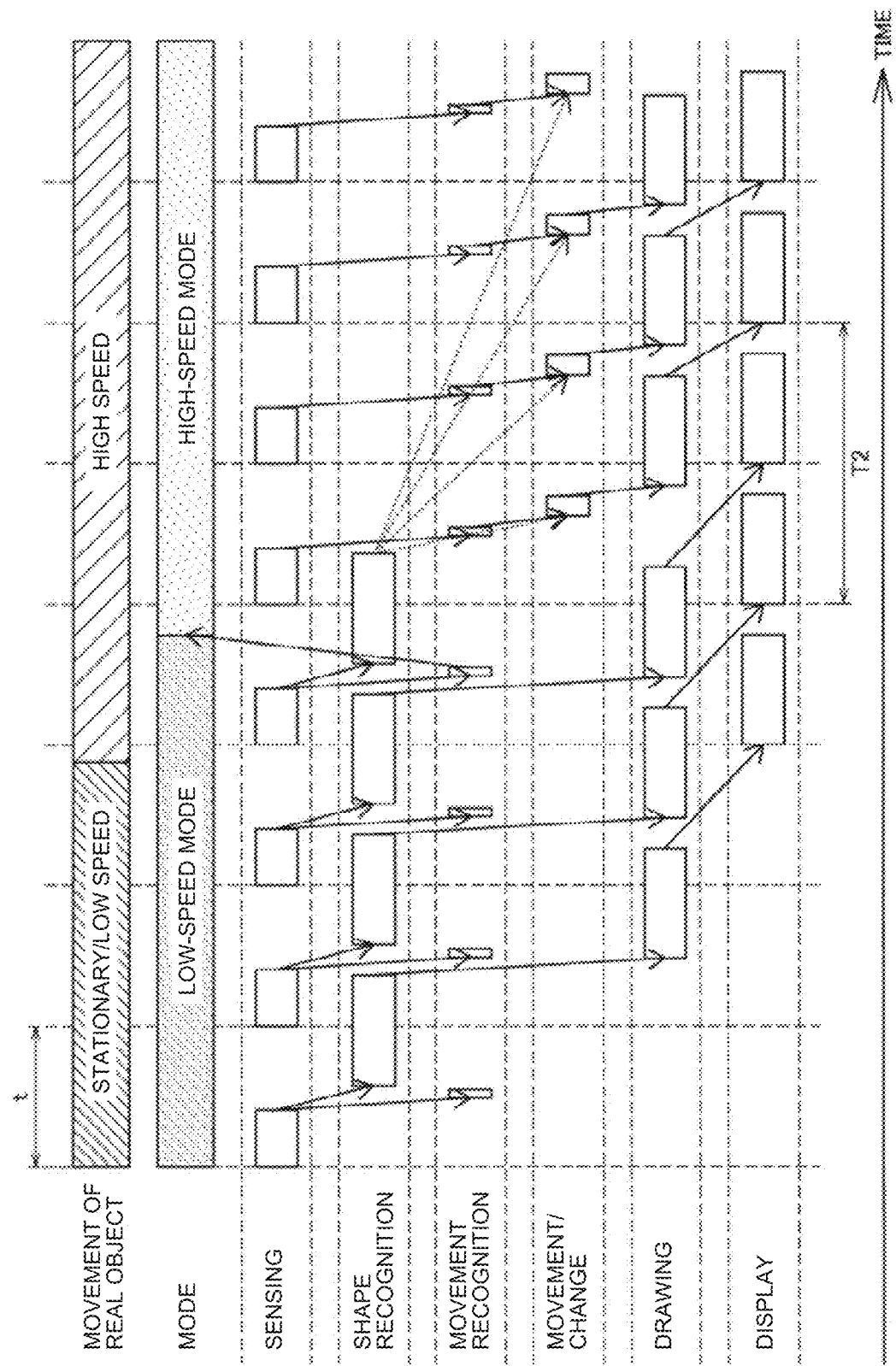
FIG. 34 is a timing chart related to the same embodiment.

FIG. 34 is a timing chart according to this embodiment. As illustrated in FIG. 34, according to this embodiment, in the high-speed mode, a time period T2 is needed from the start of sensing to the start of display. The time period T2 is twice a sensing interval t as illustrated in FIG. 34, and is shorter than the time period T1 illustrated in FIG. 32. Therefore, influence by the movement of the real object is reduced and the feeling of strangeness given to the user is lessened.

2-4. Modified Examples

The second embodiment of the present disclosure has been described above. Described hereinafter are some modified examples of this embodiment. The modified examples described below may each be applied to this embodiment alone or may be applied to this embodiment in combination. Furthermore, each of the modified examples may be applied in place of a configuration described with respect to the embodiment, or may be additionally applied a configuration described with respect to the embodiment.

Modified Example 2-1

Described above is an example where the shape recognition unit 124 recognizes the three-dimensional shape of a real object as a shape recognition result. However, the embodiment is not limited to this example. For example, the shape recognition unit 124 may recognize an approximate model that has a predetermined shape and is an approximation of the shape of a real object, the approximate model serving as a shape recognition result. For example, the predetermined shape may be a rectangular parallelepiped, an ellipsoid, or a cylinder. Furthermore, a three-dimensional model that covers the shape of a real object may be recognized as the approximate model. In this case, the moving and changing unit 126 may acquire a shielding model that is a shape recognition result, by using an approximate model that has been stored and moving and changing the approximate model, the approximate model serving as a shape recognition result that has been stored.

Figure 35:
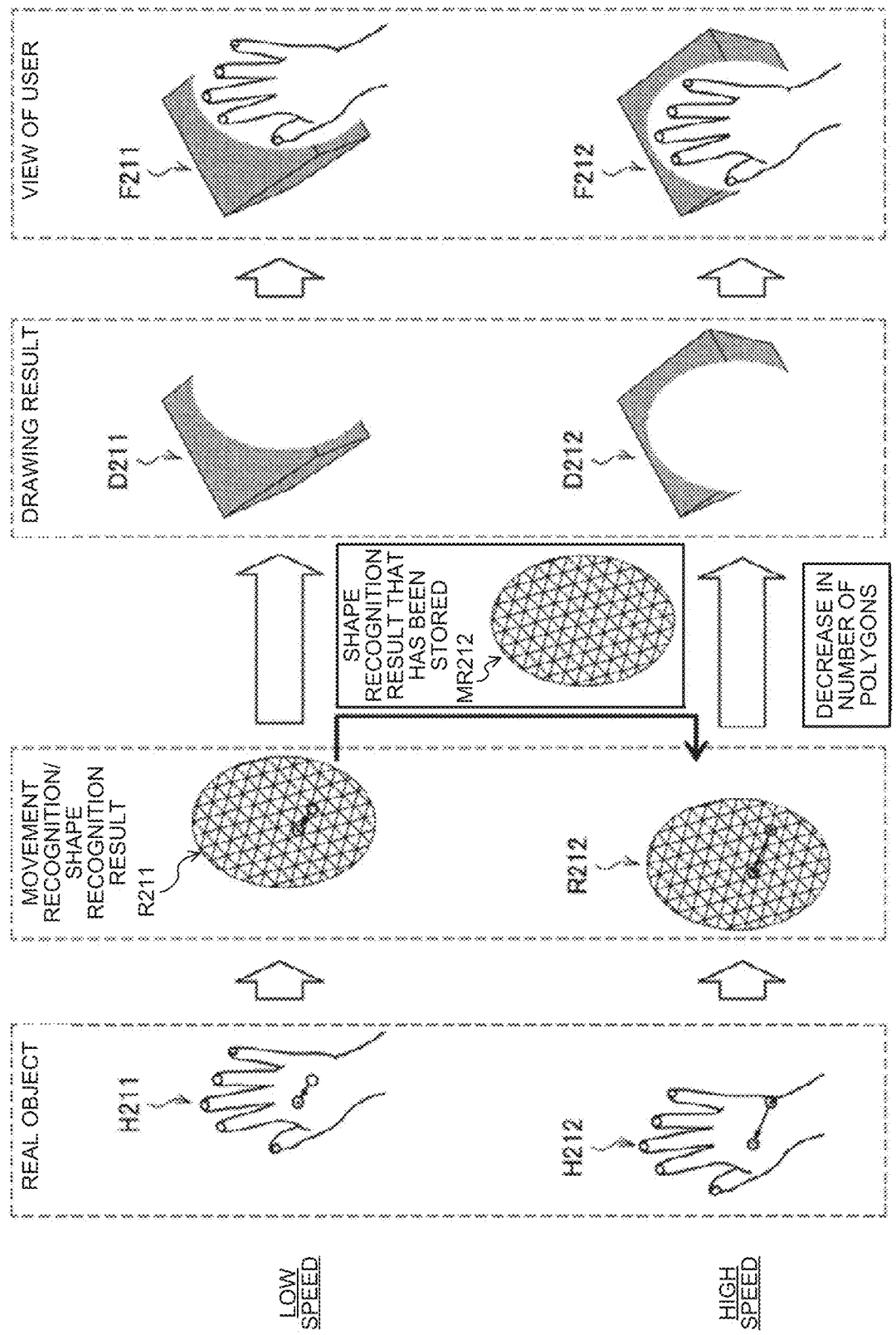
FIG. 35 is an explanatory diagram illustrating a modified example according to the same embodiment.

This modified example will be described by reference to FIG. 35. FIG. 35 is an explanatory diagram illustrating this modified example.

A user's hand H211 that is a real object illustrated in FIG. 35 is moving at low speed. An arrow on the hand H211 indicates movement of the hand H211. Firstly, based on sensing of the hand H211, movement recognition by the movement recognition unit 122 is performed. If the moving speed of the hand H211 is determined to be low (the mode is the low-speed mode) as a result of the movement recognition, shape recognition (recognition of an approximate model) is performed by the shape recognition unit 124, and a recognition result R211 is acquired. An arrow on the recognition result R211 indicates movement of the hand H211 recognized by the movement recognition unit 122.

When drawing is performed based on the recognition result R211 such that a virtual object is shielded, a drawing result D211 is acquired, and when display is performed based on the drawing result D211, the view of the user becomes like a view F211.

On the contrary, a hand H212 illustrated in FIG. 35 is moving at high speed. When movement recognition by the movement recognition unit 122 is performed based on sensing of the hand H212, and movement of the hand H212 is determined to be at high speed; a shape recognition result MR212, which is a result of shape recognition (recognition of an approximate model) performed at an earlier time and has been stored, is reused. In this case, shape recognition may be not performed. Therefore, the processing load related to shape recognition is able to be reduced greatly. In the example illustrated in FIG. 35, the stored shape recognition result MR212 is a shape recognition result included in the recognition result R211, but this embodiment is not limited to this example, and the stored shape recognition result MR212 may be, for example, a result of shape recognition performed on an immediately preceding frame.

By the moving and changing unit 126 moving and changing the stored shape recognition result MR212, based on movement information; a recognition result R212 is acquired. Furthermore, if movement of the hand H212 is determined to be at high speed, the number of polygons may be decreased before drawing is performed. By the decrease in the number of polygons, the processing load related to drawing is reduced. When drawing is performed such that a virtual object is shielded, based on the recognition result having the number of polygons decreased therein; a drawing result D212 is acquired, and the view of the user becomes like a view F212 when display is performed based on the drawing result D212.

The above described example illustrated in FIG. 35 is an example where the shape recognition unit 124 recognizes an approximate model as a shape recognition result when the moving speed is low (the movement is at low speed), but this modified example is not limited to this example. For example, according to the moving speed of a real object, the shape recognition unit 124 may switch between recognizing the three-dimensional shape of the real object and recognizing an approximate model of the real object. For example, if the moving speed is low, the shape recognition unit 124 may recognize the three-dimensional shape of the real object, and if the moving speed is high, the shape recognition unit 124 may recognize an approximate model of the real object. If the processing load related to the recognition of the approximate model of the real object is less than the processing load related to the recognition of the three-dimensional shape, this configuration reduces the processing load related to the shape recognition when the moving speed is high, and this reduction in the processing load leads to decrease in the processing time period.

Modified Example 2-2

An example where a shape recognition result is reused has been described above, but the embodiment is not limited to this example. A shielding model drawing result may be reused. Hereinafter, such a modified example will be described by reference to FIG. 36 and FIG. 42.

For example, the display control unit 128 according to the modified example may store, as a drawing result for a shielding model, data that have been made into a two-dimensional sprite from a shielding model region, into the storage unit 17. If the moving speed included in movement information is high (if the mode is the high-speed mode, that is, if the moving speed of a real object is the first moving speed), the display control unit 128 according to this modified example may perform drawing by using a stored drawing result for a shielding model, the stored drawing result being a result of drawing performed by the display control unit 128 at an earlier time. This configuration further reduces the processing load related to drawing.

Figure 36:
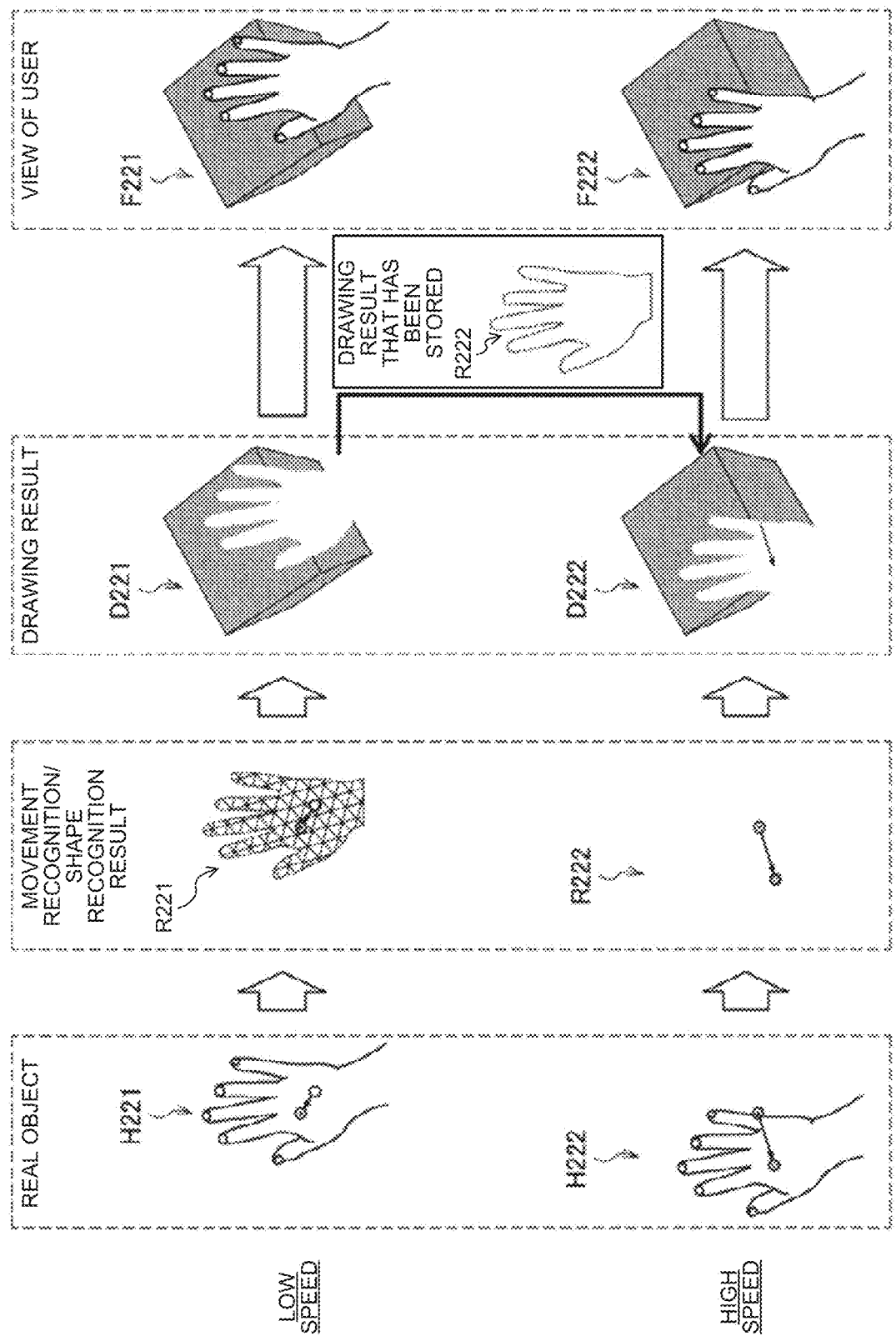
FIG. 36 is an explanatory diagram illustrating a modified example according to the same embodiment.

FIG. 36 is an explanatory diagram illustrating this modified example. A hand H221, a recognition result R221, a drawing result 221, and a view F221 of a user, which are illustrated in FIG. 36, are similar to the hand H203, the recognition result R203, the drawing result 203, and the view F203 of the user, which are illustrated in FIG. 28, and description thereof will thus be omitted.

A hand H222 illustrated in FIG. 36 is moving at high speed. When movement recognition by the movement recognition unit 122 is performed based on sensing of the hand H222, and the movement of the hand H222 is determined to be at high speed; the shape recognition unit does not perform shape recognition. Furthermore, according to this modified example, movement and change of a shape recognition result by the moving and changing unit 126 may be not performed either. Therefore, a recognition result R222 by the recognition unit 120-2 includes only movement information acquired by movement recognition performed by the movement recognition unit 122.

Based on the movement information, the display control unit 128 simplifies processing related to drawing by moving and changing a drawing result MD222 for a shielding model, the drawing result MD222 having been stored, and acquires a drawing result D222 having a virtual object shielded therein. An arrow on the drawing result D222 indicates movement of the stored shielding model drawing result MD222 that the display control unit 128 performs upon drawing. Furthermore, in the example illustrated in FIG. 36, the stored shielding model drawing result MD222 is a shielding model drawing result included in the drawing result D221, but the embodiment is not limited to this example, and the stored shielding model drawing result MD222 may be, for example, a result of drawing of a shielding model, the drawing having been performed for an immediately preceding frame.

When display is performed based on the drawing result D222, the view of the user becomes like a view F222.

As described above, by reuse of a shielding model drawing result, processing related to drawing of a shielding model is simplified, the processing time period is shortened, and thus the feeling of strangeness given to the user is able to be reduced even more.

Application of this modified example may be inappropriate depending on the type of interaction (including manipulation) induced by a virtual object. This is because if this modified example is applied and a shielding model drawing result is reused, determination of an anteroposterior relation between a virtual object and a shape recognition result (depth determination) is omitted, and drawing may be performed on the assumption that the shielding model is present nearer than the virtual object. Omission of determination of an anteroposterior relation will be described by reference to FIG. 37 to FIG. 40.

Figure 37:
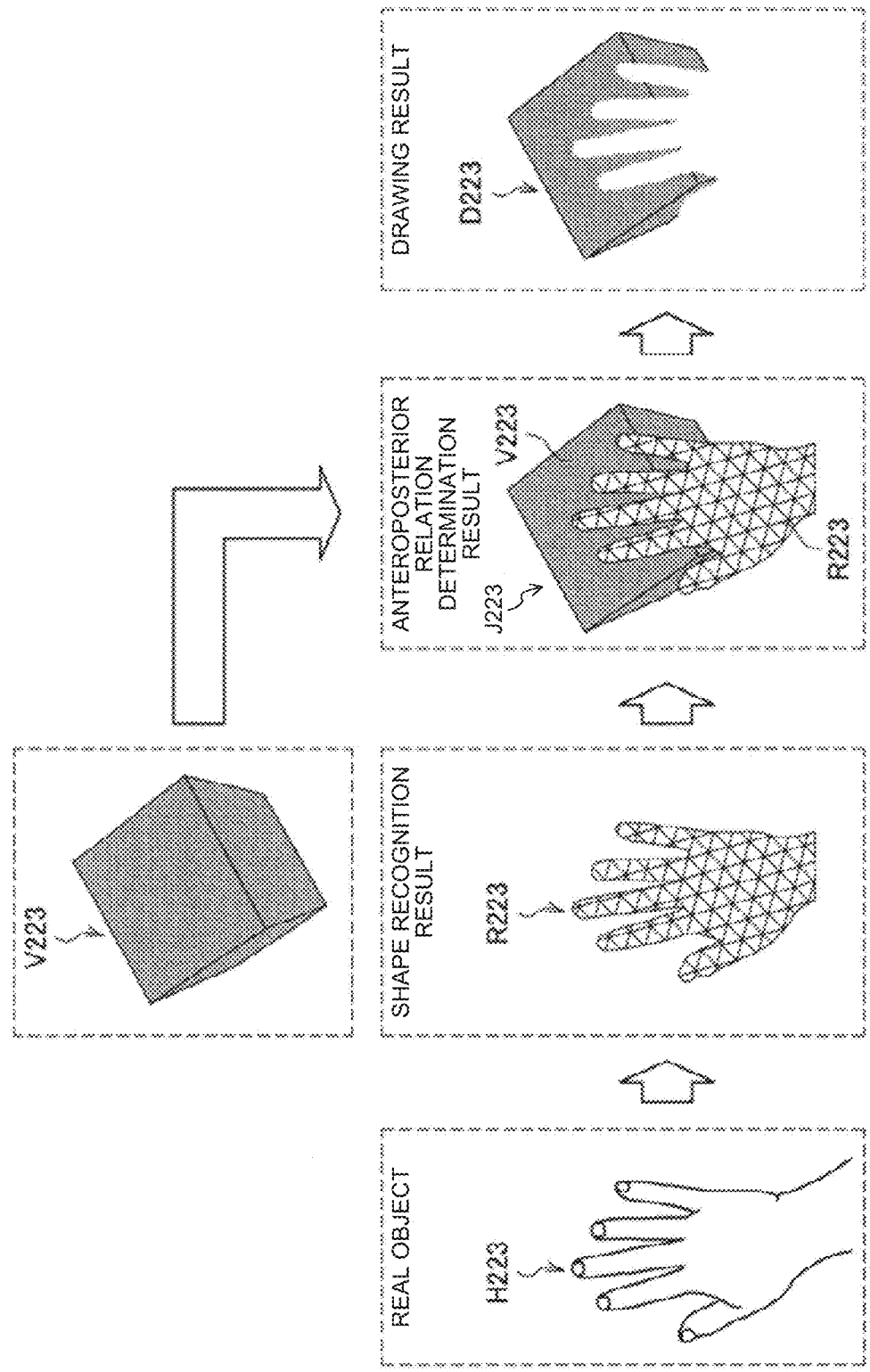
FIG. 37 is an explanatory diagram illustrating a flow from sensing to drawing in a case where determination of an anteroposterior relation is performed.

FIG. 37 is an explanatory diagram illustrating a flow from sensing to drawing in a case where determination of an anteroposterior relation is performed. As illustrated in FIG. 37, shape recognition is performed based on sensing of a user's hand H223 that is a real object, and a shape recognition result R223 (a shielding model) is acquired. When drawing is performed such that a virtual object V223 is shielded based on the shape recognition result R223, determination of an anteroposterior relation between the virtual object V223 and the shape recognition result R223 is performed, and based on an anteroposterior relation determination result J223, a drawing result D223 is acquired.

Figure 38:
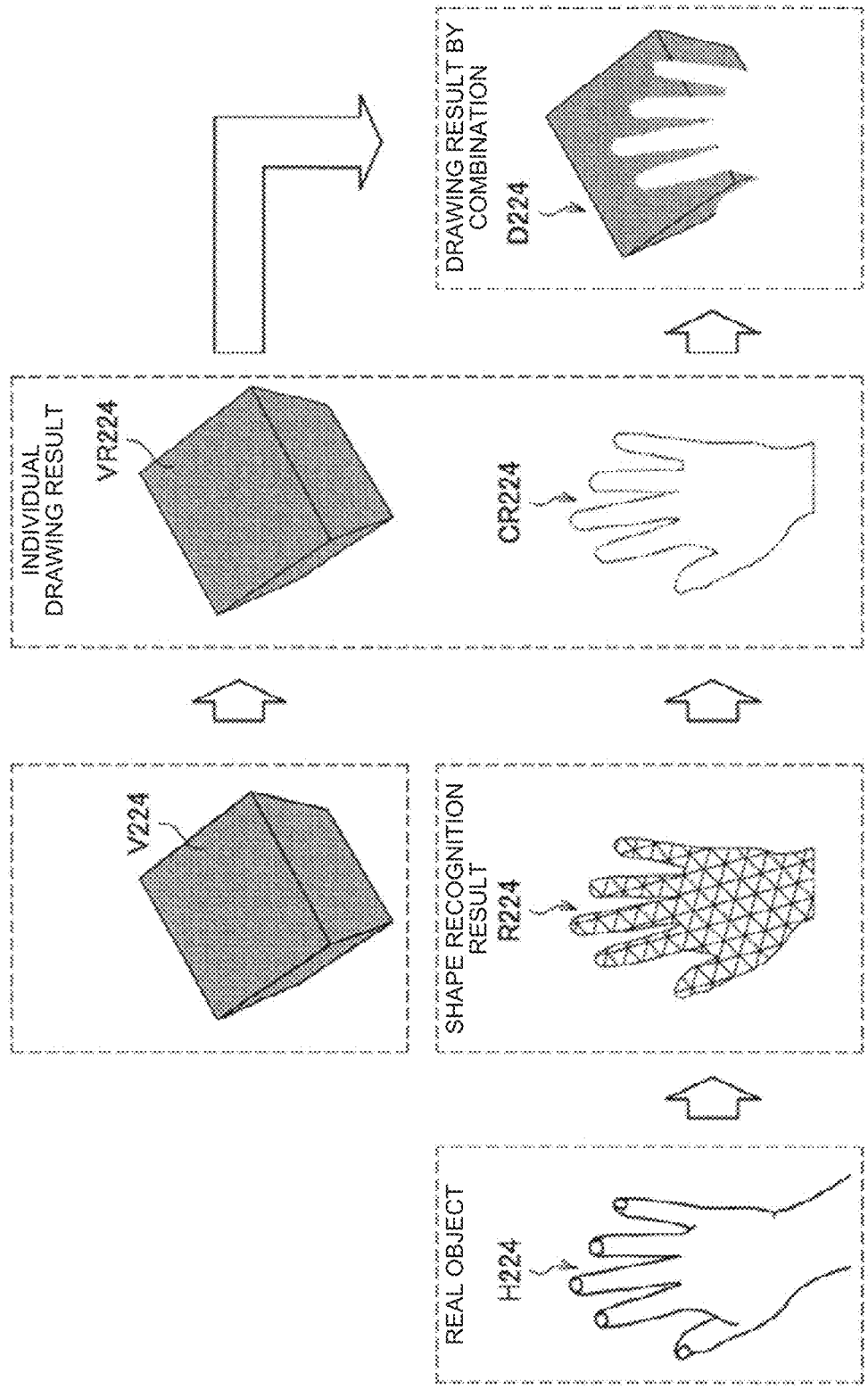
FIG. 38 is an explanatory diagram illustrating a flow from sensing to drawing in a case where determination of an anteroposterior relation is omitted.

FIG. 38 is an explanatory diagram illustrating a flow from sensing to drawing in a case where determination of an anteroposterior relation is omitted. As illustrated in FIG. 38, when shape recognition is performed based on sensing of a user's hand H224 that is a real object, a shape recognition result R224 (a shielding model) is acquired. In the example illustrated in FIG. 38, a virtual object V224 and the shape recognition result R224 are drawn individually, and a virtual object region VR224 and a shielding model region CMR224 are acquired. By combination of the virtual object region VR224 and the shielding model region CMR224, a drawing result D224 is acquired.

As described above, when determination of an anteroposterior relation is omitted, drawing is performed on the assumption that the shielding model is present nearer than the virtual object.

Figure 40:
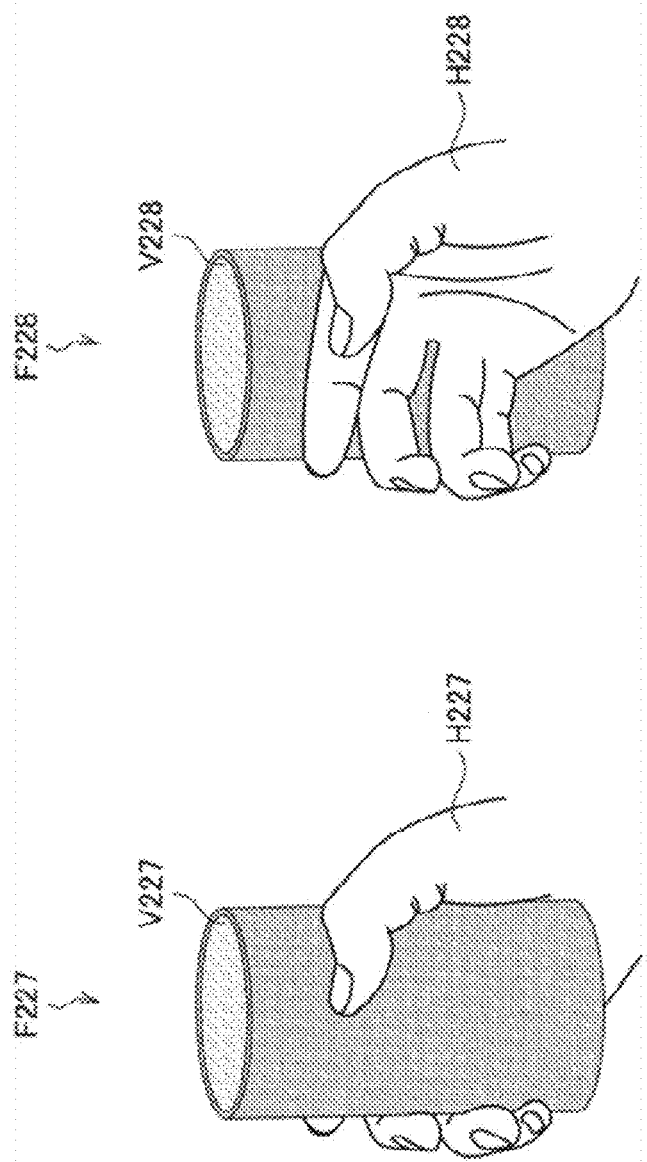
FIG. 40 is an explanatory diagram illustrating an example of interaction where the appearance may largely differ between a case where determination of an anteroposterior relation is performed and a case where the determination is omitted.

FIG. 39 is an explanatory diagram illustrating an example of interaction that is able to be displayed appropriately even if determination of an anteroposterior relation is omitted. FIG. 40 is an explanatory diagram illustrating an example of interaction where the view may largely differ between a case where determination of an anteroposterior relation is performed and a case where the determination is omitted.

As illustrated in FIG. 39, in a case where an interaction, such as pressing, touching, or hitting, is performed, a feeling of strangeness is not generated from the relation between a virtual object V225 and a hand H225 in a user's view F225 and the relation between a virtual object V226 and a hand H226 in a user's view F226.

On the contrary, as illustrated in FIG. 40, in a case where an interaction, such as holding or grasping, is performed, a view F227 in a case where determination of an anteroposterior relation is performed and a view F228 in a case where determination of an anteroposterior relation is omitted differ largely in their appearance. In the case where determination of an anteroposterior relation is performed, a feeling of strangeness is not generated from the relation between a virtual object V227 and a hand H227, in the view F227. However, in the case where determination of an anteroposterior relation is omitted, a feeling of strangeness is generated from the relation between a virtual object V228 and a hand H228, in the view F228. Specifically, in the view F228, the hand H228 is visible in a region where the hand H228 is supposed to be present on a far side of the virtual object V228 and thus invisible.

The display control unit 128 thus may determine whether or not to reuse a shielding model drawing result, based on the type of the virtual object or the type of interaction performed by the user. For example, when a virtual object that induces an interaction, such as grabbing or grasping, is to be displayed, or when this interaction is known to be being performed from a recognition result by the recognition unit 120-2, the display control unit 128 may not necessarily reuse the shielding model drawing result.

According to this configuration, as a result of omission of determination of an anteroposterior relation, a user is able to be prevented from getting a feeling of strangeness.

Figure 41:
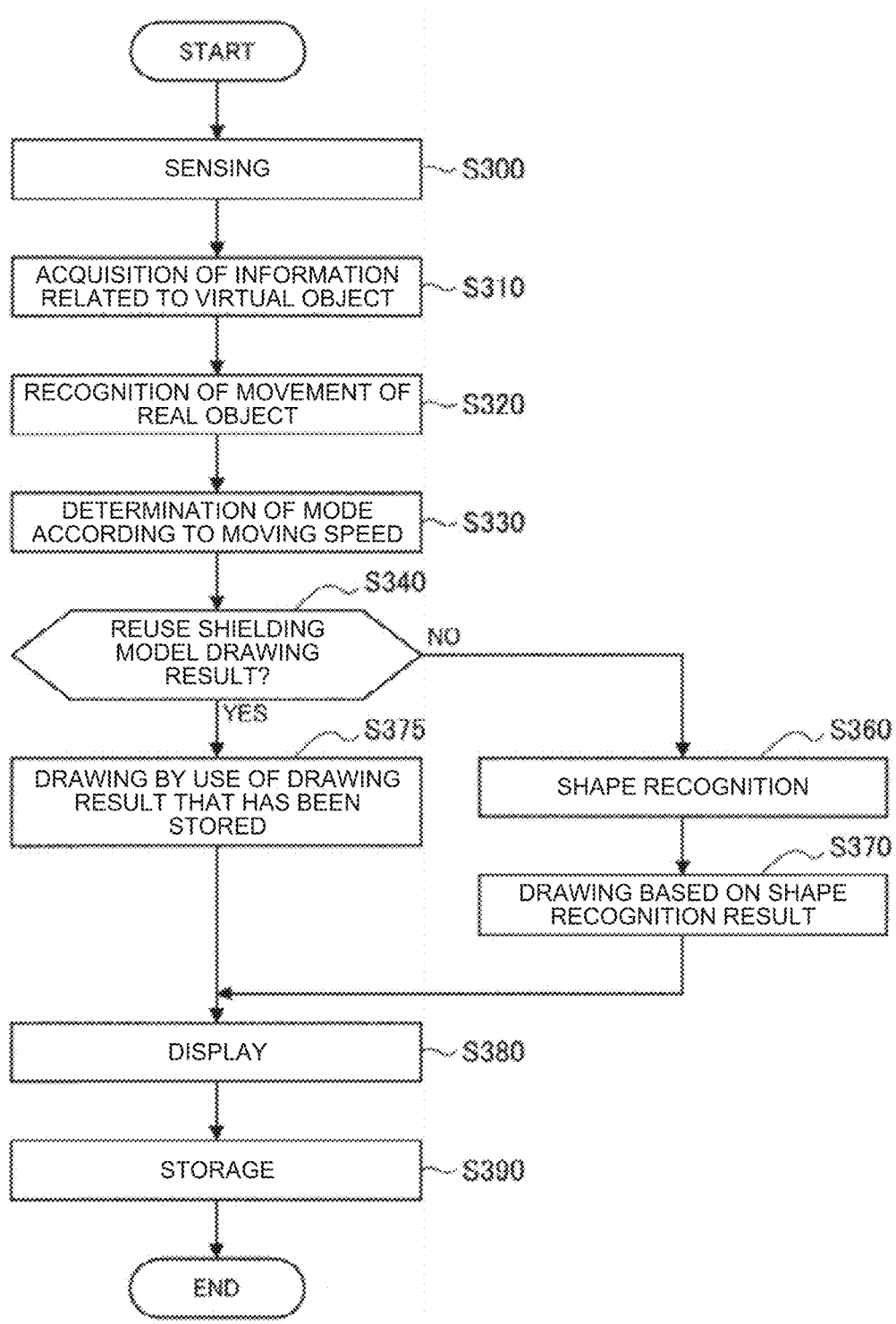
FIG. 41 is a flow chart illustrating an example of operation in a modified example according to the same embodiment.

Next, an example of operation in this modified example will be described by reference to FIG. 41 and FIG. 42. FIG. 41 is a flow chart illustrating the example of the operation in this modified example.

Since Steps S300 to S330 illustrated in FIG. 41 are the same as the processing at Steps S200 to S230 described by reference to FIG. 33, description thereof herein will be omitted.

At Step S340, whether or not a shielding model drawing result is to be reused is determined. The determination at Step S340 may be performed based on, in addition to information on whether the mode is the high-speed mode or the low-speed mode, the type of the virtual object or the type of interaction as described by reference to FIG. 37 to FIG. 40.

If the shielding model drawing result is not to be reused (NO at S340), the shape recognition unit 124 generates a shielding model by performing shape recognition (S360), and the display control unit 128 performs drawing, based on the shielding model, which is a shape recognition result (S370).

On the contrary, if the shielding model drawing result is to be reused (YES at S340), the display control unit 128 performs drawing by movement and change of a shielding model drawing result that has been stored (S375).

Furthermore, the display unit 13 displays thereon a corresponding image, according to control by the display control unit 128 (S380). Lastly, the latest shielding model drawing result is stored (S390).

Figure 42:
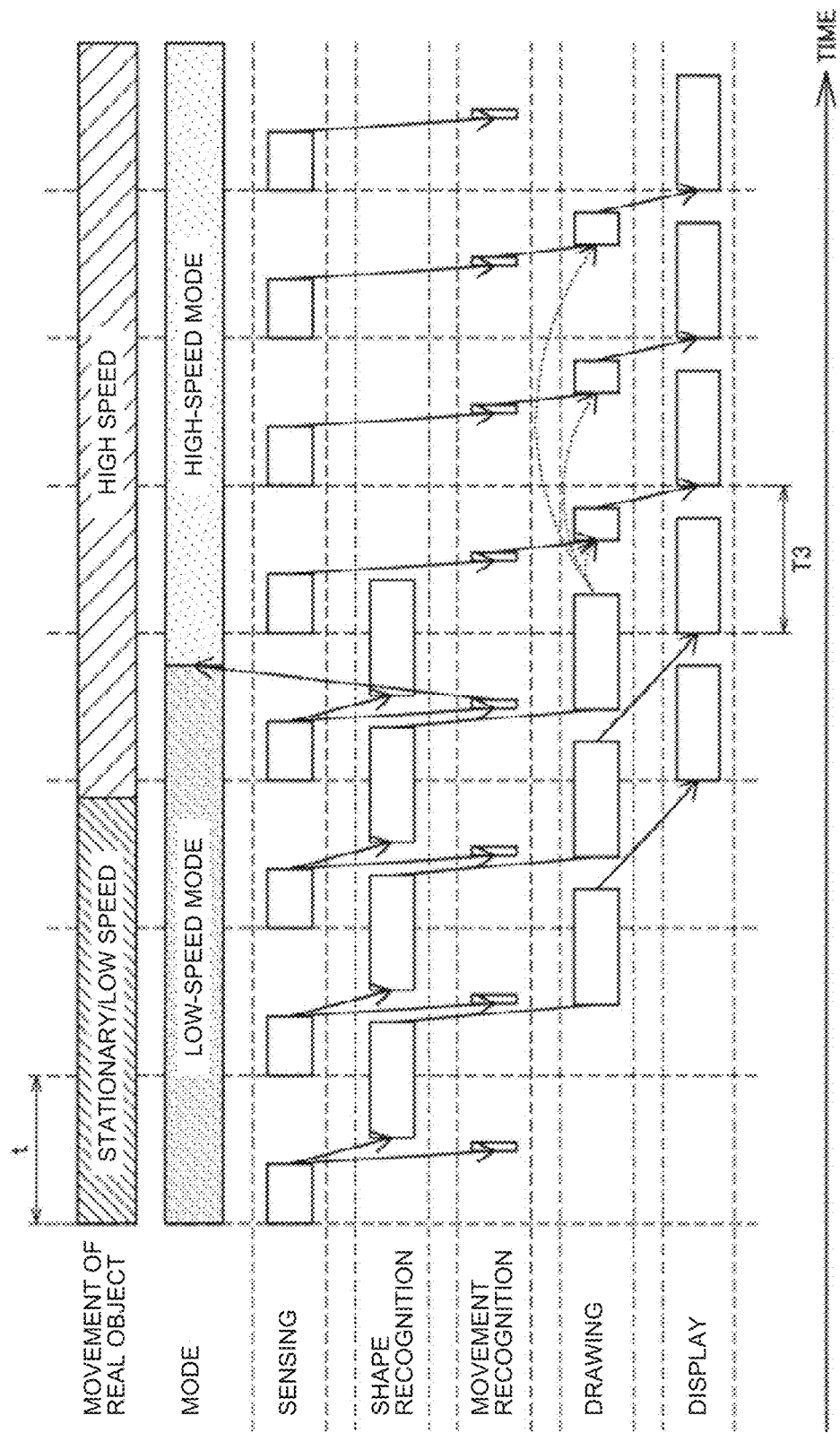
FIG. 42 is a timing chart related to the modified example according to the same embodiment.

FIG. 42 is a timing chart related to this modified example. As illustrated in FIG. 42, in this modified example, in the high-speed mode, a time period T3 is needed from the start of sensing to the start of display. The time period T3 has the same time period as the sensing interval t as illustrated in FIG. 42, and is shorter than the time period T1 illustrated in FIG. 32 and the time period T2 illustrated in FIG. 34. Therefore, influence by the movement of the real object is reduced even more and the feeling of strangeness given to the user is reduced.

Modified Example 2-3

With respect to the above described embodiment, an example, in which the processing load related to drawing is reduced by decrease in the number of polygons before drawing is performed, has been described, but the embodiment is not limited to this example. For example, if the shape recognition unit 124 performs shape recognition based on a depth map, the resolution of the depth map may be decreased according to the moving speed before the shape recognition unit 124 performs shape recognition.

This modified example will be described by reference to FIG. 43. FIG. 43 is an explanatory diagram illustrating this modified example.

A user's hand H231 that is a real object illustrated in FIG. 43 is moving at low speed. The processing mode is thus determined to be the low-speed mode.

Based on sensing of the hand H231, a depth map DM231 is acquired. Subsequently, based on the depth map, shape recognition is performed by the shape recognition unit 124, and a shape recognition result R231 is acquired. Plural arrows on the shape recognition result 231 respectively indicate shape changes that have been predicted upon shape recognition by the shape recognition unit 124.

When the display control unit 128 performs drawing such that a virtual object is shielded based on the shape recognition result R231, a drawing result D231 is acquired, and when display is performed based on the drawing result D231, the view of the user becomes like a view F231.

A user's hand H232 that is a real object illustrated in FIG. 43 is moving at high speed. Therefore, based on a result of movement recognition by the movement recognition unit 122, the processing mode is thus determined to be the high-speed mode, although this is not illustrated in FIG. 43.

Based on sensing of the hand H232, a depth map DM232 is acquired. When the control unit 12-2 according to this modified example performs processing in the high-speed mode, the control unit 12-2 may input the depth map DM232 into the shape recognition unit 124 after decreasing the resolution of the depth map DM232. A shape recognition result acquired as a result of shape recognition by use of the depth map DM232 that has been decreased in resolution is lower in the number of polygons and has less information on the shape change predicted, as compared to the shape recognition result R231. That is, when the shape recognition unit 124 performs shape recognition by using the depth map DM232 that has been decreased in resolution, the processing load related to shape recognition including prediction of shape change is reduced.

By the display control unit 128 performing drawing after the number of polygons has been decreased for the shape recognition result R232, a drawing result D232 is acquired. As the resolution of the depth map DM232 is decreased, the number of polygons in the shape recognition result R232 is less than that in the shape recognition result R231. Therefore, even if the decrease in the number of polygons is not performed, the processing load related to drawing based on the shape recognition result R232 is less than the processing load related to drawing based on the shape recognition result R231. Therefore, if the number of polygons in the shape recognition result R232 is sufficiently small, the decrease in the number of polygons may be not performed. When display is performed based on the drawing result D232, the view of the user becomes like a view F232.

Depth maps may be acquired by various methods. For example, if plural cameras are included in the outward camera 110, a depth map may be acquired by stereo matching using plural captured images. Furthermore, if a depth camera is included in the outward camera 110, a depth map may be acquired by sensing performed by the depth camera.

Furthermore, if the resolution of a depth map output by the depth camera is controllable by setting and the like, the control unit 12-2 may control the output resolution of the depth camera included in the outward camera 110, according to determination of the processing mode.

According to this modified example, by decrease in the resolution of a depth map, both the processing load related to shape recognition and the processing load related to drawing are able to be reduced even more.

2-5. Supplemental Description

Described above is the second embodiment of the present disclosure. According to the second embodiment, by change of the processing load related to shape recognition and the processing load related to drawing, according to movement information; influence of movement of the real object is able to be reduced, and the feeling of strangeness given to the user is able to be reduced.

The second embodiment of the present disclosure may be combined with the first embodiment of the present disclosure. By combination of the first embodiment and the second embodiment, for example, the feeling of strangeness given to the user is able to be reduced even further due to effects of both the boundary representation being made different and the processing time period being shortened.

Furthermore, according to the above description, the processing mode is determined by classification into two levels, the low-speed mode and the high-speed mode, but the processing mode may be determined by classification into more levels, and various types of processing may be performed according to the determined processing mode.

FIG. 44 is a table that is a collection of examples of processing in a case where the real object is assumed to be a hand, and the processing mode is determined by classification into six levels, a stationary mode, a superlow-speed mode, a low-speed mode, a medium-speed mode, a high-speed mode, and an ultrahigh-speed mode. As illustrated in FIG. 44, according to the processing mode, the above described processing, such as the decrease in the resolution of the depth map, the omission of shape recognition, the omission of anteroposterior determination, the reuse of a drawing result, and/or the change of a boundary representation described with respect to the first embodiment, may be performed as appropriate.

By processing being performed according to the table illustrated in FIG. 44, when the moving speed of the whole hand is low, processing emphasizing the accurateness of recognition and display is able to be preferentially performed, and when the moving speed of the whole hand is high, processing that reduces the feeling of strangeness associated with the movement of the hand is able to be preferentially performed.

3. Example of Hardware Configuration

Figure 45:
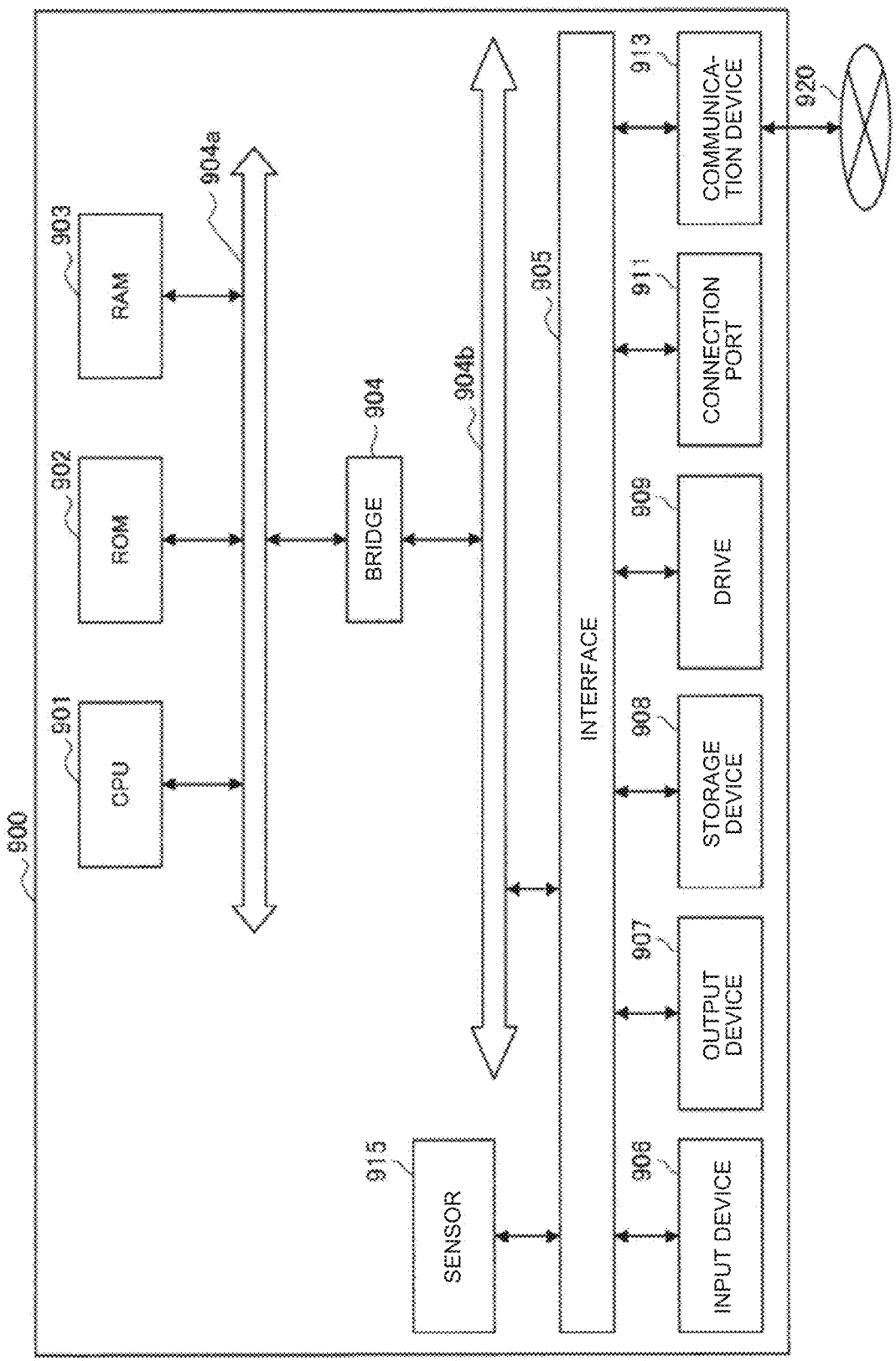
FIG. 45 is a block diagram illustrating an example of a hardware configuration.

Embodiments of the present disclosure have been described above. Described lastly by reference to FIG. 45 is a hardware configuration of an information processing device according to an embodiment of the present disclosure. FIG. 45 is a block diagram illustrating an example of the hardware configuration of the information processing device according to the embodiment of the present disclosure. An information processing device 900 illustrated in FIG. 45 may realize, for example, the information processing device 1 or the information processing device 1-2. Information processing by the information processing device 1 or the information processing device 1-2, according to the embodiment, is realized by cooperation between software and hardware described below.

As illustrated in FIG. 45, the information processing device 900 includes a central processing unit (CPU) 901, a read only memory (ROM) 902, a random access memory (RAM) 903, and a host bus 904a. Furthermore, the information processing device 900 includes a bridge 904, an external bus 904b, an interface 905, an input device 906, an output device 907, a storage device 908, a drive 909, a connection port 911, a communication device 913, and a sensor 915. The information processing device 900 may have, instead of the CPU 901, or in addition to the CPU 901, a processing circuit, such as a DSP or an ASIC.

The CPU 901 functions as an arithmetic processing device and a control device, and controls the overall operation in the information processing device 900 according to various programs. Furthermore, the CPU 901 may be a microprocessor. The ROM 902 stores therein the programs, arithmetic parameters, and the like, which are used by the CPU 901. The RAM 903 temporarily stores therein a program used in execution by the CPU 901, parameters that change in the execution as appropriate, and the like. The CPU 901 may form, for example, the control unit 12, or the control unit 12-2.

The CPU 901, the ROM 902, and the RAM 903 are connected to one another via the host bus 904a including a CPU bus or the like. The host bus 904a is connected to the external bus 904b, such as a peripheral component interconnect/interface (PCI) bus, via the bridge 904. The host bus 904a, the bridge 904, and the external bus 904b are not necessarily configured separately, and their functions may be implemented by a single bus.

The input device 906 is realized by a device, into which information is input by a user, the device being, for example, a mouse, a keyboard, a touch panel, a button, a microphone, a switch, and/or a lever. Furthermore, the input device 906 may be, for example: a remote control device that uses infrared rays or other waves, or an externally connected device, such as a cellular phone or a PDA, which corresponds to operation of the information processing device 900. Moreover, the input device 906 may include an input control circuit or the like that generates an input signal, based on, for example, information input by the user by use of the above described input means, and outputs the input signal to the CPU 901. The user of the information processing device 900 is able to input various data to the information processing device 900 and instruct the information processing device 900 for processing and operation, by manipulating this input device 906.

The output device 907 is formed of a device that is able to visually or aurally notify the user of acquired information. Examples of this device include: display devices, such as a CRT display device, a liquid crystal display device, a plasma display device, an EL display device, and a lamp; sound output devices, such as a speaker and headphones; and printer devices. The output device 907 outputs, for example, results acquired by various types of processing performed by the information processing device 900. Specifically, a display device visually displays the results acquired by the various types of processing performed by the information processing device 900 in various formats, such as text, image, table, and graph formats. A sound output device converts an audio signal formed of reproduced sound data, acoustic data, or the like, into an analog signal, and aurally outputs the analog signal. The output device 907 may form, for example, the display unit 13 and the speaker 14.

The storage device 908 is a device for data storage, the device being formed as an example of a storage unit of the information processing device 900. The storage device 908 is realized by, for example, a magnetic storage device, such as an HDD, a semiconductor storage device, an optical storage device, or a magneto-optical storage device. The storage device 908 may include a storage medium, a recording device that records data into the storage medium, a reading device that reads data from the storage medium, and a deleting device that deletes the data recorded in the storage medium. This storage device 908 stores therein the programs executed by the CPU 901, various data, various types of data acquired from outside, and the like. The storage device 908 may form, for example, the storage unit 17.

The drive 909 is a storage media reader-writer, and is incorporated in or provided externally to the information processing device 900. The drive 909 reads information recorded in a removable storage medium that has been inserted therein, such as a magnetic disk, an optical disk, a magneto-optical disk, or a semiconductor memory, and outputs the information to the RAM 903. Furthermore, the drive 909 is able to write information into the removable storage medium.

The connection port 911 is an interface connected to an external device, and serves as a connection port to the external device, the connection port enabling data transmission via, for example, a universal serial bus (USB).

The communication device 913 is a communication interface formed of, for example, a communication device for connection to a network 920. The communication device 913 is, for example, a communication card for a wired or wireless local area network (LAN), Long Term Evolution (LTE), Bluetooth (registered trademark), or a wireless USB (WUSB). Furthermore, the communication device 913 may be a router for optical communication, a router for an asymmetric digital subscriber line (ADSL), a modem for any of various types of communication, or the like. This communication device 913 is able to transmit and receive signals and the like according to a predetermined protocol, for example, TCP/IP, to and from, for example, the Internet or another communication device. The communication device 913 may form, for example, the communication unit 15.

The sensor 915 is, for example, any of various sensors, such as an acceleration sensor, a gyroscope sensor, a geomagnetic sensor, an optical sensor, a sound sensor, a distance measuring sensor, and a force sensor. The sensor 915 acquires information related to the state of the information processing device 900 itself, such as the posture or moving speed of the information processing device 900, and/or information related to the surrounding environment of the information processing device 900, such as brightness or unwanted sound around the information processing device 900. Furthermore, the sensor 915 may include a GPS sensor that receives a GPS signal and measures the latitude, longitude, and altitude of the device. The sensor 915 may form, for example, the sensor unit 11.

The network 920 is a wired or wireless transmission path for information transmitted from the device connected to the network 920. For example, the network 920 may include a public network, such as the Internet, a telephone network, or a satellite communication network; or any of various local area networks (LANs) and wide area networks (WANs) including Ethernet (registered trademark). Furthermore, the network 920 may include a leased line network, such as an internet protocol-virtual private network (IP-VPN).

An example of the hardware configuration that is able to realize functions of the information processing device 900 according to the embodiment of the present disclosure has been described above. Each of the above described components may be realized by use of a versatile member, or may be realized by hardware specific to a function of that component. Therefore, a hardware configuration to be used may be modified, as appropriate, according to the technical level at the time the embodiment of the present disclosure is implemented.

A computer program for realizing the functions of the information processing device 900 according to the embodiment of the present disclosure as described above may be generated and installed on a PC or the like. Furthermore, a computer-readable recording medium having such a computer program stored therein may also be provided. The recording medium is, for example, a magnetic disk, an optical disk, a magneto-optical disk, or a flash memory. Moreover, without use of the recording medium, the above described computer program may be distributed via, for example, a network.

4. Conclusion

As described above, according to embodiments of the present disclosure, a feeling of strangeness given to a user is able to be lessened.

Preferred embodiments of the present disclosure have been described in detail above by reference to the appended drawings, but the technical scope of the present disclosure is not limited to these examples. It is evident that a person having ordinary skill in the technical field of the present disclosure can derive various modified examples or corrected examples within the scope of the technical ideas written in the patent claims, and it is understood that these modified examples or corrected examples also rightfully belong to the technical scope of the present disclosure.

For example, with respect to the above described embodiments, the examples, in which the display unit 13 is of the transmissive type, have been described mainly, but the present techniques are not limited to these examples. For example, when the display unit 13 is of the non-transmissive type, by display with a virtual object superimposed on an image of real space acquired by imaging with the outward camera 110, effects similar to those described above are also able to be achieved. Furthermore, when the display unit 13 is a projector, by projection of a virtual object on real space, effects similar to those described above are also able to be achieved.

Furthermore, with respect to the above described embodiments, the examples where the real objects are hands of the users have been described mainly, but the present techniques are not limited to these examples, and are applicable to various real objects that are present in real space.

Furthermore, the steps according to the above described embodiments are not necessarily processed chronologically along the order written in the flow charts. For example, the steps in the processing according to the above described embodiments may be processed in order different from the order illustrated in the flow charts, or may be processed parallelly.

Furthermore, the effects described in this specification are just explanatory or exemplary, and are not limiting. That is, the techniques according to the present disclosure may achieve other effects evident to those skilled in the art from the description in this specification, in addition to the above described effects or instead of the above described effects.

The following configurations also belong to the technical scope of the present disclosure.

(1)

An information processing device, comprising:

a display control unit that controls, when recognition information related to recognition based on sensing of a real object includes first recognition information, shielding display representing shielding of a virtual object by the real object such that the shielding display presents a first boundary representation at a boundary between the virtual object and the real object or at a position near the boundary, and that controls, when the recognition information includes second recognition information different from the first recognition information, the shielding display such that the shielding display presents a second boundary representation different from the first boundary representation at the boundary or at a position near the boundary.

(2)

The information processing device according to (1), wherein the display control unit controls the shielding display by using shape information acquired by shape recognition based on sensing of the real object.

(3)

The information processing device according to (1), wherein the display control unit controls, according to the first recognition information, the shielding display such that a shielding region related to the shielding has a first size, and controls, according to the second recognition information, the shielding display such that the shielding region has a second size different from the first size.

(4)

The information processing device according to (3), wherein the display control unit controls, when the recognition information includes the first recognition information, the shielding display such that a region in the shielding region has the first size, the region corresponding to positional information included in the recognition information, and controls, when the recognition information includes the second recognition information, the shielding display such that the region in the shielding region has the second size, the region corresponding to the positional information.

(5)

The information processing device according to any one of (1) to (4), wherein the display control unit controls, according to the recognition information, the shielding display such that effect display is added at a position near the boundary.

(6)

The information processing device according to any one of (1) to (5), wherein the display control unit controls, according to the recognition information, the shielding display such that effect display is added inside a shielding region related to the shielding.

(7)

The information processing device according to any one of (1) to (6), wherein when controlling display such that the real object collides with the virtual object, the display control unit controls the shielding display such that effect display is added near a boundary related to the collision between the real object and the virtual object.

(8)

The information processing device according to any one of (5) to (7), wherein the display control unit controls the shielding display such that the effect display is added at a position corresponding to positional information included in the recognition information.

(9)

The information processing device according to any one of (5) to (8), wherein the display control unit controls, in a case where the recognition information includes the first recognition information, the effect display such that the effect display has an intensity different from that in a case where the recognition information includes the second recognition information.

(10)

The information processing device according to any one of (1) to (9), wherein the display control unit controls, in a case where the recognition information includes the first recognition information, display of the virtual object such that the virtual object has visibility different from that in a case where the recognition information includes the second recognition information.

(11)

The information processing device according to any one of (1) to (10), wherein when the virtual object is a virtual object that is able to be manipulated by the real object, the display control unit controls the shielding display such that the shielding display presents one of the first boundary representation and the second boundary representation, the one having a larger display region for the virtual object.

(12)

The information processing device according to any one of (1) to (11), wherein the display control unit controls the shielding display according to whether or not the virtual object has a three-dimensional shape.

(13)

The information processing device according to (2), further comprising:

a recognition unit that performs the shape recognition, and movement recognition for the real object, the movement recognition being based on sensing of the real object, wherein in a case where movement information indicating that moving speed of the real object is at a first moving speed is acquired by the movement recognition, at least one of processing load related to the shape recognition performed by the recognition unit and processing load related to drawing performed by the display control unit is reduced from that in a case where movement information indicating that the moving speed of the real object is at a second moving speed lower than the first moving speed is acquired.

(14)

The information processing device according to (13), wherein the recognition unit does not perform the shape recognition when the moving speed of the real object is at the first moving speed.

(15)

The information processing device according to (13) or (14), wherein the display control unit performs the drawing by use of a result of the drawing that the display control unit performed at an earlier time, when the moving speed of the real object is at the first moving speed.

(16)

The information processing device according to any one of (1) to (15), wherein the recognition information includes information on recognition accuracy related to the recognition.

(17)

The information processing device according to any one of (1) to (16), wherein the recognition information includes information on moving speed of the real object, the moving speed being recognized based on sensing of the real object.

(18)

The information processing device according to any one of (1) to (17), wherein the display control unit controls display by a display unit having optical transmissivity.

(19)

An information processing method, including:

a processor controlling, when recognition information related to recognition based on sensing of a real object includes first recognition information, shielding display representing shielding of a virtual object by the real object such that the shielding display presents a first boundary representation at a boundary between the virtual object and the real object or at a position near the boundary, and controlling, when the recognition information includes second recognition information different from the first recognition information, the shielding display such that the shielding display presents a second boundary representation different from the first boundary representation at the boundary or at a position near the boundary.

(20)

A program for causing a computer to realize functions including:

controlling, when recognition information related to recognition based on sensing of a real object includes first recognition information, shielding display representing shielding of a virtual object by the real object such that the shielding display presents a first boundary representation at a boundary between the virtual object and the real object or at a position near the boundary, and controlling, when the recognition information includes second recognition information different from the first recognition information, the shielding display such that the shielding display presents a second boundary representation different from the first boundary representation at the boundary or at a position near the boundary.

REFERENCE SIGNS LIST 1, 1-2 INFORMATION PROCESSING DEVICE
11 SENSOR UNIT
12, 12-2 CONTROL UNIT
13 DISPLAY UNIT
14 SPEAKER
15 COMMUNICATION UNIT
16 OPERATION INPUT UNIT
17 STORAGE UNIT
110 OUTWARD CAMERA
111 INWARD CAMERA
112 MICROPHONE
113 GYROSCOPE SENSOR
114 ACCELERATION SENSOR
115 DIRECTION SENSOR
116 POSITION MEASURING UNIT
117 BIOSENSOR
120, 120-2 RECOGNITION UNIT
121, 122 MOVEMENT RECOGNITION UNIT
123, 124 SHAPE RECOGNITION UNIT
125 ACCURACY INFORMATION ACQUISITION UNIT
126 MOVING AND CHANGING UNIT
127, 128 DISPLAY CONTROL UNIT

The invention claimed is:

1. An information processing device, comprising:
    circuitry configured to:
        acquire manipulation information that indicates one of a first type of manipulation of a virtual object manipulated via a real object or a second type of manipulation of the virtual object manipulated via the real object,
            wherein the second type of manipulation is different from the first type of manipulation;
        control, based on the manipulation information that indicates the first type of manipulation, a shield display which represents shielding of the virtual object by the real object such that the shield display presents a first boundary representation at one of a boundary between the virtual object and the real object or a position near the boundary;
        control, based on the manipulation information that indicates the second type of manipulation different from the first type of manipulation, the shield display such that the shield display presents a second boundary representation different from the first boundary representation at one of the boundary or the position near the boundary;
        control, based on recognition information that includes first recognition information, the shield display such that a shield region related to the shielding of the virtual object has a first display state;
        control, based on the recognition information that includes second recognition information different from the first recognition information, the shield display such that the shield region has a second display state different from the first display state; and
        control, based on the recognition information that indicates recognition of the real object, the shield display such that an effect display is added inside the shield region of the shield display, wherein the effect display corresponds to a motion of a plurality of particles in the shield region.

2. The information processing device according to claim 1, wherein
    the circuitry is further configured to control the shield display based on shape information acquired by shape recognition, and
    the shape recognition is based on sensing of the real object.

3. The information processing device according to claim 1, wherein
    the circuitry is further configured to:
        control, based on the recognition information that includes the first recognition information, the shield display such that the shield region related to the shielding of the virtual object has a first size; and
control, based on the recognition information that includes the second recognition information, the shield display such that the shield region has a second size different from the first size, and
the recognition information indicates the recognition of the real object based on sensing of the real object.

4. The information processing device according to claim 3, wherein the circuitry is further configured to:
control, based on the recognition information that includes the first recognition information, the shield display such that a region in the shield region has the first size, the region corresponding to positional information included in the recognition information; and
control, based on the recognition information that includes the second recognition information, the shield display such that the region in the shield region has the second size, the region corresponding to the positional information.

5. The information processing device according to claim 1, wherein
the circuitry is further configured to control, based on the recognition information, the shield display such that the effect display is added at the position near the boundary, and
the recognition information indicates the recognition of the real object based on sensing of the real object.

6. The information processing device according to claim 1, wherein the circuitry is further configured to add, based on a collision of the real object with the virtual object, the effect display near a boundary related to the collision between the real object and the virtual object.

7. The information processing device according to claim 5, wherein the circuitry is further configured to control the shield display such that the effect display is added at a position corresponding to positional information included in the recognition information.

8. The information processing device according to claim 5, wherein
the circuitry is further configured to control, based on the recognition information that includes the first recognition information, the effect display such that the effect display has a first intensity different from a second intensity of the effect display, and
the second intensity of the effect display is based on the recognition information which includes the second recognition information.

9. The information processing device according to claim 1, wherein
the circuitry is further configured to control, based on the recognition information that includes the first recognition information, display of the virtual object such that the virtual object has a first visibility different from a second visibility of the virtual object, and
the second visibility of the virtual object is based on the recognition information which includes the second recognition information.

10. The information processing device according to claim 1, wherein
the virtual object corresponds to an object manipulatable by the real object, and
the first boundary representation has a larger display region than the second boundary representation.

11. The information processing device according to claim 1, wherein the circuitry is further configured to control the shield display based on whether the virtual object has a three-dimensional shape.

12. The information processing device according to claim 1, wherein the circuitry is further configured to:
recognize a shape and a movement of the real object; and
reduce, based on the recognized movement that corresponds to a first moving speed of the real object which is lower than a second moving speed of the real object, at least one of a processing load related to the recognition of the shape or a processing load related to a drawing operation.

13. The information processing device according to claim 12, wherein the circuitry is further configured to skip the recognition of the shape of the real object based on the second moving speed of the real object.

14. The information processing device according to claim 12, wherein the circuitry is further configured to draw by use of a result of the drawing operation, based on the second moving speed of the real object.

15. The information processing device according to claim 3, wherein the recognition information includes information on a recognition accuracy related to the recognition of the real object.

16. The information processing device according to claim 3, wherein
the recognition information includes information on a moving speed of the real object, and
the moving speed is recognized based on the sensing of the real object.

17. The information processing device according to claim 1, further comprising a display with optical transmissivity.

18. An information processing method, comprising:
acquiring manipulation information indicating one of a first type of manipulation of a virtual object manipulated via a real object or a second type of manipulation of the virtual object manipulated via the real object,
wherein the second type of manipulation is different from the first type of manipulation;
controlling, based on the manipulation information that indicates the first type of manipulation, a shielding display representing shielding of the virtual object by the real object such that the shielding display presents a first boundary representation at one of a boundary between the virtual object and the real object or a position near the boundary;
controlling, based on the manipulation information that indicates the second type of manipulation different from the first type of manipulation, the shielding display such that the shielding display presents a second boundary representation different from the first boundary representation at one of the boundary or the position near the boundary;
controlling, based on recognition information that includes first recognition information, the shielding display such that a shield region related to the shielding of the virtual object has a first display state;
controlling, based on the recognition information that includes second recognition information different from the first recognition information, the shielding display such that the shield region has a second display state different from the first display state; and
controlling, based on the recognition information that indicates recognition of the real object, the shielding display such that an effect display is added inside the shield region of the shielding display, wherein the effect display corresponds to a motion of a plurality of particles in the shield region.

19. A non-transitory computer-readable medium having stored thereon computer-executable instructions which, when executed by a processor, cause the processor to execute operations, the operations comprising:

acquiring manipulation information indicating one of a first type of manipulation of a virtual object manipulated via a real object or a second type of manipulation of the virtual object manipulated via the real object, wherein the second type of manipulation is different from the first type of manipulation;

controlling, based on the manipulation information that indicates the first type of manipulation, a shielding display representing shielding of the virtual object by the real object such that the shielding display presents a first boundary representation at one of a boundary between the virtual object and the real object or a position near the boundary;

controlling, based on the manipulation information that indicates the second type of manipulation different from the first type of manipulation, the shielding display such that the shielding display presents a second boundary representation different from the first boundary representation at one of the boundary or the position near the boundary;

controlling, based on recognition information that includes first recognition information, the shielding display such that a shield region related to the shielding of the virtual object has a first display state;

controlling, based on the recognition information that includes second recognition information different from the first recognition information, the shielding display such that the shield region has a second display state different from the first display state; and controlling, based on the recognition information that indicates recognition of the real object, the shielding display such that an effect display is added inside the shield region of the shielding display, wherein the effect display corresponds to a motion of a plurality of particles in the shield region.

* * * * *